Aug. 13, 1940.  H. T. AVERY  2,211,736
CALCULATING MACHINE
Filed Dec. 18, 1933  44 Sheets-Sheet 1

INVENTOR.
Harold T. Avery
BY
ATTORNEY.

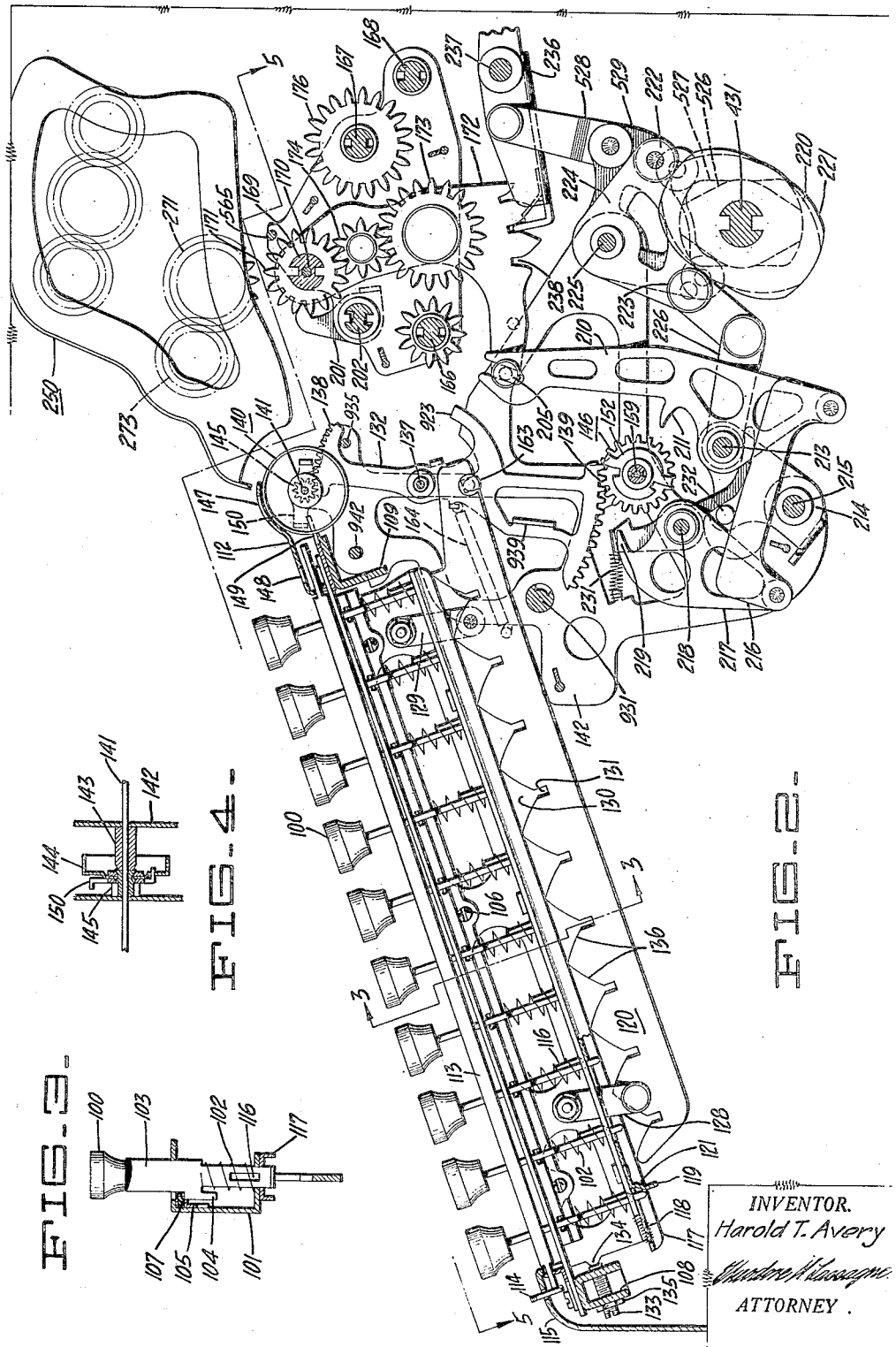

Aug. 13, 1940.　　　　H. T. AVERY　　　　2,211,736
CALCULATING MACHINE
Filed Dec. 18, 1933　　44 Sheets-Sheet 3

INVENTOR.
Harold T. Avery
BY
ATTORNEY.

Aug. 13, 1940.    H. T. AVERY    2,211,736
CALCULATING MACHINE
Filed Dec. 18, 1933    44 Sheets-Sheet 4
FIG_7.
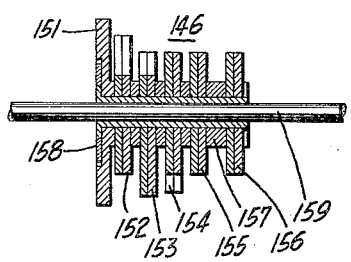
FIG_6.
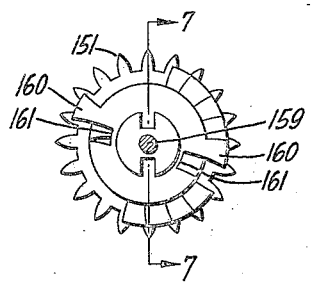
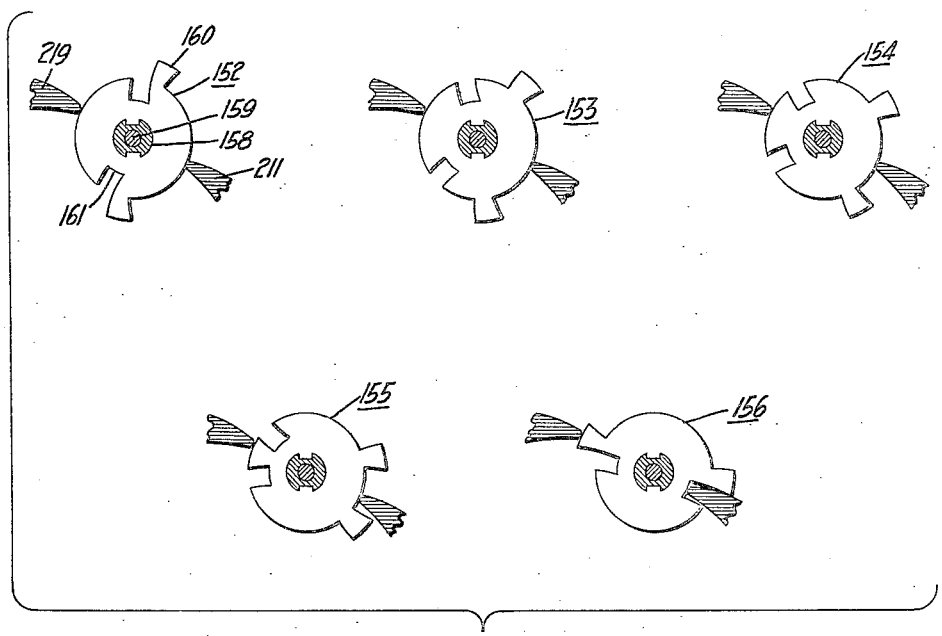
FIG_8.
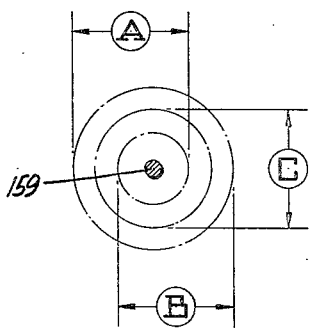
FIG_9.
INVENTOR.
Harold T. Avery
BY
ATTORNEY.

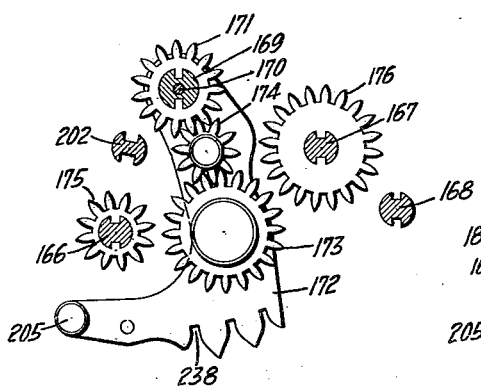
FIG_10_
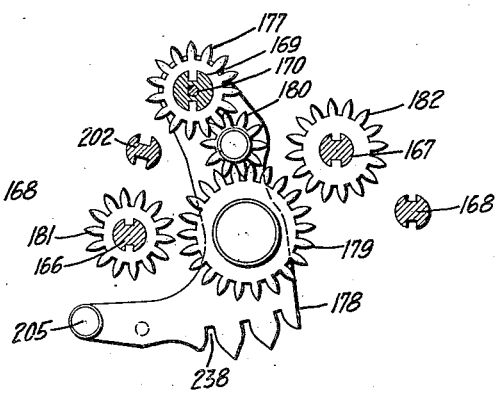
FIG_11_
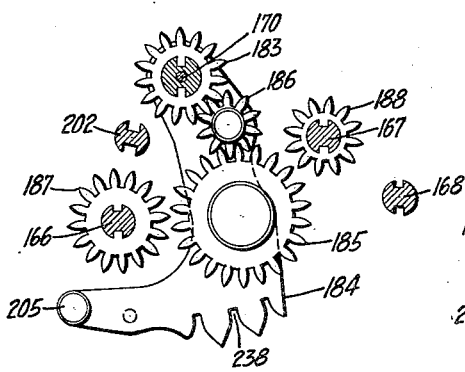
FIG_12_
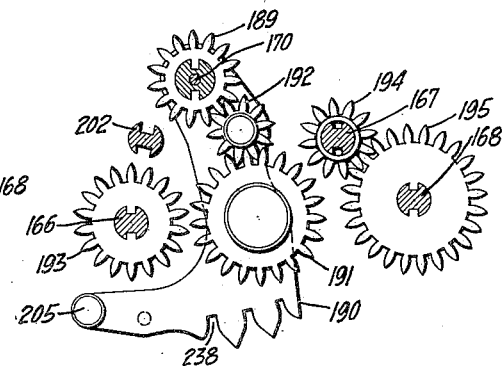
FIG_13_
FIG_14_
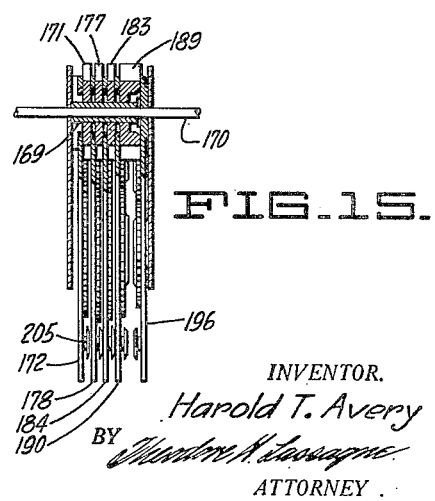
FIG_15_
INVENTOR.
Harold T. Avery
BY
ATTORNEY.

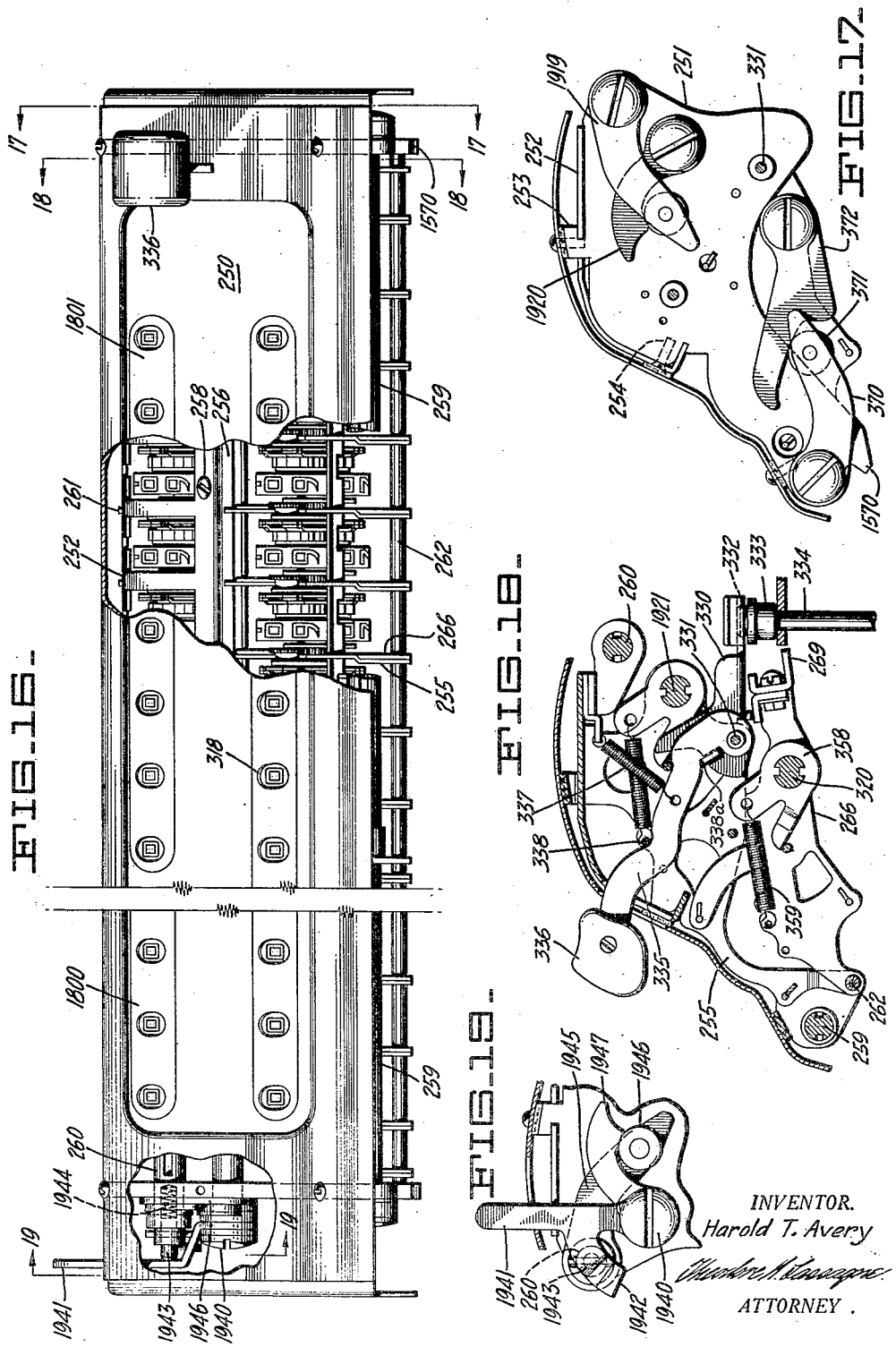

INVENTOR.
Harold T. Avery
BY
ATTORNEY.

Aug. 13, 1940.    H. T. AVERY    2,211,736
CALCULATING MACHINE
Filed Dec. 18, 1933    44 Sheets-Sheet 8
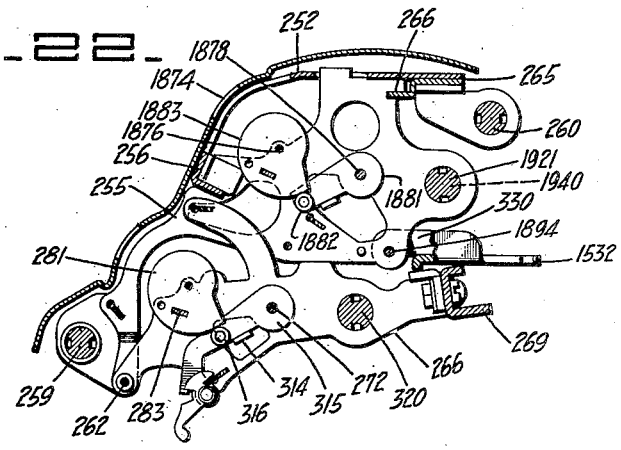
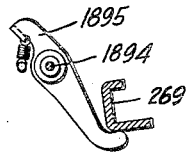
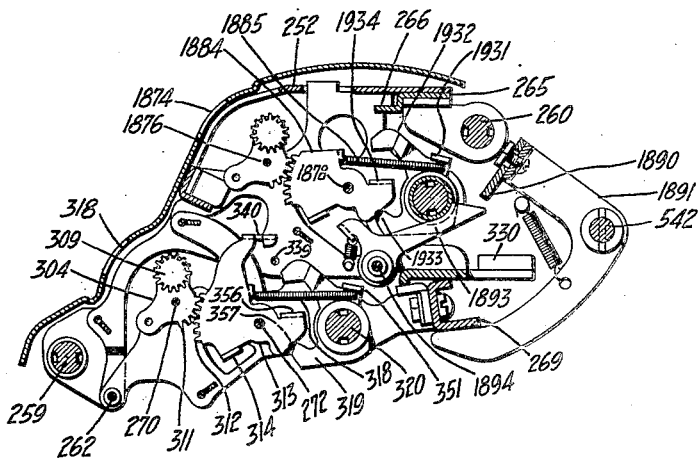
INVENTOR.
Harold T. Avery
BY
ATTORNEY

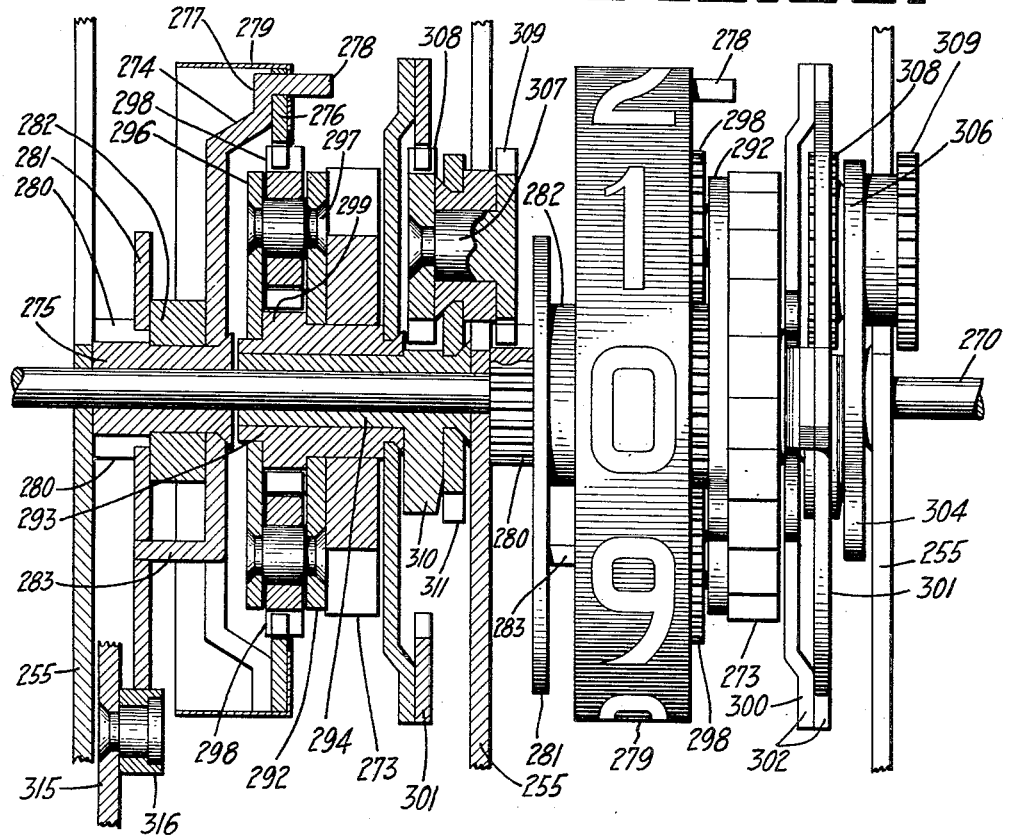
FIG_25_
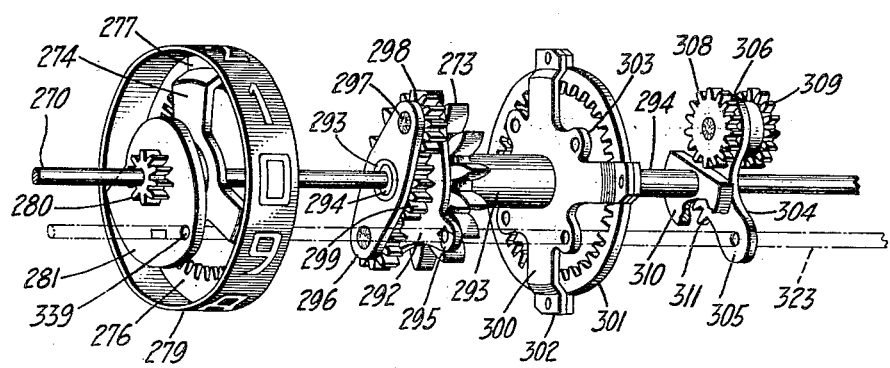
FIG_26_

Aug. 13, 1940.  H. T. AVERY  2,211,736
CALCULATING MACHINE
Filed Dec. 18, 1933   44 Sheets-Sheet 10
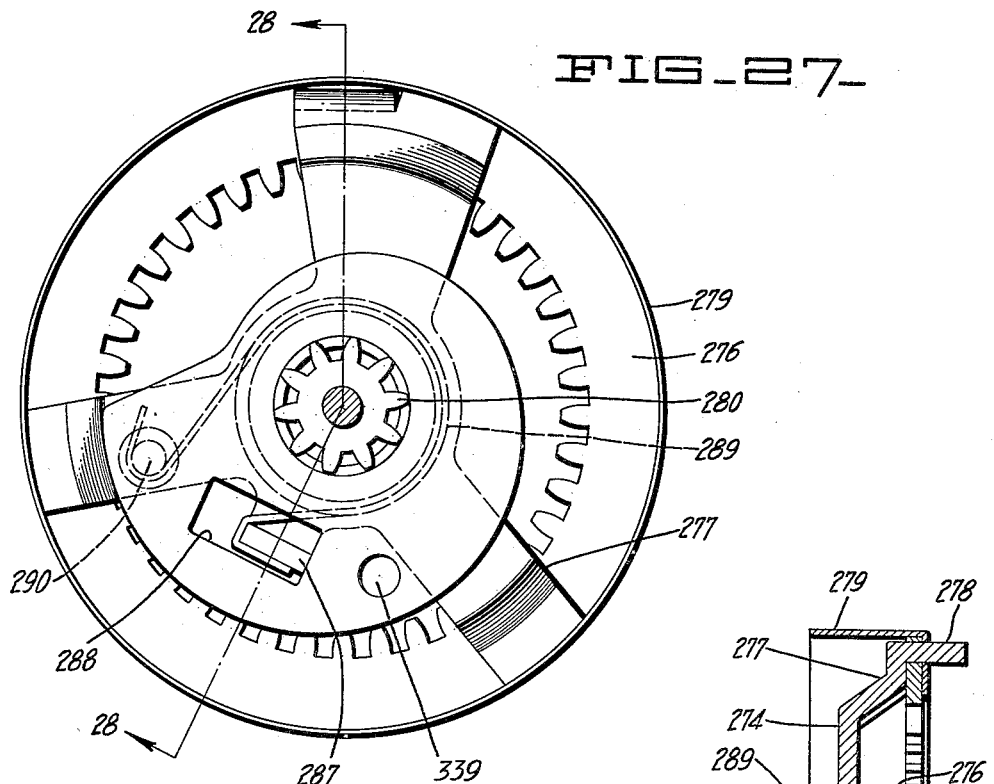
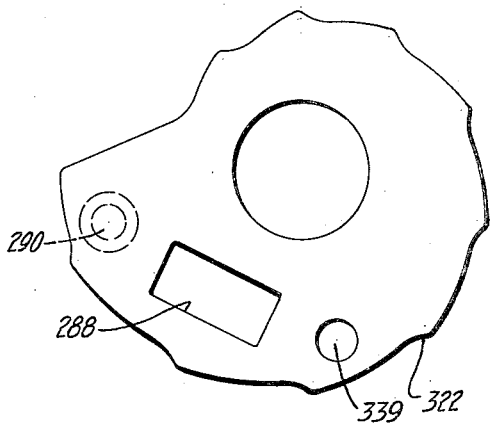
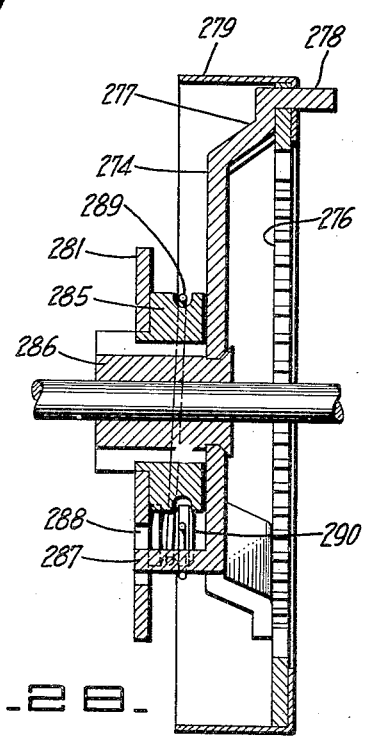
INVENTOR.
Harold T. Avery
BY
ATTORNEY Aug. 13, 1940.  H. T. AVERY  2,211,736
CALCULATING MACHINE
Filed Dec. 18, 1933  44 Sheets-Sheet 11
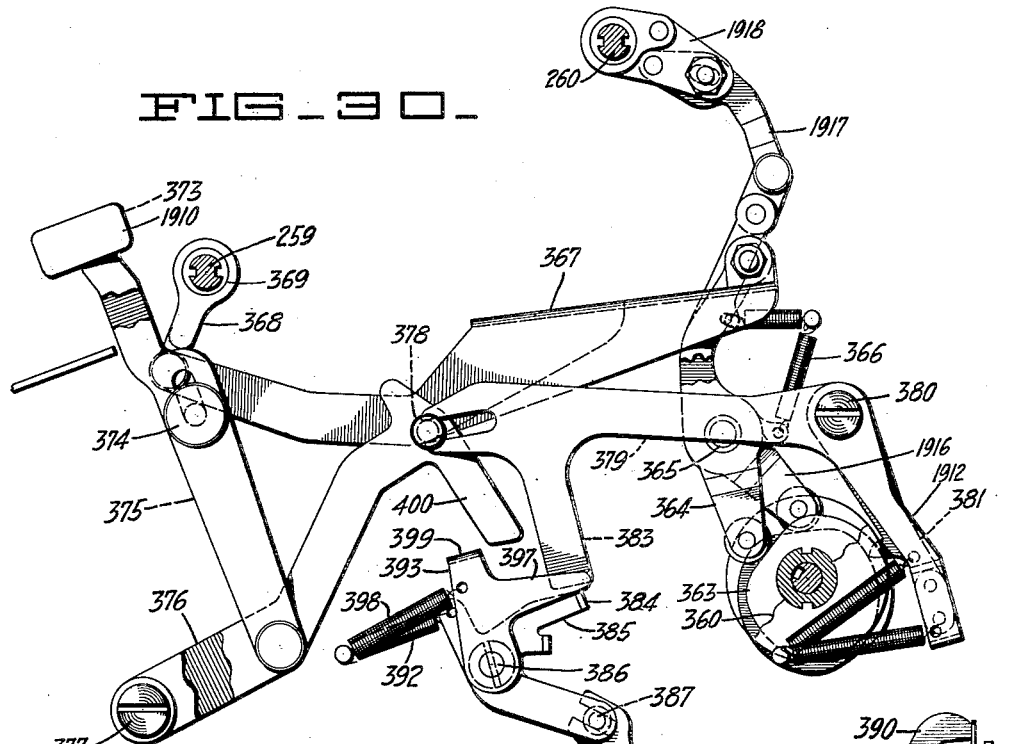
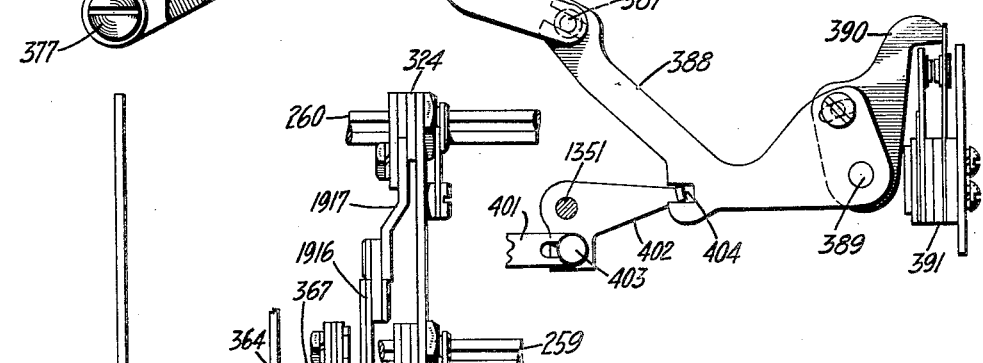
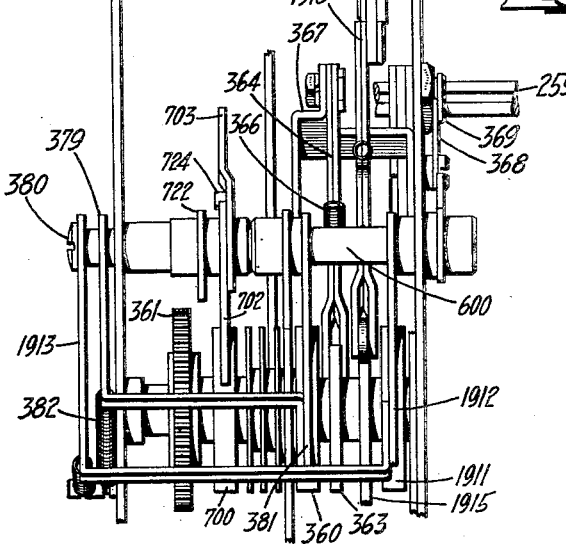
INVENTOR.
Harold T. Avery
BY
ATTORNEY.

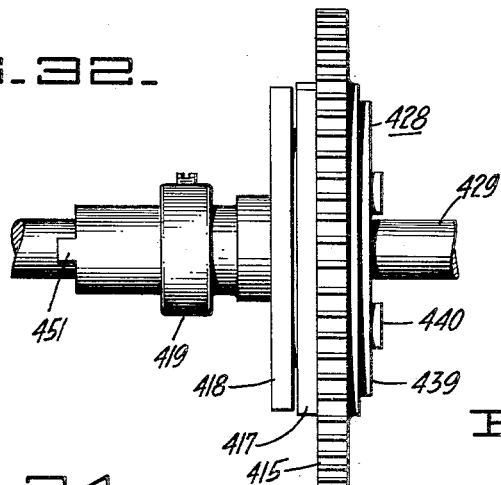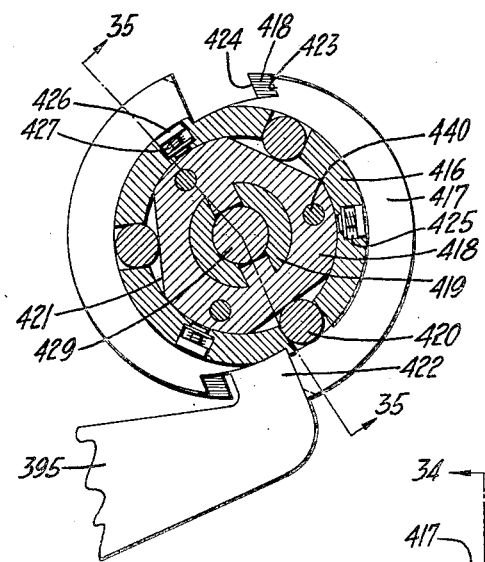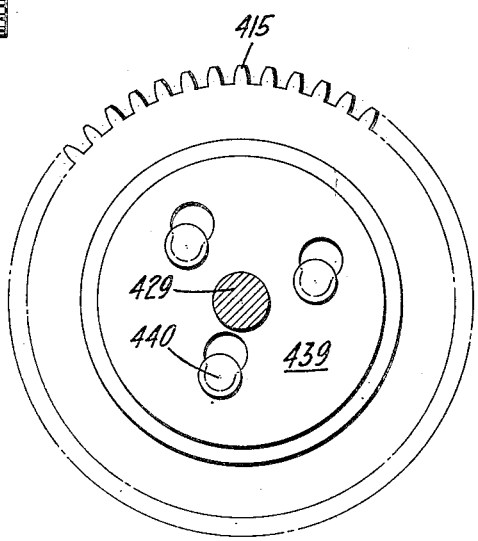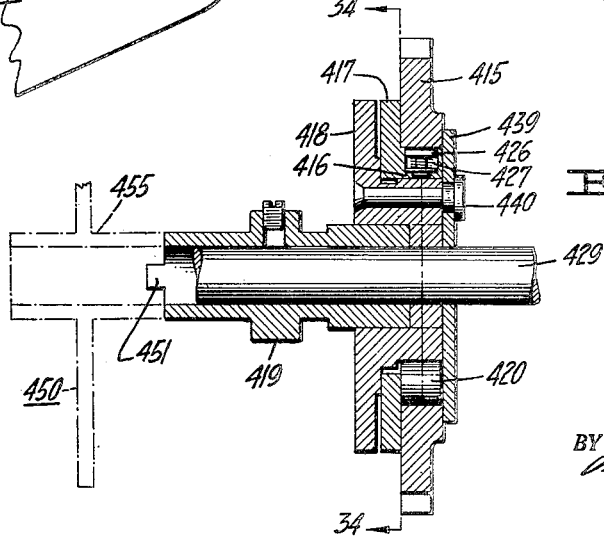

Aug. 13, 1940. H. T. AVERY 2,211,736
CALCULATING MACHINE
Filed Dec. 18, 1933 44 Sheets-Sheet 13
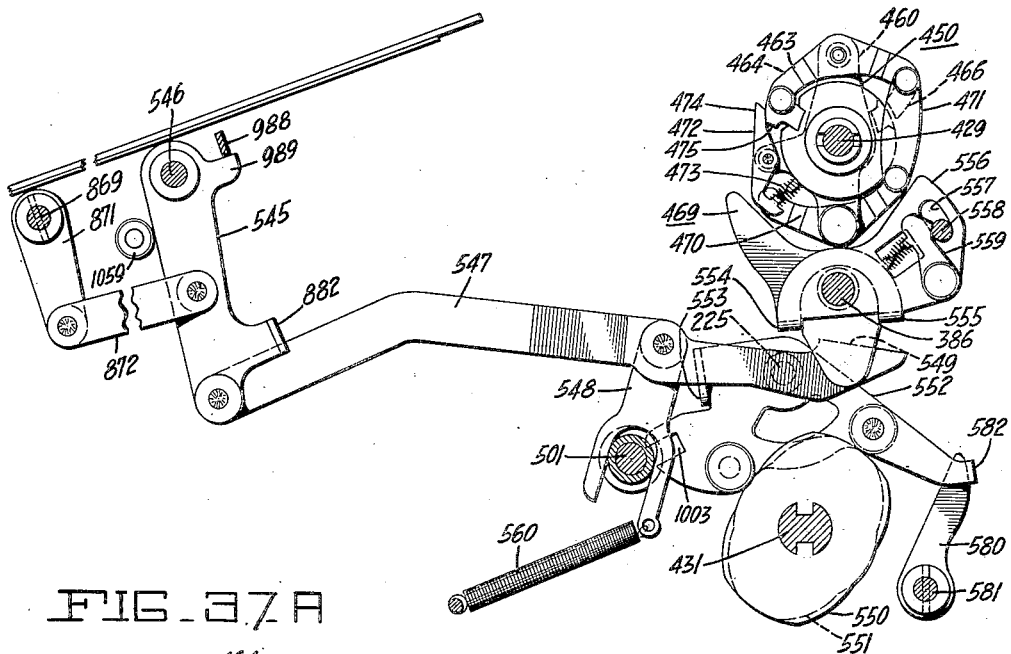
FIG_36_
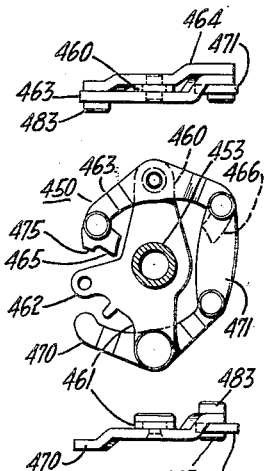
FIG_37A
FIG_37B
FIG_37C
FIG_38_
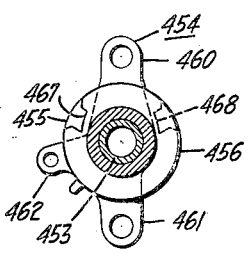
FIG_39_
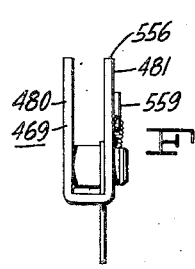
FIG_40_
INVENTOR.
Harold T. Avery
BY
ATTORNEY.

Aug. 13, 1940.                H. T. AVERY                2,211,736
                          CALCULATING MACHINE
                     Filed Dec. 18, 1933      44 Sheets-Sheet 14

INVENTOR.
Harold T. Avery
BY
ATTORNEY.

Aug. 13, 1940. H. T. AVERY 2,211,736
CALCULATING MACHINE
Filed Dec. 18, 1933 44 Sheets-Sheet 15

INVENTOR.
Harold T. Avery
BY
ATTORNEY

Aug. 13, 1940.   H. T. AVERY   2,211,736
CALCULATING MACHINE
Filed Dec. 18, 1933   44 Sheets-Sheet 16

INVENTOR.
Harold T. Avery
BY
ATTORNEY.

Aug. 13, 1940.    H. T. AVERY    2,211,736
CALCULATING MACHINE
Filed Dec. 18, 1933    44 Sheets-Sheet 17

INVENTOR.
Harold T. Avery
BY
ATTORNEY.

Aug. 13, 1940.   H. T. AVERY   2,211,736
CALCULATING MACHINE
Filed Dec. 18, 1933    44 Sheets-Sheet 18
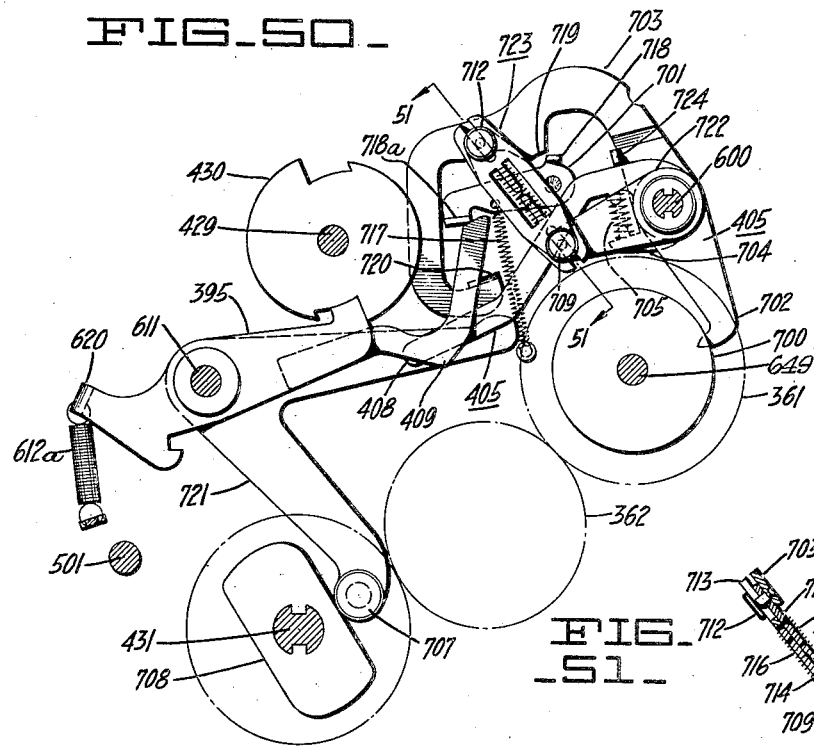
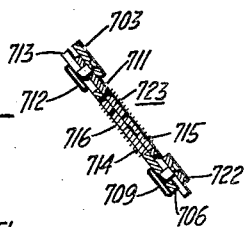
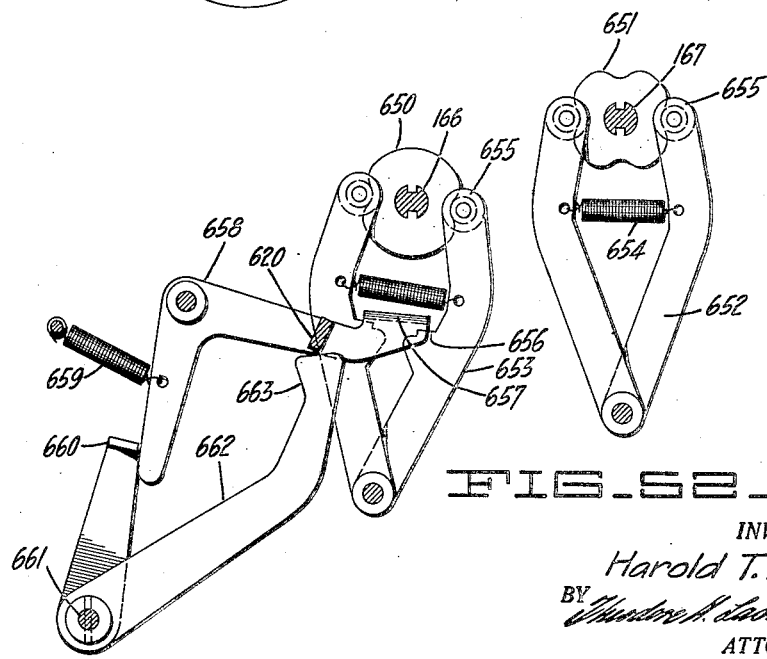
INVENTOR.
Harold T. Avery
BY
ATTORNEY.

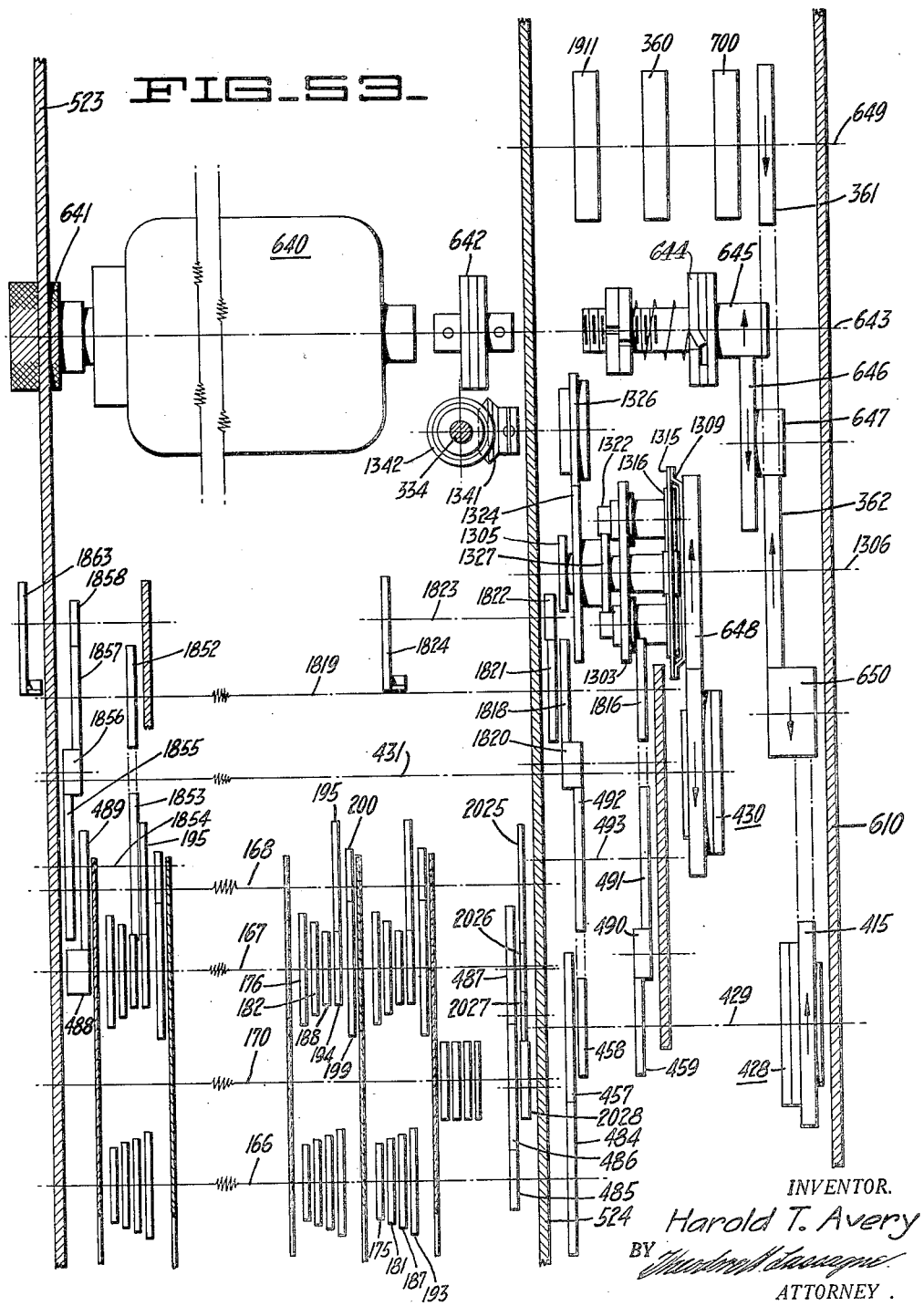

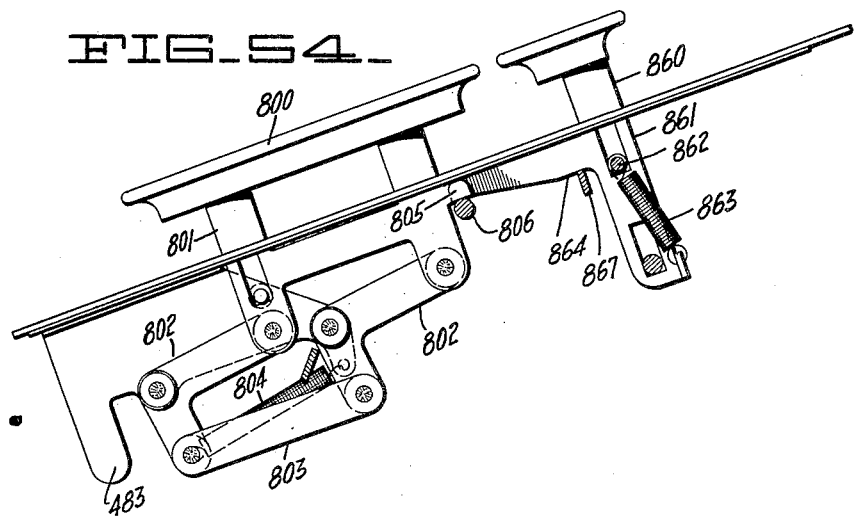
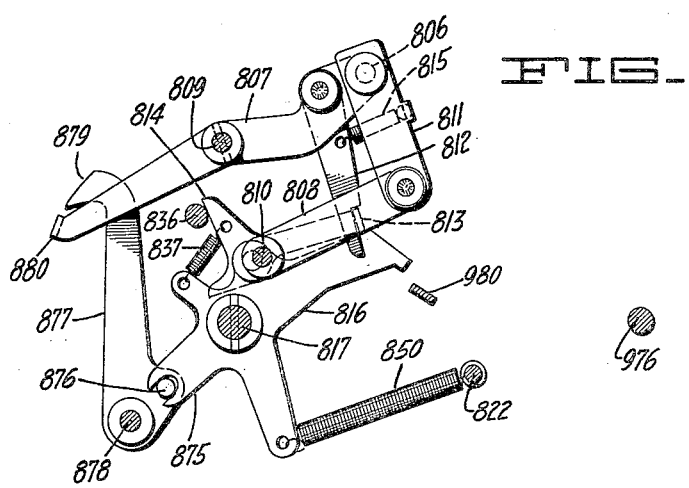
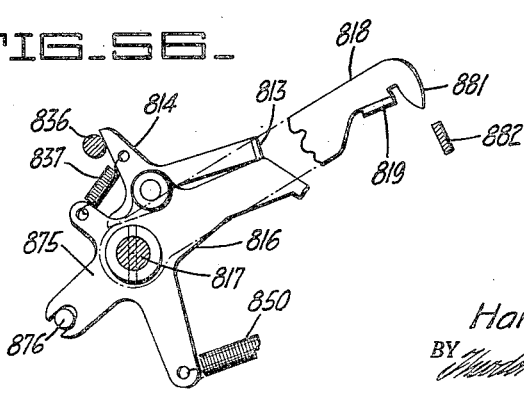

Aug. 13, 1940. H. T. AVERY 2,211,736
CALCULATING MACHINE
Filed Dec. 18, 1933 44 Sheets-Sheet 21
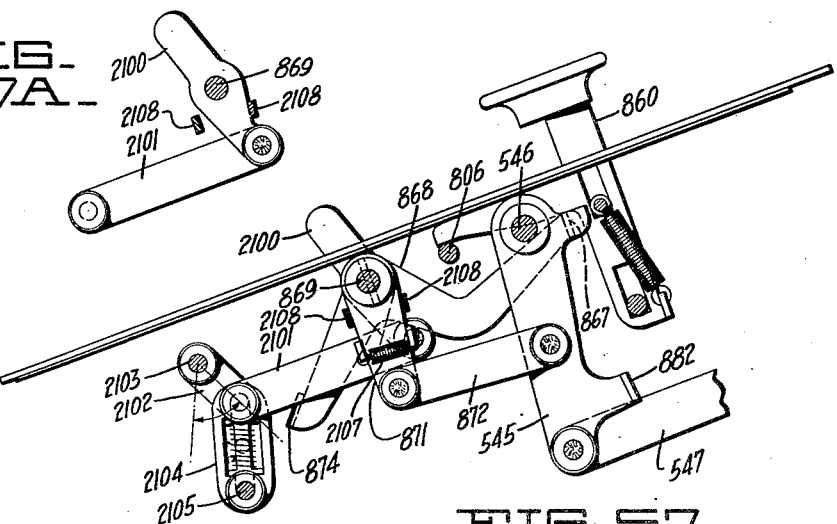
FIG-57A-
FIG-57-
FIG-57B-
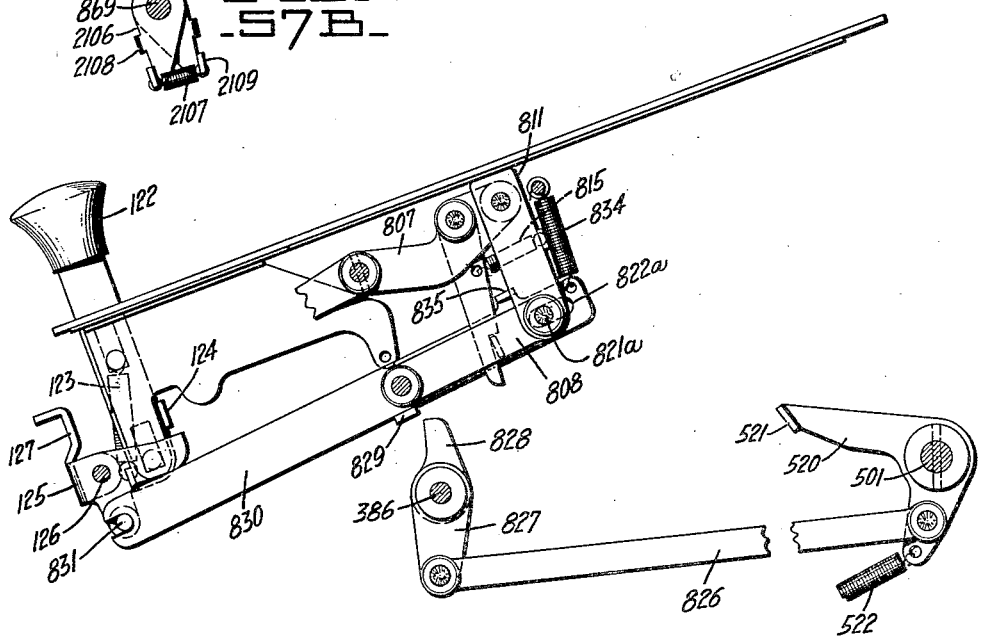
FIG-58-
INVENTOR.
Harold T. Avery
BY
ATTORNEY.

Aug. 13, 1940.    H. T. AVERY    2,211,736
CALCULATING MACHINE
Filed Dec. 18, 1933    44 Sheets-Sheet 22

INVENTOR.
Harold T. Avery
BY
ATTORNEY.

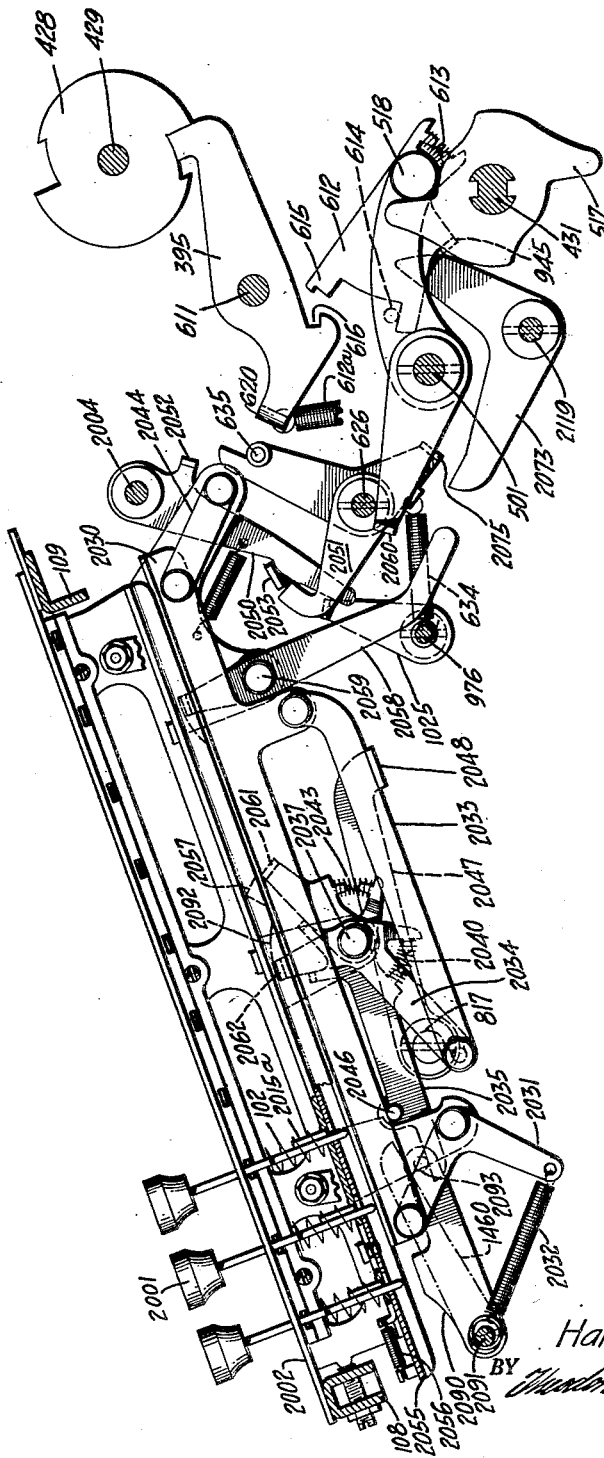

Aug. 13, 1940. H. T. AVERY 2,211,736
CALCULATING MACHINE
Filed Dec. 18, 1933 44 Sheets-Sheet 24
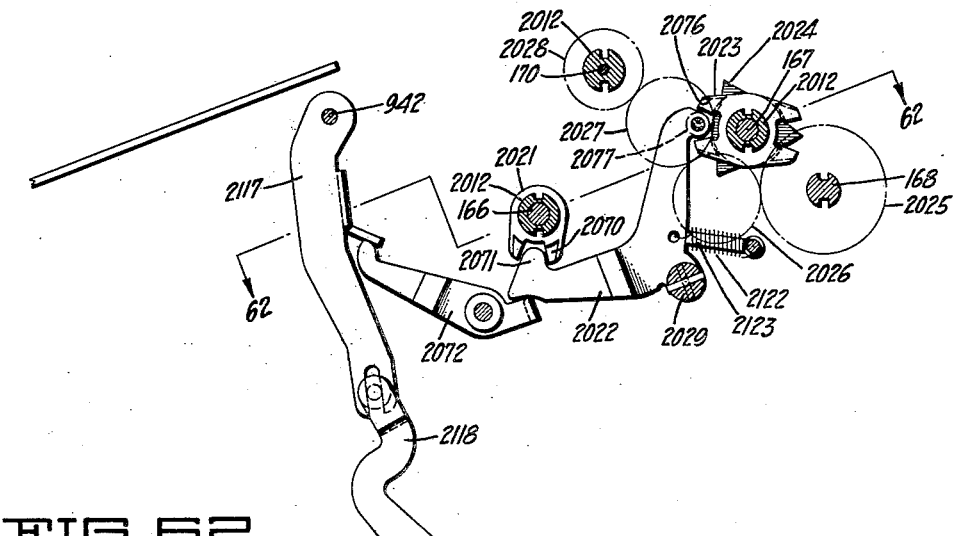
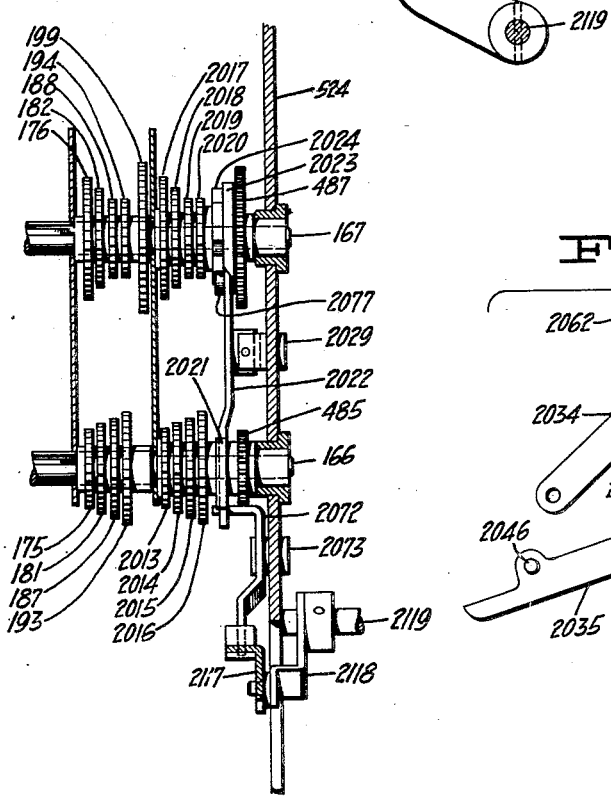
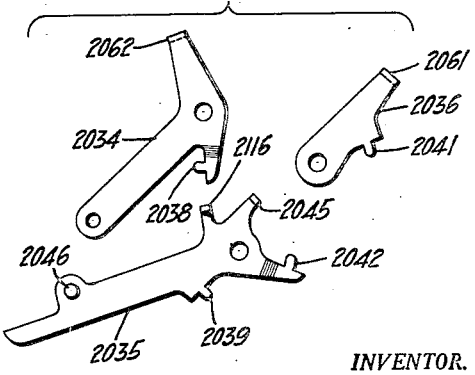
INVENTOR.
Harold T. Avery
BY
ATTORNEY.

Aug. 13, 1940.   H. T. AVERY   2,211,736
CALCULATING MACHINE
Filed Dec. 18, 1933   44 Sheets-Sheet 25
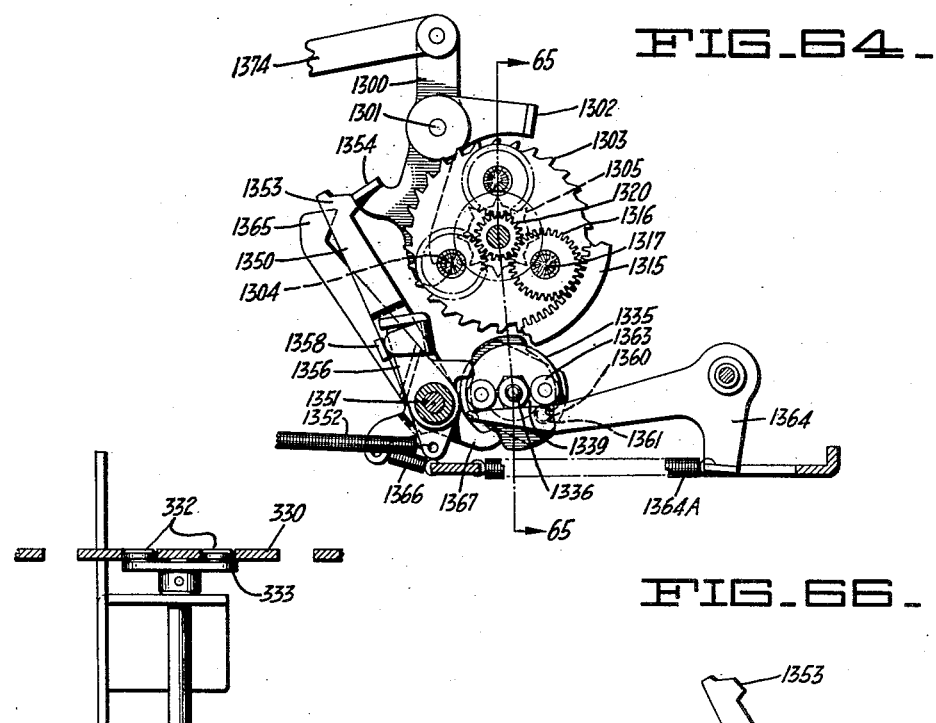
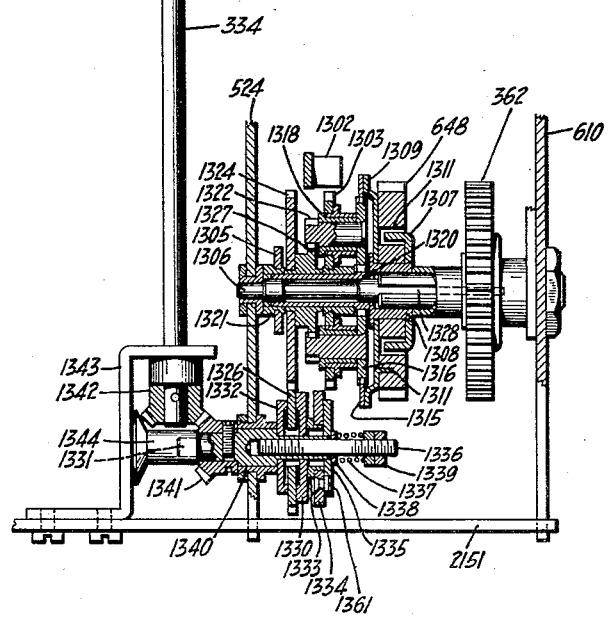
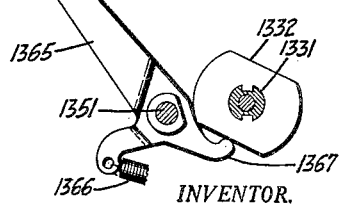
INVENTOR.
Harold T. Avery
BY
ATTORNEY.

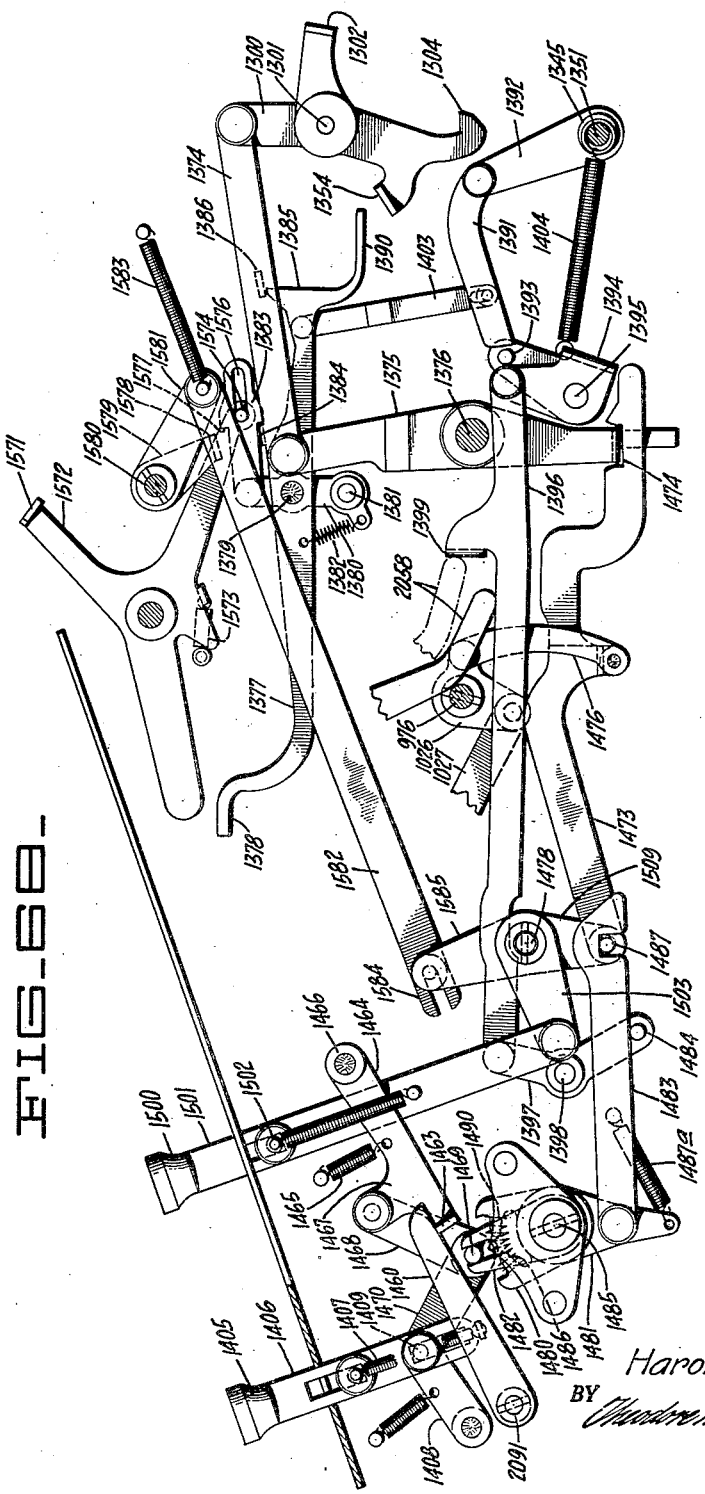

Aug. 13, 1940.　　　H. T. AVERY　　　2,211,736
CALCULATING MACHINE
Filed Dec. 18, 1933　　44 Sheets-Sheet 27
FIG_69_
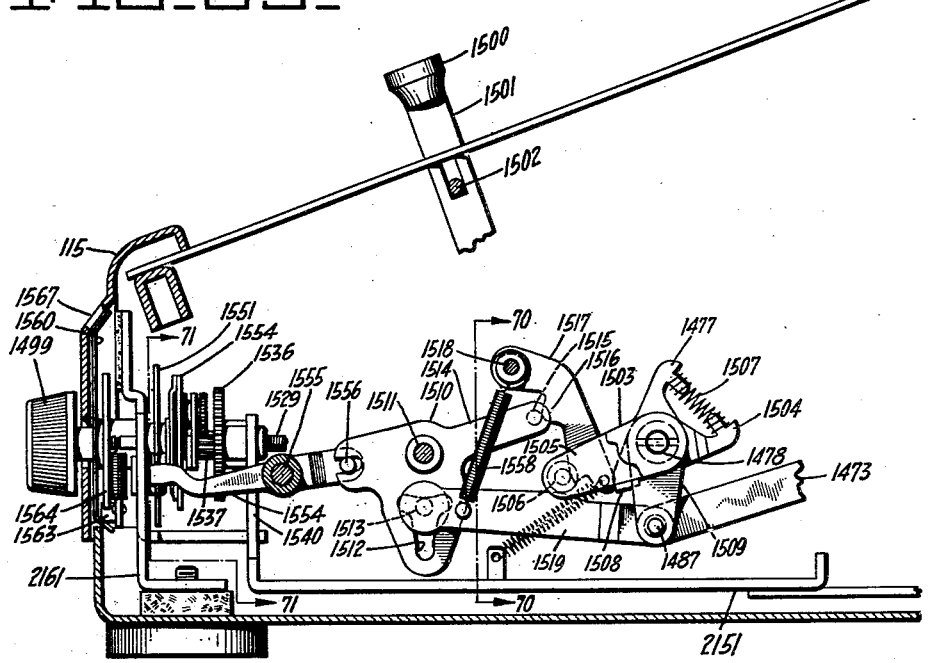
FIG_70_
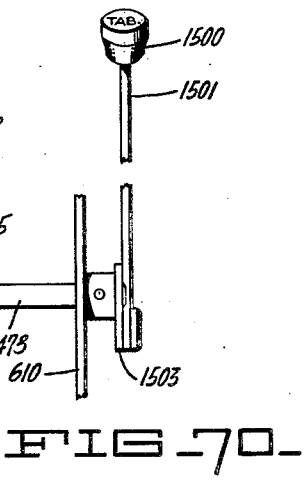
INVENTOR.
Harold T. Avery
BY
ATTORNEY.

Aug. 13, 1940. H. T. AVERY 2,211,736
CALCULATING MACHINE
Filed Dec. 18, 1933 44 Sheets-Sheet 28
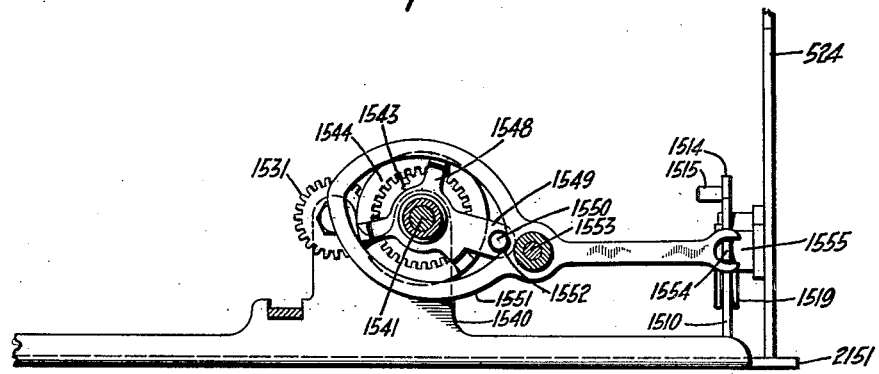
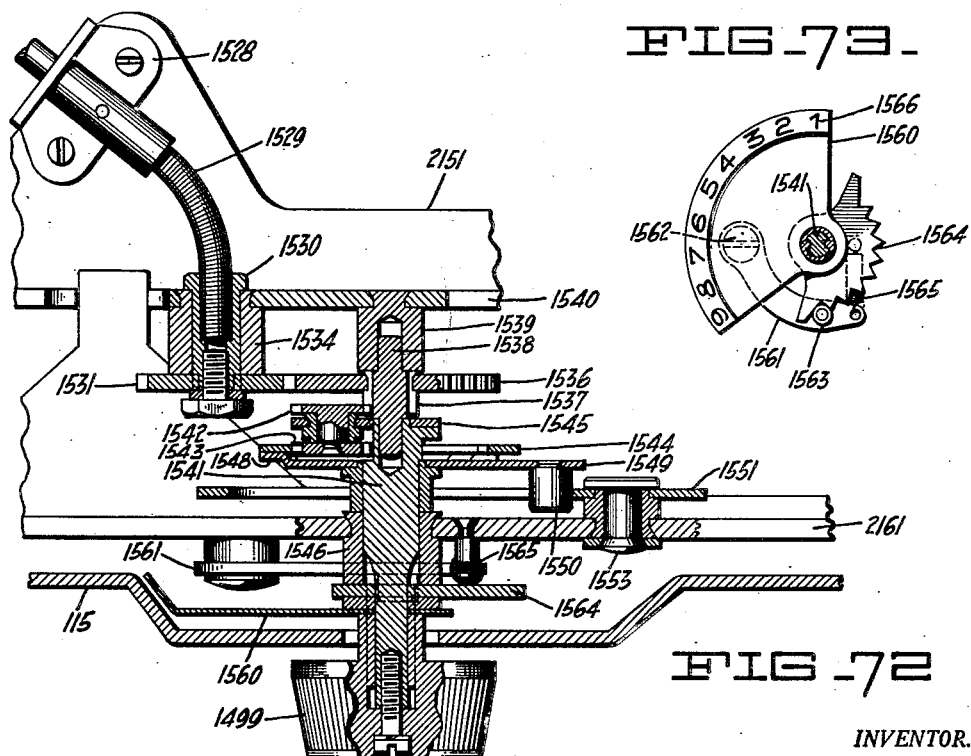
INVENTOR.
Harold T. Avery
BY
ATTORNEY.

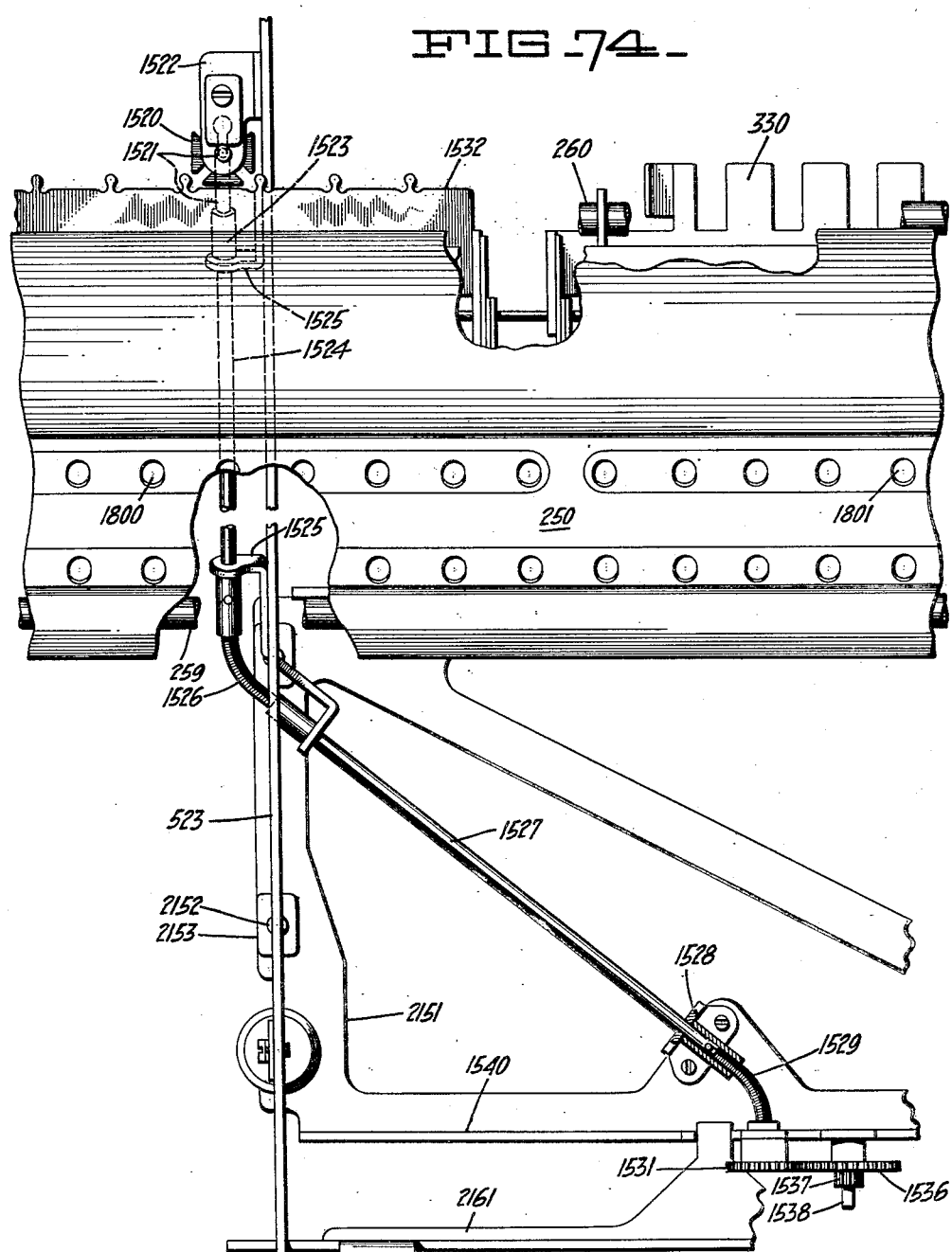

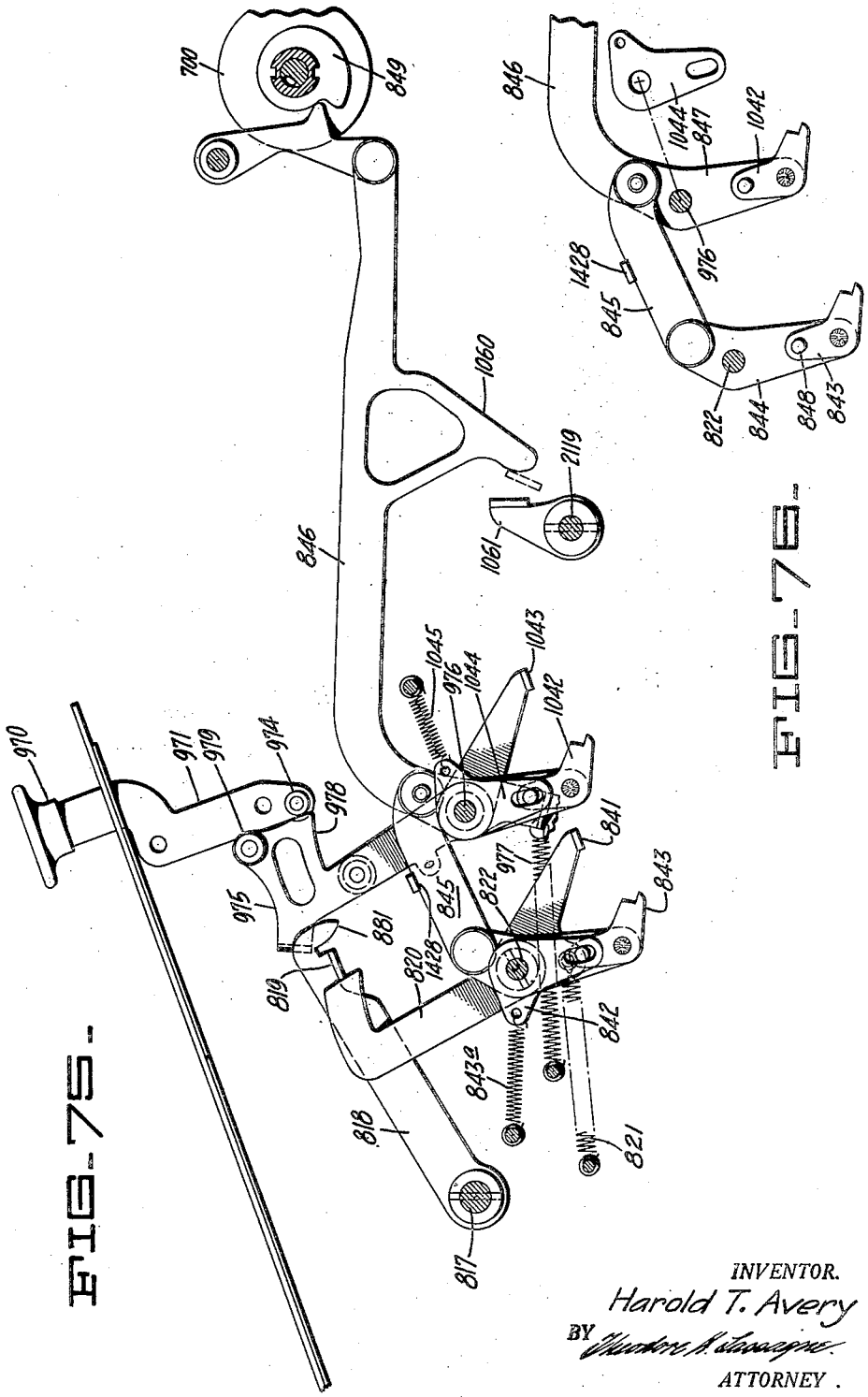

Aug. 13, 1940.   H. T. AVERY   2,211,736
CALCULATING MACHINE
Filed Dec. 18, 1933   44 Sheets-Sheet 31
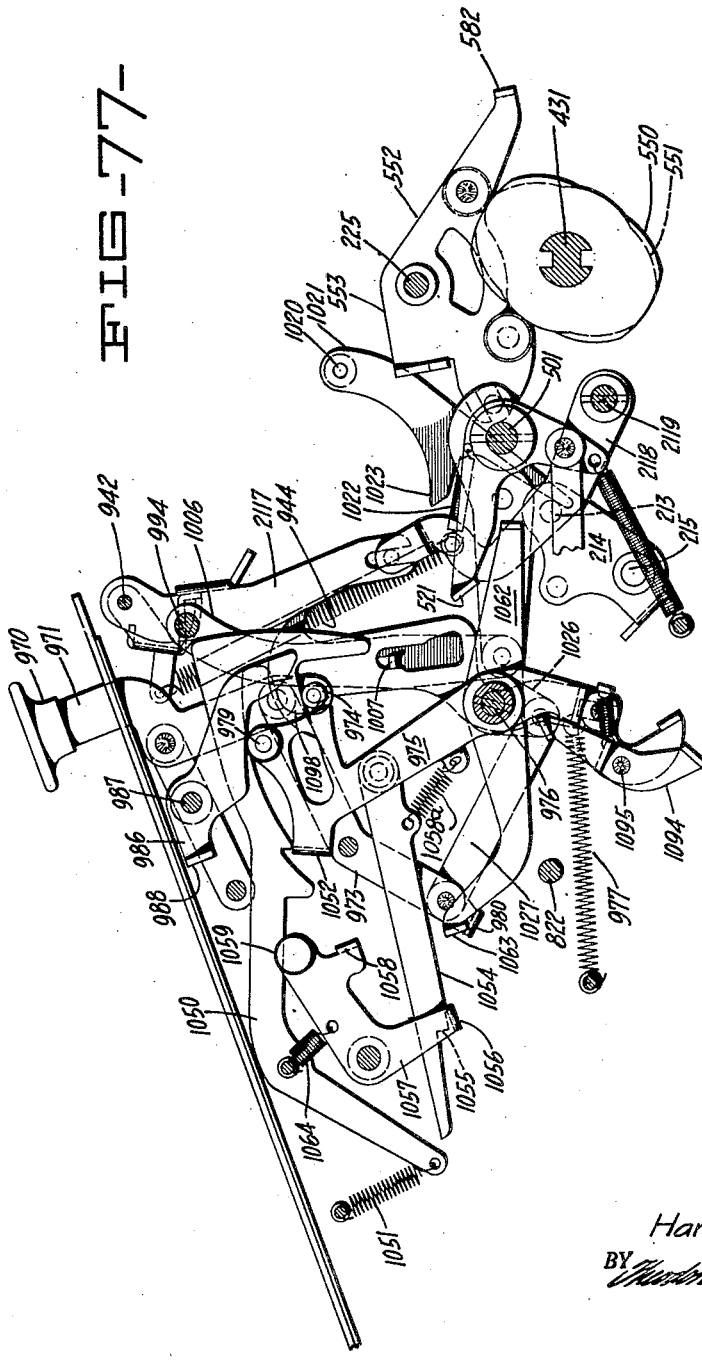
INVENTOR.
Harold T. Avery
BY
ATTORNEY.

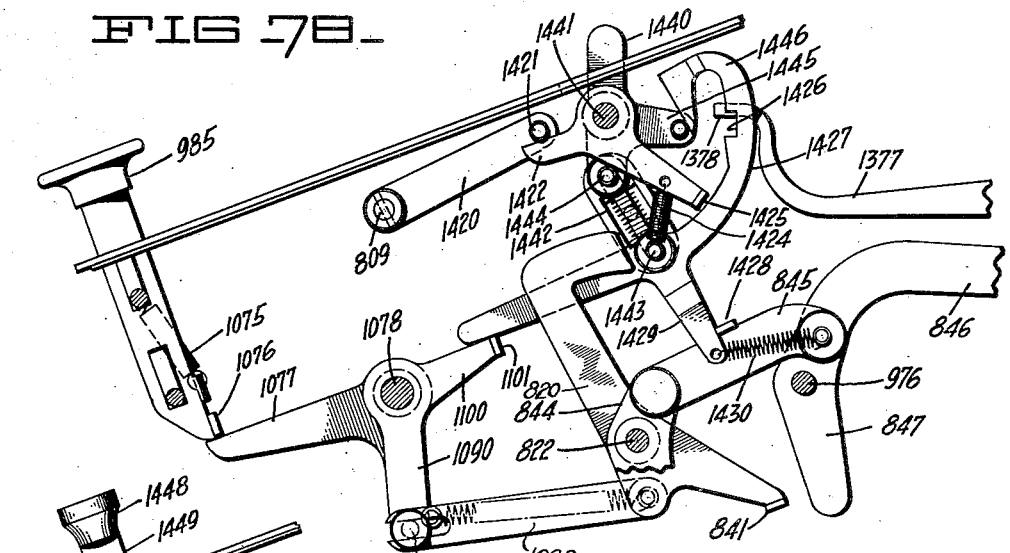
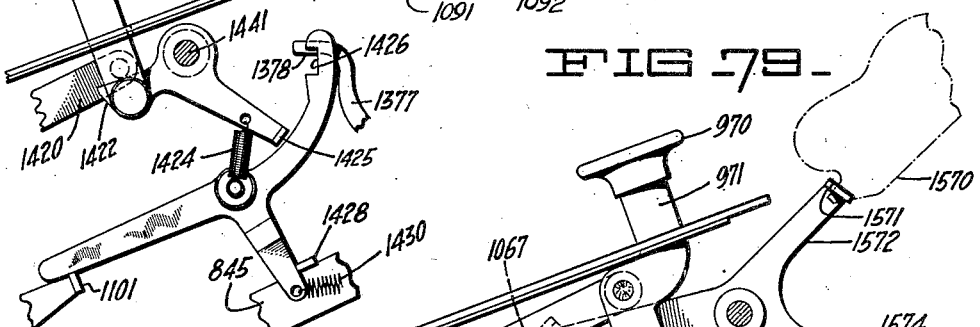
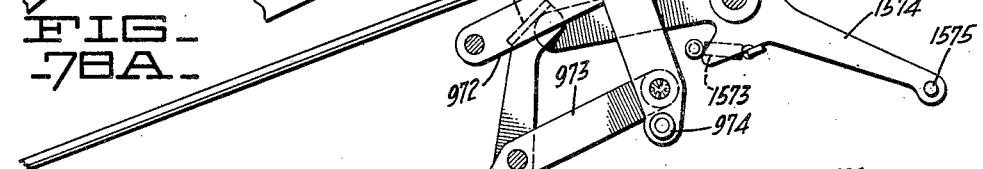
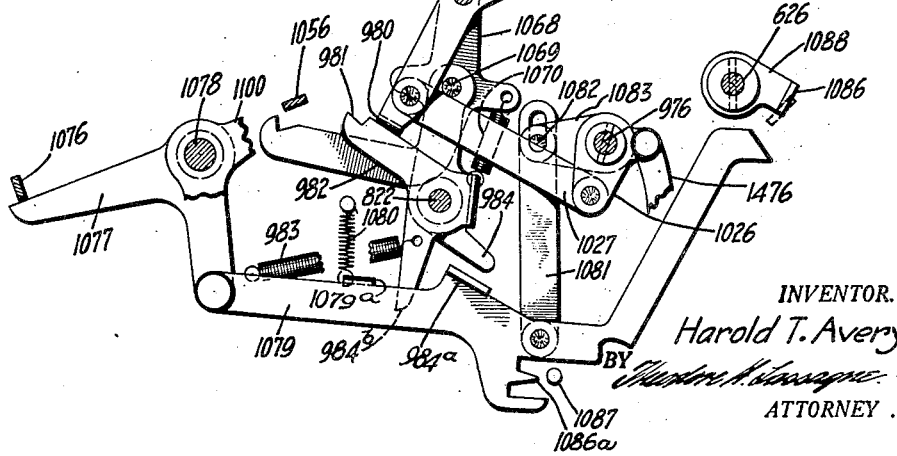

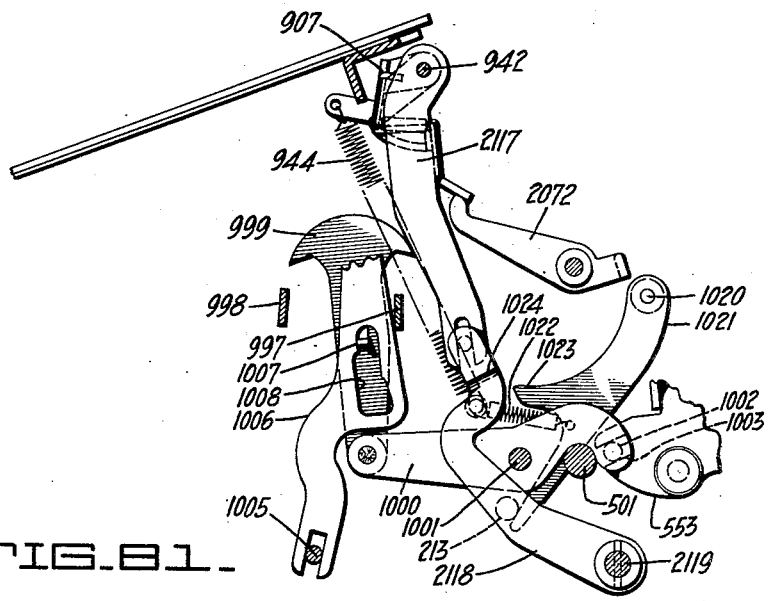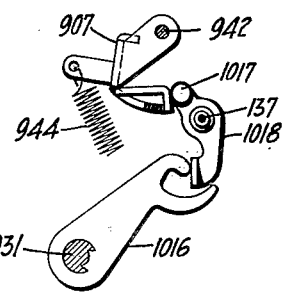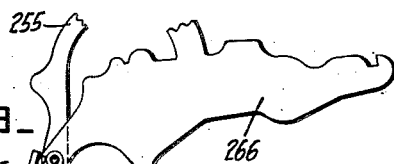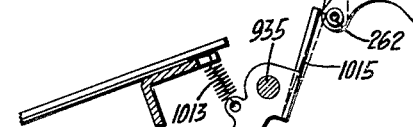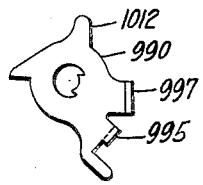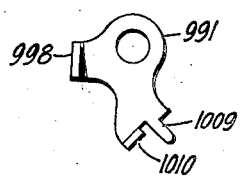

Aug. 13, 1940.   H. T. AVERY   2,211,736
CALCULATING MACHINE
Filed Dec. 18, 1933   44 Sheets-Sheet 34
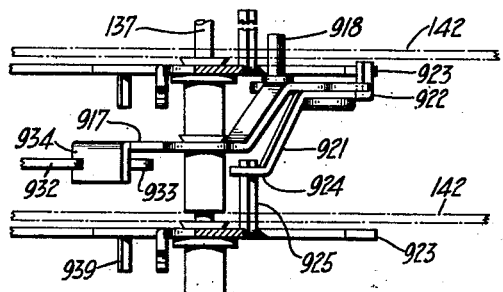
FIG_85_
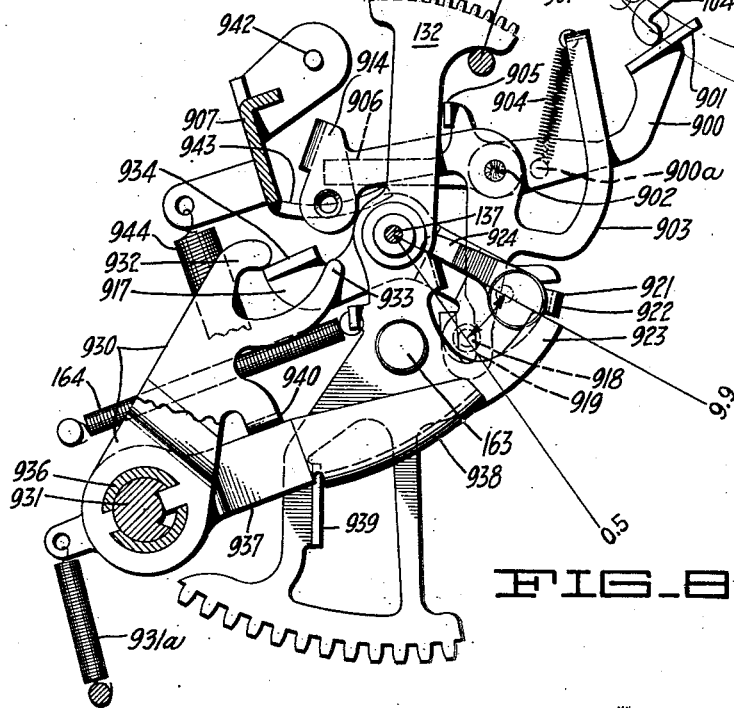
FIG_86_
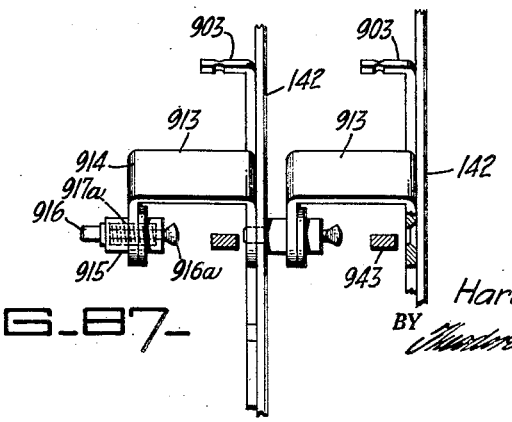
FIG_87_
INVENTOR.
Harold T. Avery
BY
ATTORNEY.

Aug. 13, 1940.          H. T. AVERY                2,211,736
                    CALCULATING MACHINE
              Filed Dec. 18, 1933    44 Sheets—Sheet 36
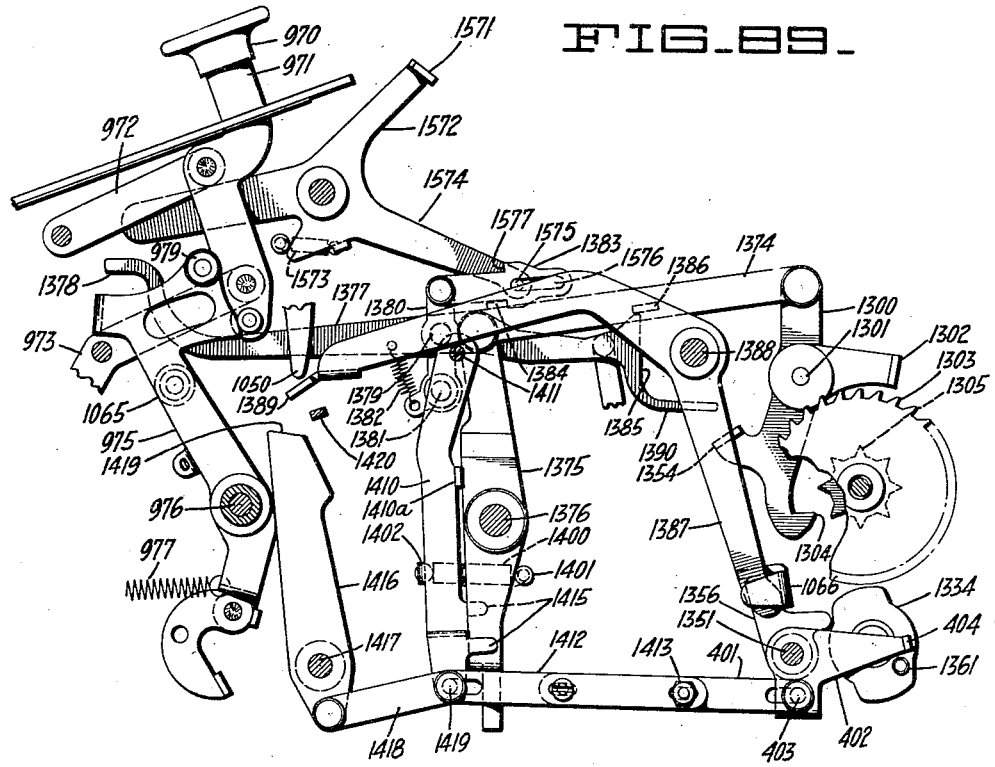
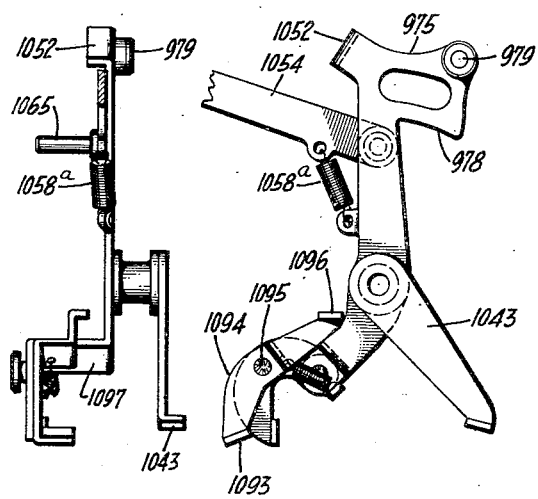
FIG.90.A    FIG.90.B
INVENTOR.
Harold T. Avery
BY
ATTORNEY.

Aug. 13, 1940.                H. T. AVERY                    2,211,736
                         CALCULATING MACHINE
                   Filed Dec. 18, 1933    44 Sheets-Sheet 37
FIG_91_
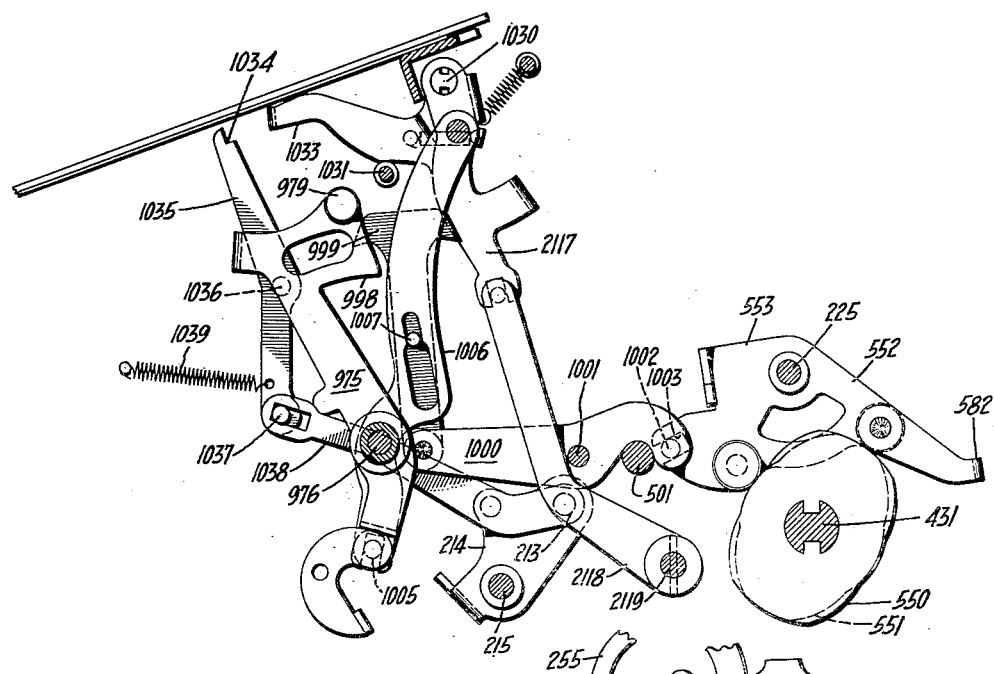
FIG_93_
FIG_92_
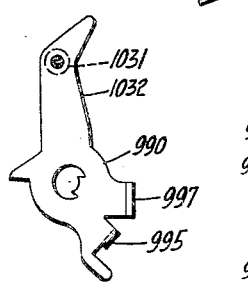
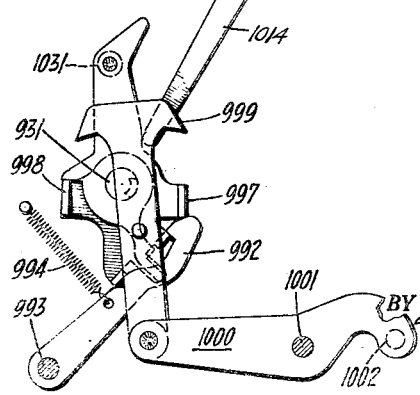
FIG_94_
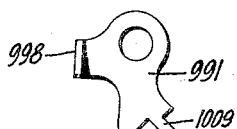
INVENTOR.
Harold T. Avery
BY
       ATTORNEY.

Aug. 13, 1940.　　　　H. T. AVERY　　　　2,211,736
CALCULATING MACHINE
Filed Dec. 18, 1933　　44 Sheets-Sheet 38
FIG_95_
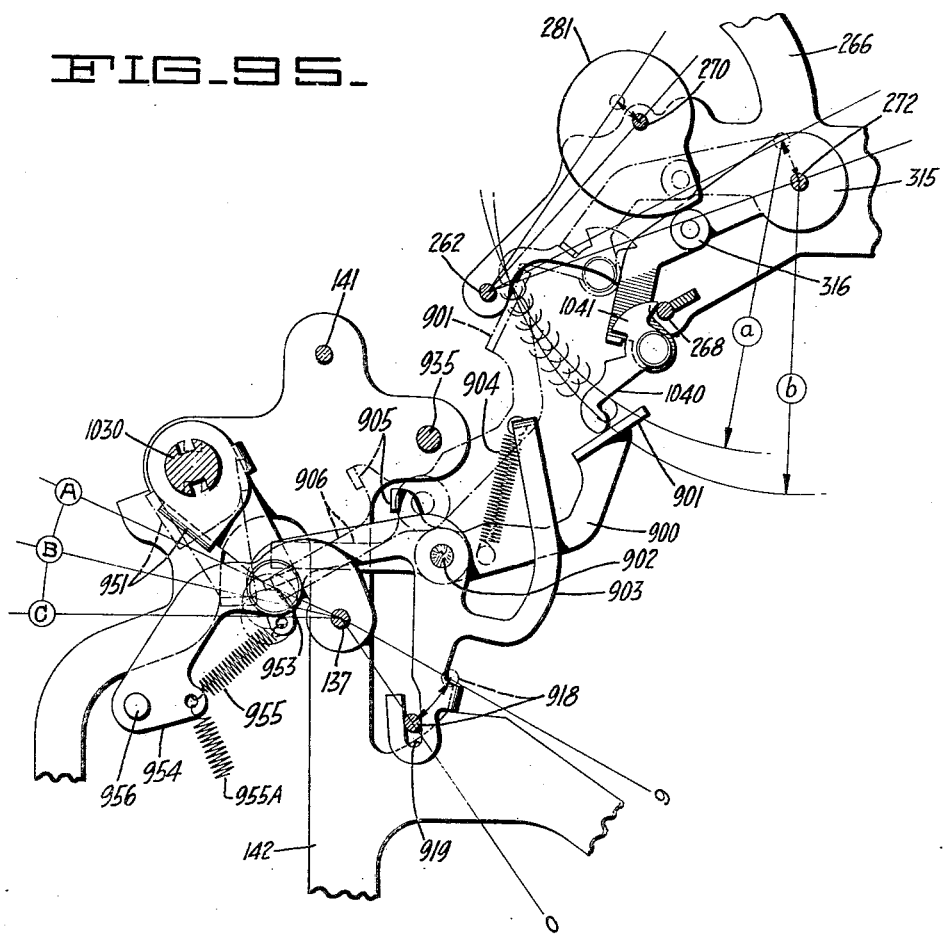
INVENTOR.
Harold T. Avery
BY
ATTORNEY.

Aug. 13, 1940. H. T. AVERY 2,211,736
CALCULATING MACHINE
Filed Dec. 18, 1933 44 Sheets-Sheet 40
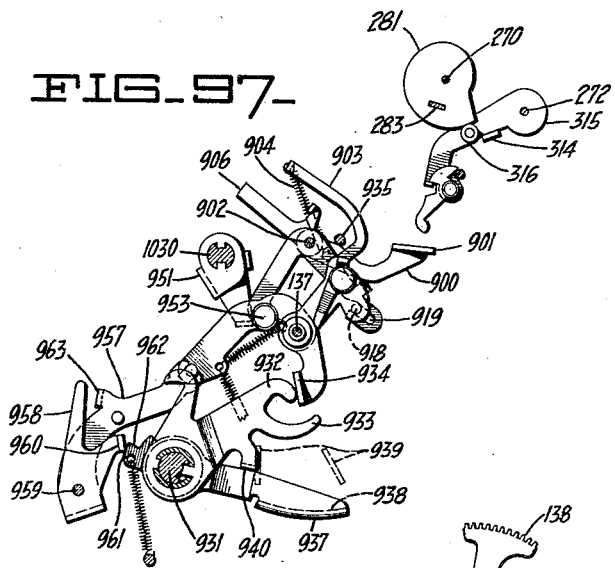
FIG_97_
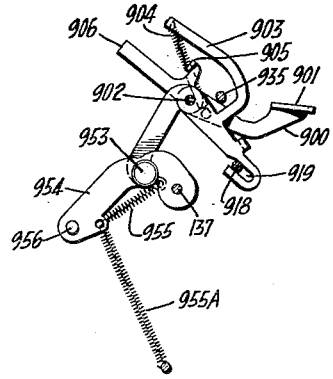
FIG_98_
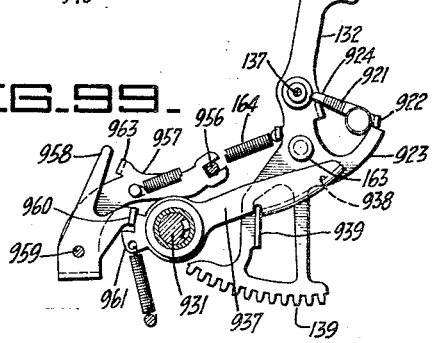
FIG_99_
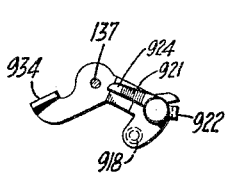
FIG_100_
FIG_101_
INVENTOR.
Harold T. Avery
BY
ATTORNEY.

Aug. 13, 1940.　　　H. T. AVERY　　　2,211,736
CALCULATING MACHINE
Filed Dec. 18, 1933　　　44 Sheets-Sheet 41
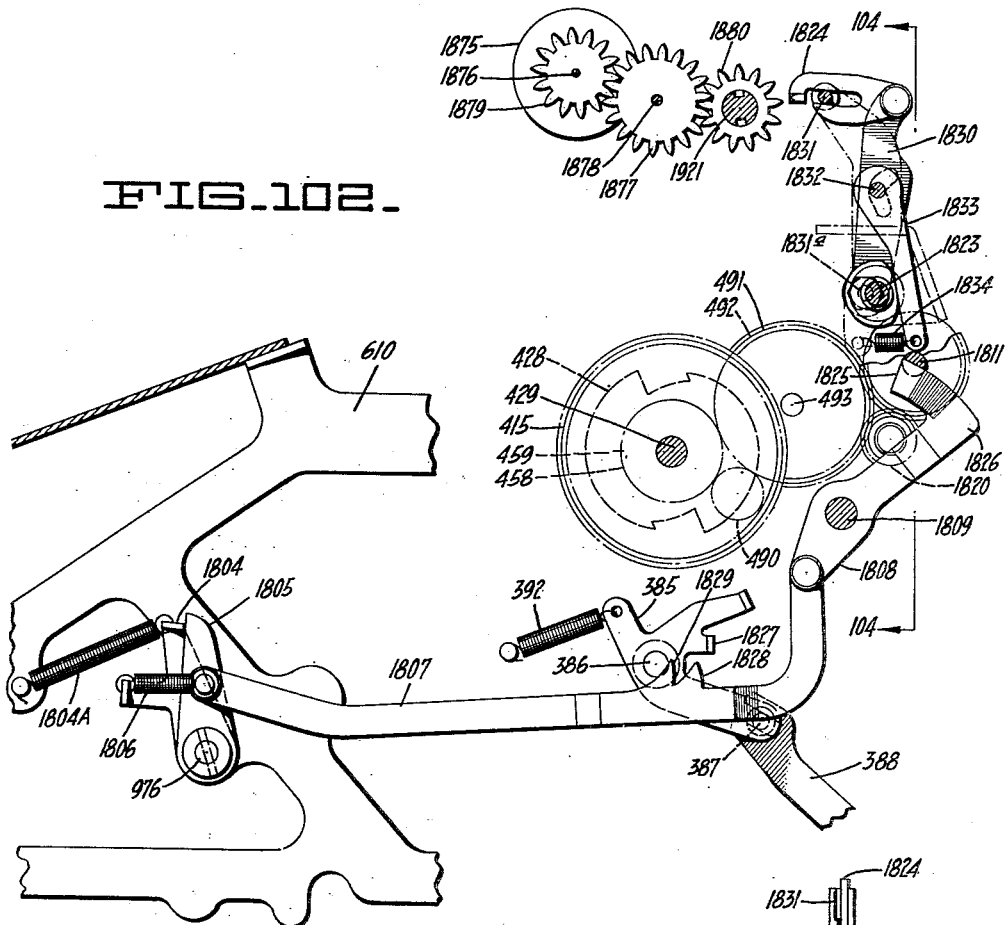
INVENTOR.
Harold T. Avery
BY
ATTORNEY.

Aug. 13, 1940.     H. T. AVERY     2,211,736
CALCULATING MACHINE
Filed Dec. 18, 1933     44 Sheets-Sheet 42
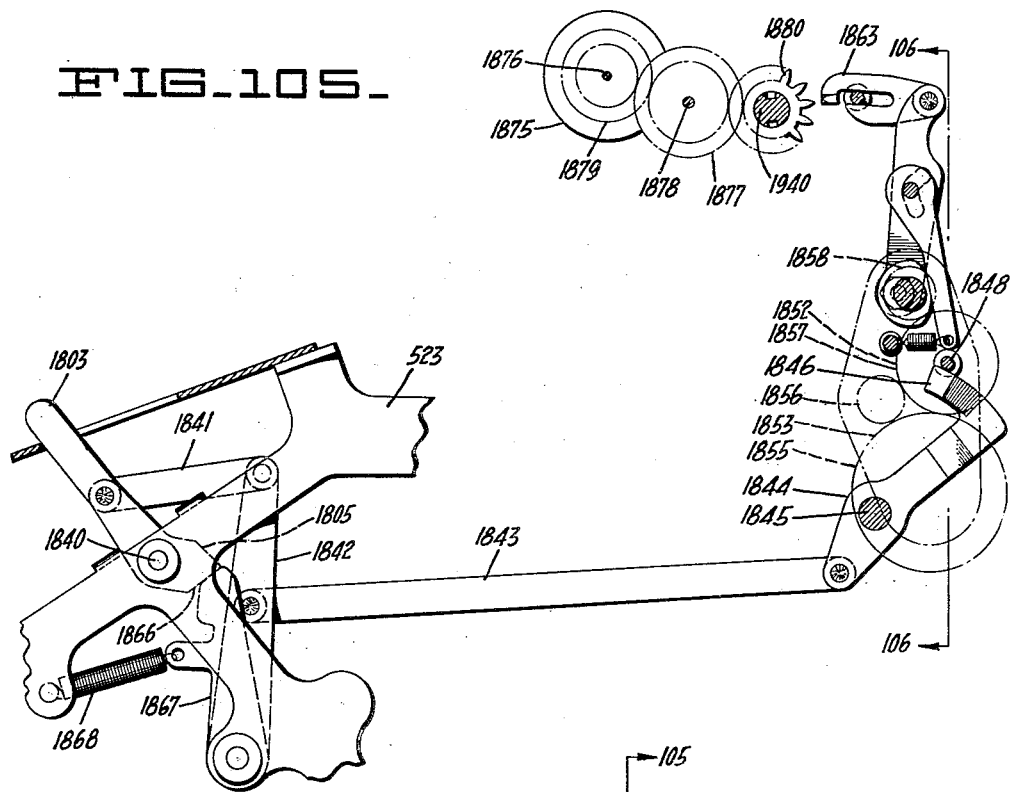
FIG_105_
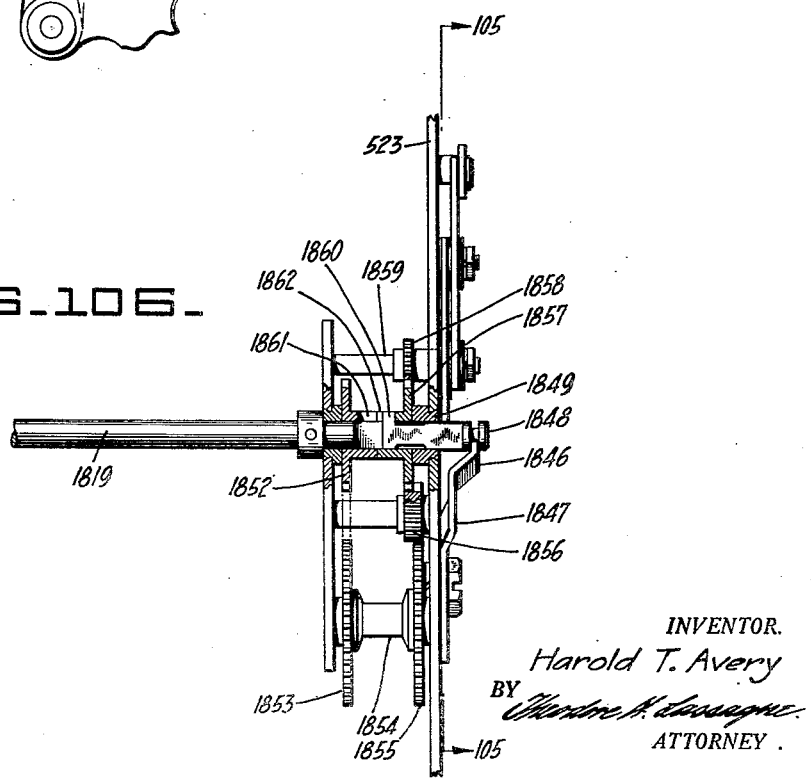
FIG_106_
INVENTOR.
Harold T. Avery
BY
ATTORNEY.

Aug. 13, 1940.    H. T. AVERY    2,211,736
CALCULATING MACHINE
Filed Dec. 18, 1933    44 Sheets-Sheet 43
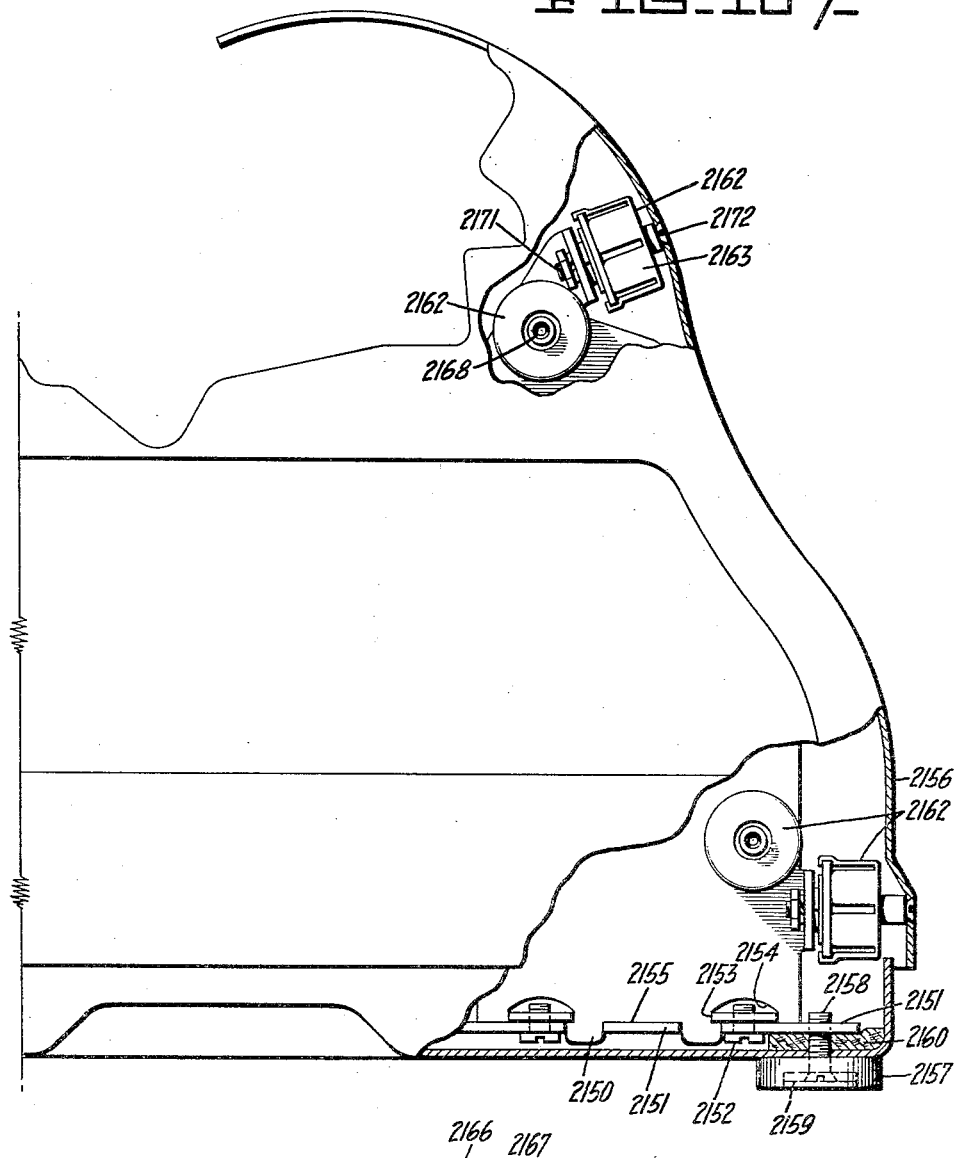
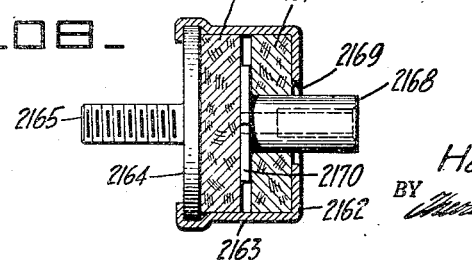
INVENTOR.
Harold T. Avery
BY
ATTORNEY.

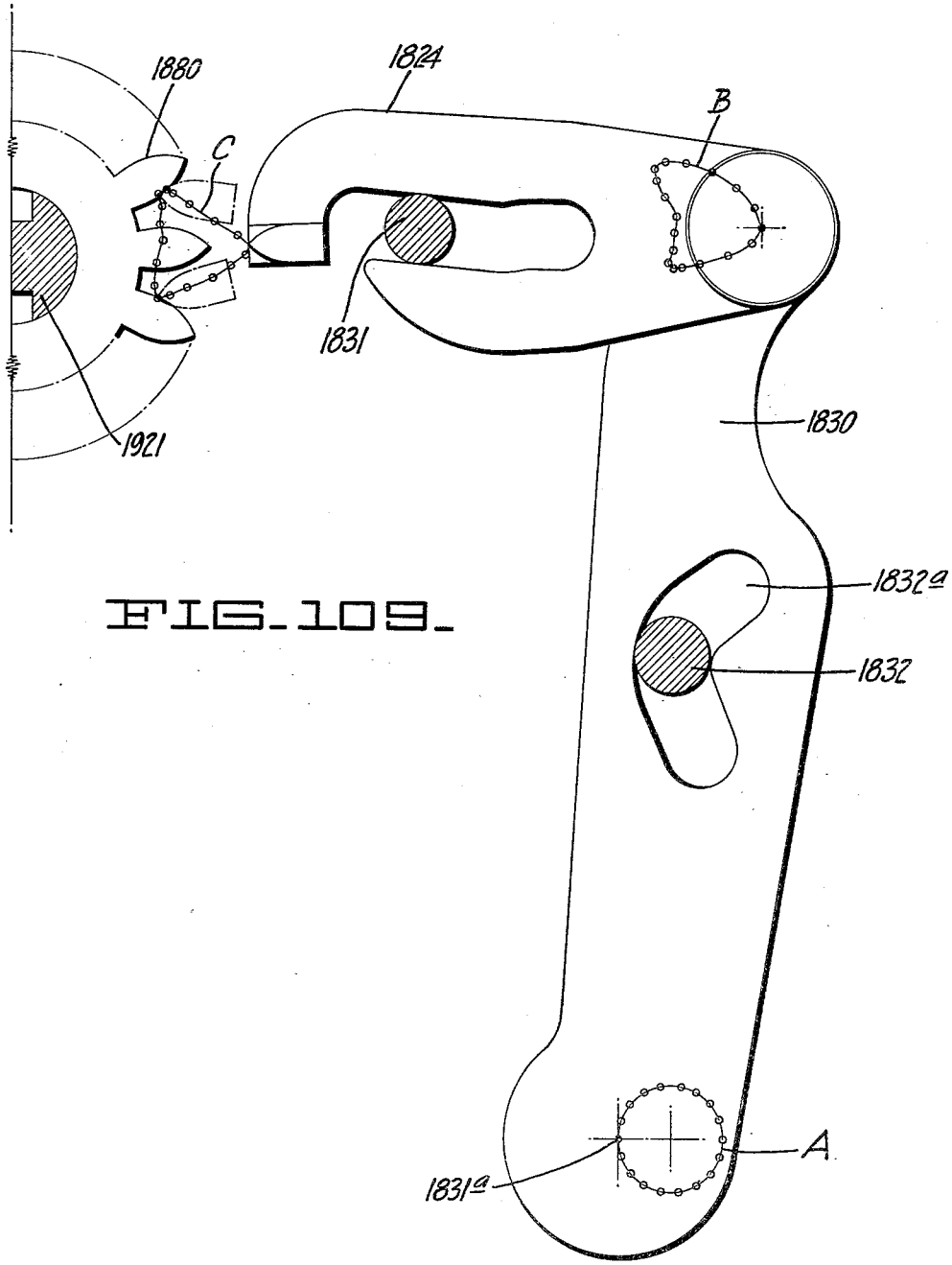

Patented Aug. 13, 1940

2,211,736

UNITED STATES PATENT OFFICE 2,211,736

CALCULATING MACHINE

Harold T. Avery, Oakland, Calif., assignor to Marchant Calculating Machine Company, a corporation of California Application December 18, 1933, Serial No. 702,949

12 Claims. (Cl. 235—63)

The present invention relates to calculating machines and has as its general object the provision of a high speed, quietly operating machine of the rotary type.

While the rotary type machine has always had certain obvious advantages over other types, most rotary machines commercially produced have operated their registering mechanisms intermittently, giving rise to overthrowing thereof at high speeds, and in attempting to prevent such errors, noisy spring pressed pawling mechanisms have been incorporated.

The present machine overcomes such disadvantages by retaining the registering mechanism constantly in mesh with its actuators throughout the period of operation of such actuators. Since both the actuators and the registering mechanism are arrested before such engagement is broken, no auxiliary overthrow preventing devices are necessary and the noise incident to the operation of such devices is avoided. At the same time, the speed of such a machine can be much higher than that of a machine depending for accuracy upon the proper functioning of such auxiliary devices.

The provision of automatic division, multiplication, and other controls for a machine of this type, however, presents unique problems which the present invention has overcome as fully set forth hereinafter.

It is an object of the invention to provide an improved mechanism for the automatic control of division computations.

It is an object of the invention to provide an improved mechanism for the automatic control of multiplication computations.

It is an object of the invention to provide an improved form of duplexing accumulator adapted for continuous multicyclic operation in either direction.

It is an object of the invention to facilitate the assembly and timing of the planetary assemblies used in such accumulators.

It is an object of the invention to provide an improved mechanism for resetting to zero, registering mechanism of the type disclosed.

It is an object of the invention to provide a novel form of key top permitting closer spacing of the rows of keys without interference.

It is an object of the invention to provide a keyboard structure in which all keys, including the row releasing keys, are of identical construction, facilitating quantity production.

It is an object of the invention to provide a novel arrangement for preventing premature release of keys by inadvertent operation of the row release keys.

It is an object of the invention to provide a keyboard having a light and equalized touch.

It is an object of the invention to provide a keyboard composed of removable sections separately adjustable as to their cooperative relation with the machine.

Other objects will appear during the following detailed description of a preferred form of the invention, reference being had to the accompanying drawings forming a part of this specification, in which:

Figure 2 is a section in side elevation, illustrating the keyboard for selecting a value and a portion of the actuator mechanism.

Figure 3 is a section taken along the line 3—3 in Figure 2, showing the typical construction and mounting of a key.

Figure 4 is a sectional detail of a check dial.

Figure 6 is an end elevation of a selection cam unit.

Figure 7 is a section taken along the line 7—7 in Figure 6, showing the construction of the cam unit.

Figure 8 is a diagrammatic view illustrating the position of the various cams during a zero selection, and the relationship between the cams and the several sensing levers therefor.

Figure 9 is a diagrammatic view to illustrate the relationship existing between various surfaces on the cam unit.

Figures 10 to 14 inclusive, are vertical sections taken through the selection unit of a single keyboard order, each section illustrating the arrangement typical for selecting a given value.

Figure 15 is a section along the line 15—15 of Figure 14, showing, in section, the assembled plates disclosed in connection with Figures 10 to 14, inclusive.

Figure 16 is a front elevation of the carriage, a portion of the cover plate being broken away to show the accumulator and counter mechanisms therein.

Figure 17 is a section on the line 17—17 in

Figure 16, showing the mechanisms for rocking certain shafts in the carriage.

Figure 18 is a section along the line 18—18 in Figure 16.

Figure 19 is a section along the line 19—19 in Figure 16.

Figures 20, 21, 22, and 24 are sections taken through the carriage to illustrate the construction of the accumulator and counter mechanisms, the sections being taken so as to bring out the interaction and relationship between certain of the parts.

Figure 23 is a fragmentary view illustrating mechanism utilized in connection with the left hand counter register.

Figure 25 is a front elevation, partly in section, of two dial assemblies, illustrating the manner of construction thereof.

Figure 26 is an exploded perspective view of a dial assembly.

Figure 27 is a side elevation illustrating a modified construction of a dial unit.

Figure 28 is a section taken along the line 28—28 of Figure 27.

Figure 29 is a plan view of a modified form of snail cam.

Figure 30 is a side elevation, partly in section, of mechanism for clearing the accumulator and the counters.

Figure 31 is a rear elevation of certain mechanism shown in Figure 30.

Figure 32 is a plan view of the main clutch.

Figure 33 is a side elevation of the main clutch.

Figure 34 is a side elevation, partly in section, of the main clutch, the view being taken generally along the section line 34—34 of Figure 35.

Figure 35 is a section taken along the line 35—35 in Figure 34, illustrating details of the clutch construction.

Figure 36 is a side elevation of the reverse control unit and its controlling mechanism.

Figures 37A, 37B, and 37C are views illustrating certain of the parts utilized in controlling the reverse unit.

Figure 38 is a longitudinal section taken through the reverse unit.

Figure 39 is a section taken along the line 39—39 in Figure 38.

Figure 40 is a fragmentary side elevation of mechanism for controlling the reverse unit.

Figure 41:
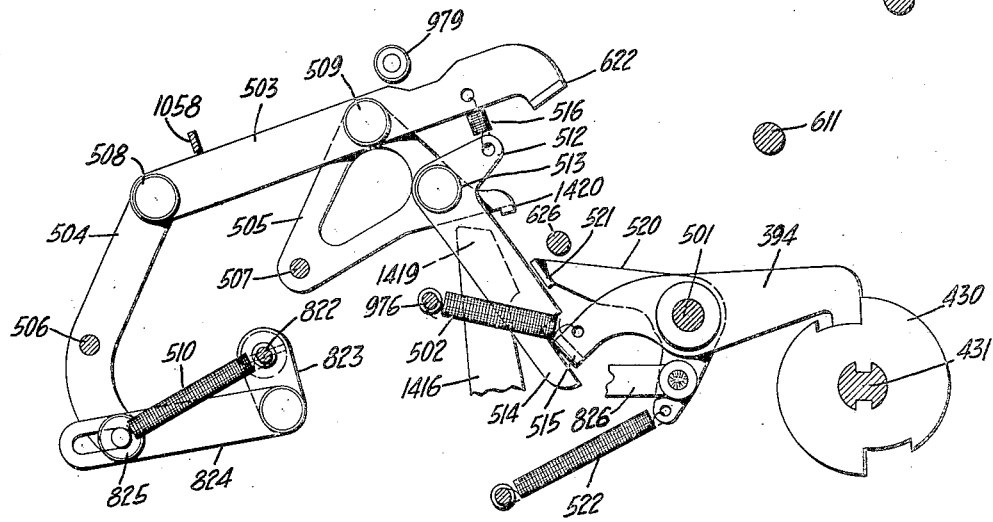

Figure 41 is a side elevation of the mechanism for controlling the setting clutch.

Figure 42:
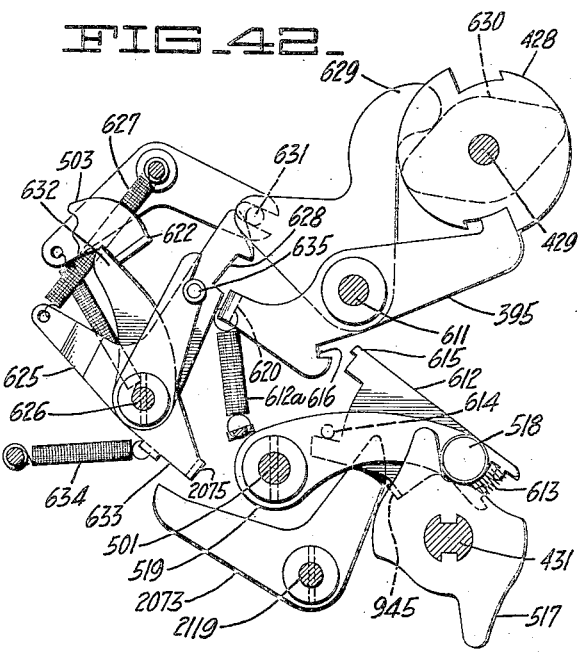

Figure 42 is a side elevation of the mechanism for controlling operation of the main clutch.

Figure 43:
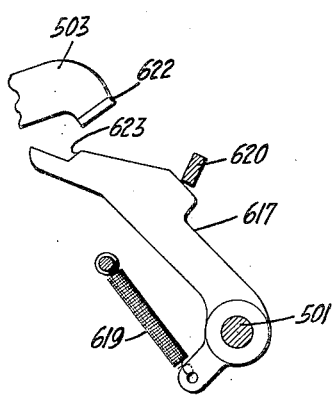

Figure 43 is a detail view illustrating an interlock mechanism between the main clutch and the main operating bar shown in Figure 41.

Figure 44:
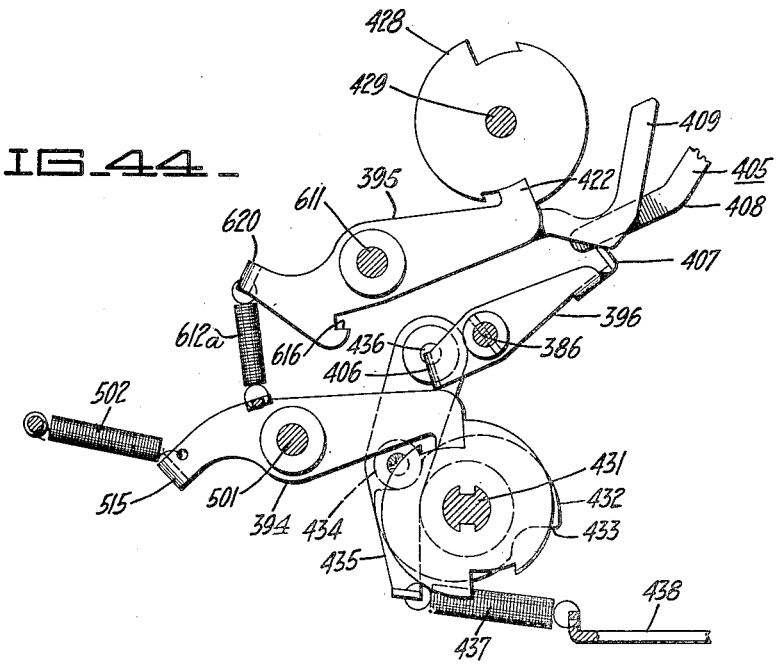

Figure 44 is a side elevation of circuit controls and other mechanism associated with the main clutch and the setting clutch.

Figure 45:
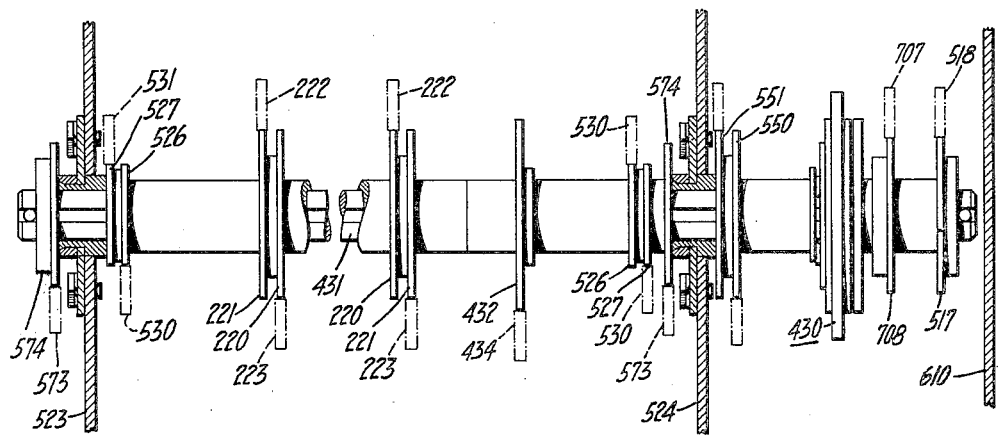

Figure 45 shows the various cams positioned upon the setting clutch shaft.

Figure 46:
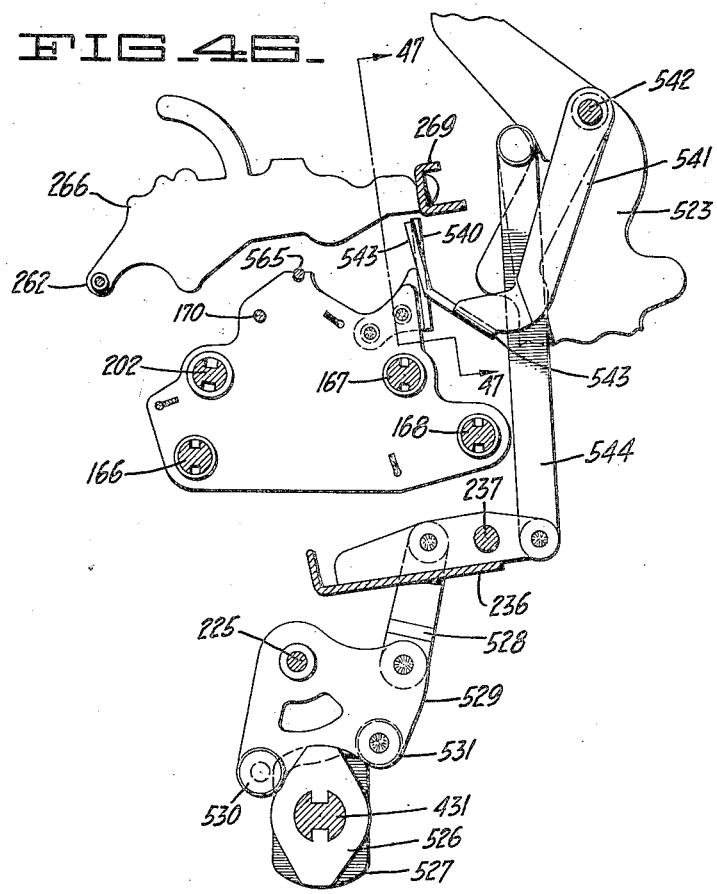

Figure 46 is a view illustrating, partly in side elevation, mechanism for centralizing the dipping carriage.

Figure 47:
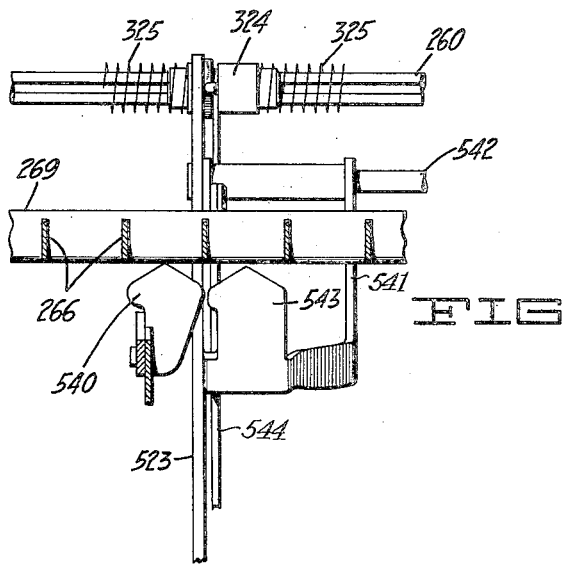

Figure 47 is a front elevation showing the centralizing means for the dipping carriage.

Figure 48:
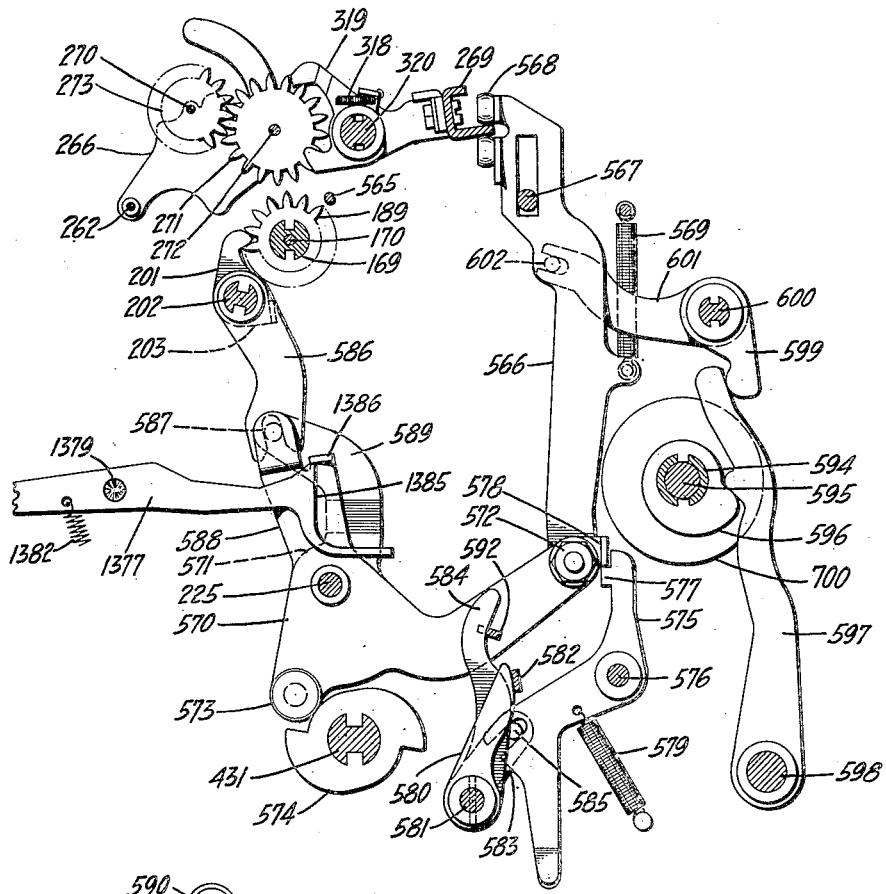

Figure 48 is a side elevation, partly in section, illustrating the carriage dipping mechanism and certain mechanism utilized in connection with the shift operation of the carriage.

Figure 49:
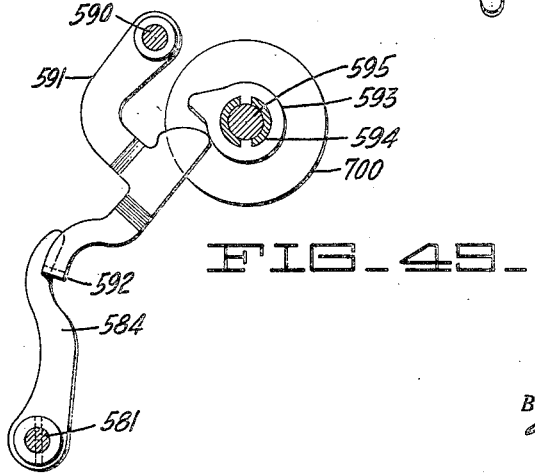

Figure 49 illustrates certain details of the mechanism utilized in connection with the carriage dipping mechanism.

Figure 50 is a detail view showing the restore clutch and mechanism for controlling this clutch.

Figure 51 is a section taken on the line 51—51 in Figure 50, illustrating the construction of the spring link.

Figure 52 is a detail view which illustrates the mechanism for centralizing the quarter and half speed shafts in the actuator.

Figure 53 is a schematic view showing the various units insofar as their relationship to the driving means therefor is concerned.

Figure 54 is a detail view which shows the construction of the the supports for the addition and subtraction bars.

Figure 55 is a detail view which shows the mechanism operated by the addition and subtraction bars, as does Figure 56.

Figure 57 is a detail view which shows the reverse control from the addition and subtraction bars, as well as the interlock between these bars.

Figures 57A and 57B are detail views which illustrate a unit and a construction utilized in connection with the manual setting of the reverse control unit.

Figure 58 is a detail view which illustrates the mechanism for clearing the selection keyboard by depression of the clear key, as well as mechanism for clearing the keyboard automatically.

Figure 59:
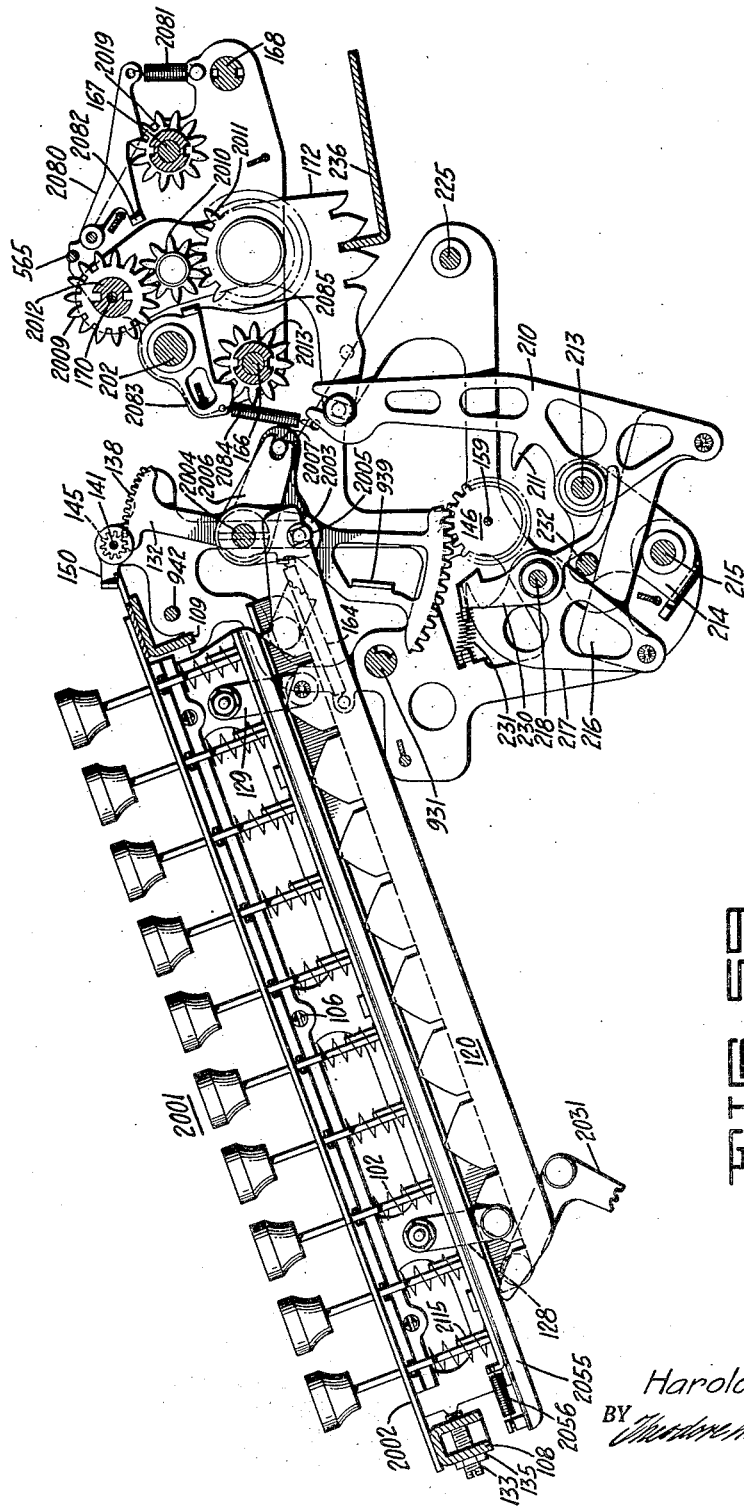

Figure 59 is a vertical section through the multiplier unit, illustrating the manner in which selection may be made of a multiplier value.

Figure 60 is another vertical section taken through the multiplier unit, showing certain details of construction and control thereby.

Figure 61 is a sectional detail showing mechanism for controlling a multiplication operation in connection with a multiplier unit.

Figure 62 is a section taken on the line 62—62 in Figure 61.

Figure 63 illustrates details of the construction of certain levers utilized in the multiplier control unit.

Figure 64 is a sectional side elevation showing certain of the mechanism utilized for effecting a power shift of the carriage.

Figure 65 is a sectional view taken in part along the line 65—65 in Figure 64, showing the construction of the shift unit and its connection to the carriage.

Figure 66 and Figure 67 illustrate details of the control mechanisms for the shift.

Figure 68 is a section side elevation which illustrates the mechanism utilized in connection with the tabulating key and the back space key as well as the mechanism operated by the zero multiplier key.

Figure 69 is a detail view which illustrates a portion of the mechanism utilized in connection with the tabulating mechanism.

Figure 70 is a sectional view along the line 70—70 in Figure 69 showing the connection of the tabulator key to certain portions of the tabulator mechanism.

Figure 71 is a front elevation of a portion of the tabulating control mechanism.

Figure 72 is a longitudinal section in plan, taken through the tabulating control mechanism.

Figure 73 illustrates the details of construction of the dial associated with the tabulator knob.

Figure 74 is a plan view showing the arrangement of the tabulating control mechanism in the frame of the machine, and the relation of this control mechanism to the carriage.

Figure 75 is a detail view illustrating certain of the mechanism controlled by the addition and subtraction bars, as well as control of the division control member by the division key and the relation to the restore clutch mechanism.

Figure 76 is a fragmentary view illustrating in detail certain of the mechanism shown in Figure 75.

Figure 77 is a side elevation showing certain of the division control mechanisms.

Figure 78 is a detail view showing the stop key and the shift control lever.

Figure 78A is a detail view which illustrates the constructions of a shift control key.

Figure 79 is a detail view which illustrates in detail the manner of support of the division key.

Figure 80 is a detail view which illustrates the manner of control of the division sensing mechanism and the division gate.

Figure 81 is a fragmentary view illustrating certain mechanism utilized for rocking out the division gate.

Figure 82 is a detail of a member utilized in controlling the shaft controlling certain of the division mechanism.

Figure 83 illustrates, in side elevation, mechanism for preventing a shift of the carriage during a division operation, as well as certain mechanisms for operating a shaft which controls the division mechanism.

Figure 84 is a detail of a member utilized in connection with the rocking of the forementioned shaft.

Figure 85 is a plan view illustrating a portion of the division mechanism, particularly the means for transmitting from a lower order to the next higher order, the decimal value of the value set in the lower order.

Figure 86 is a side elevation illustrating the relation of division sensing mechanism to the accumulator mechanism and the manner of control thereof.

Figure 87 is a fragmentary view showing the manner of support of certain of the division mechanism between the brace plates of the machine.

Figure 88:
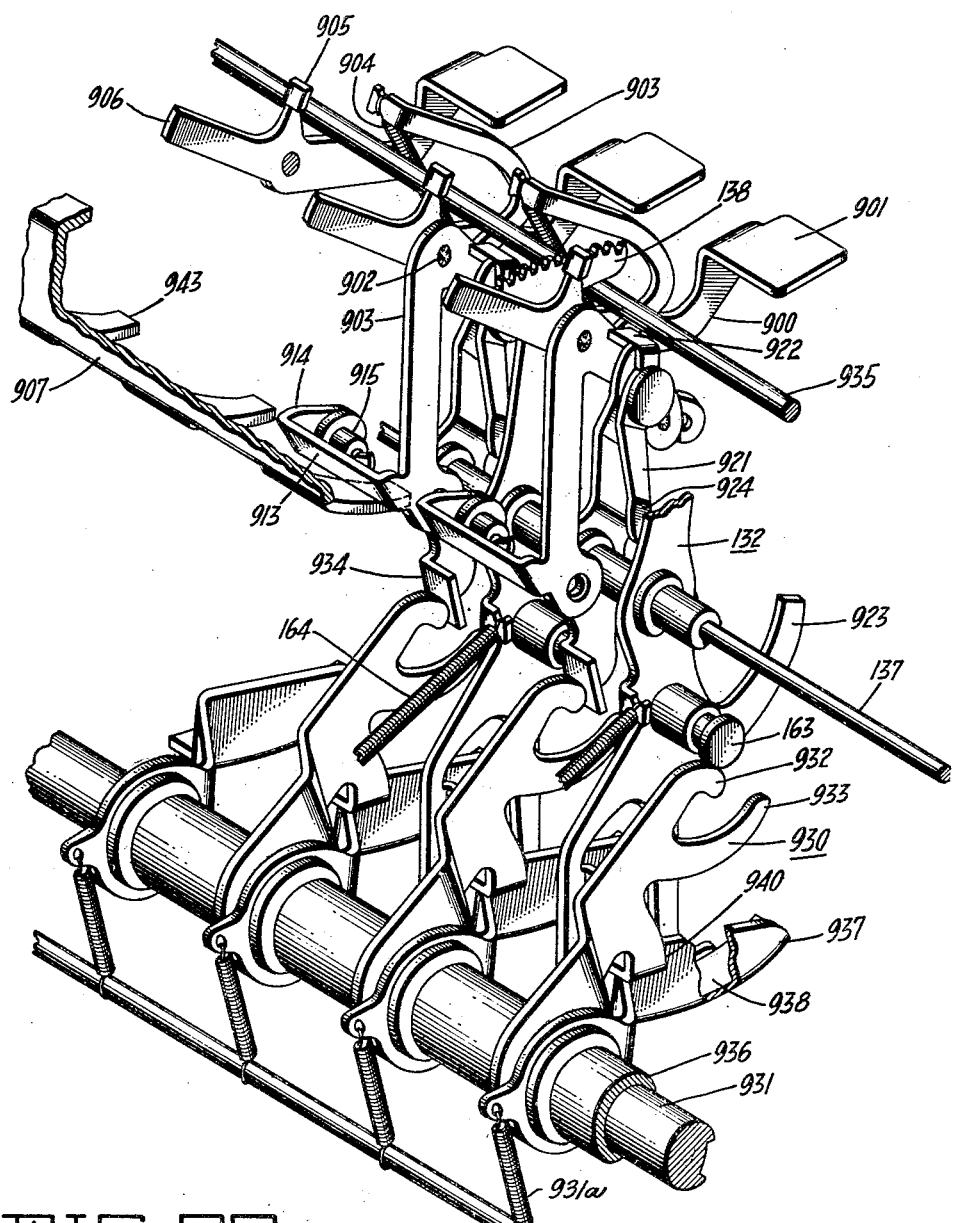

Figure 88 is a perspective view illustrating certain of the division sensing mechanism and its manner of control.

Figure 89 is a side elevation illustrating control of the division control member by the division key, as well as certain mechanism utilized in connection with control of the shift unit.

Figures 90A and 90B are views illustrating the construction of the division control member.

Figure 91 illustrates a modified form of control mechanism for the gate as well as the delay latch for preventing operation of the gate until a certain period in the operation has been reached.

Figures 92, 93, and 94 illustrate a modification of certain mechanism for preventing a shift of the carriage during division operations, as well as for rocking a shaft controlling the division sensing mechanism.

Figure 95 is a side elevation of the modified form of division mechanism which may be employed.

Figure 96:
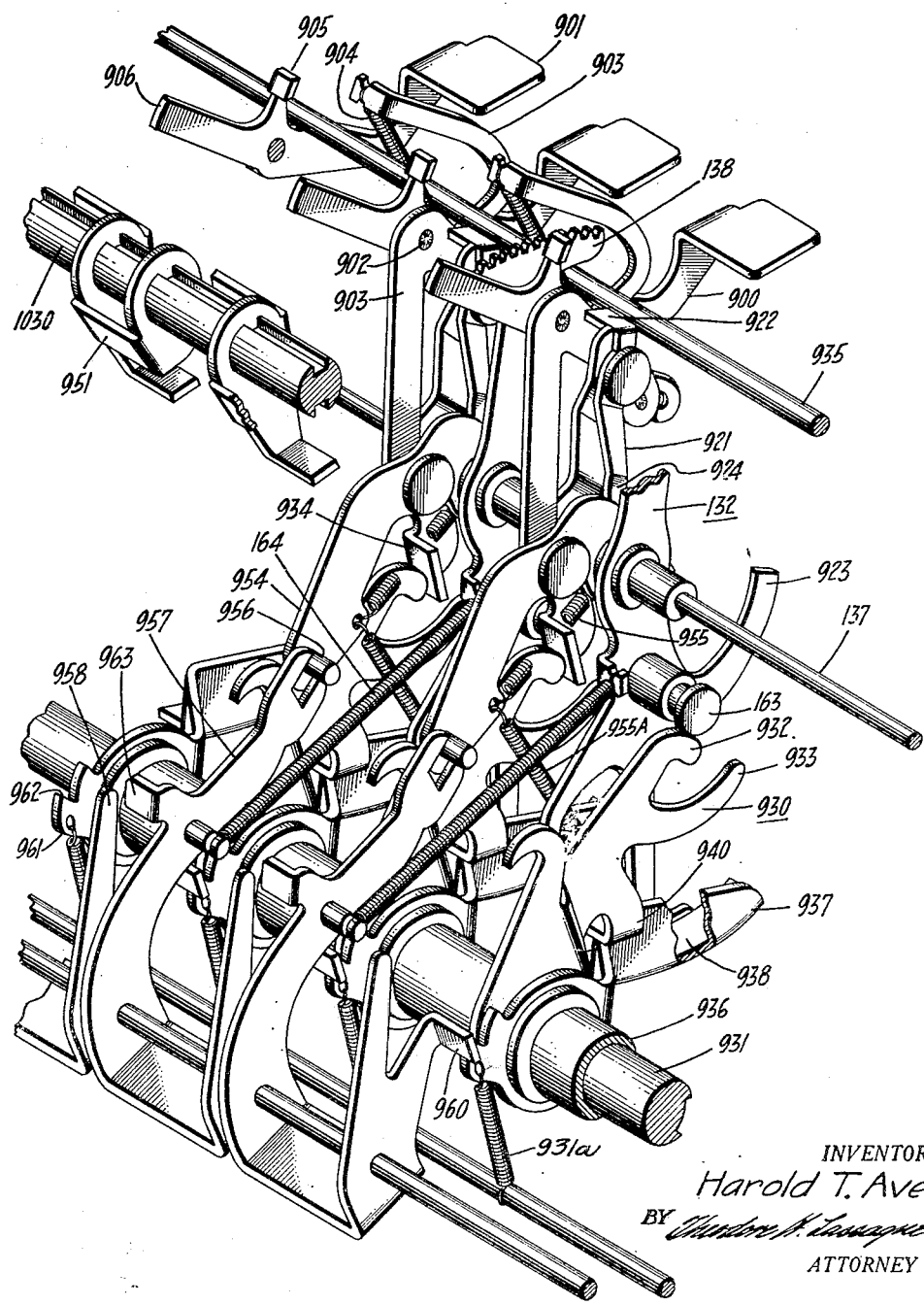

Figure 96 is a perspective view of a modified form of division mechanism, illustrating the manner of construction of the gate and the mechanism for securing a stagger between the controlling order, the tens and hundreds order.

Figures 97 to 101 inclusive, are fragmentary views and side elevations, illustrating the manner of construction of the modified division mechanism.

Figure 102 is a side elevation, partly in section, of the counter control mechanism, and actuating mechanism utilized in connection with the counter register 1801.

Figure 103 is a section along the line 103—103 in Figure 104.

Figure 104 is a section taken along the line 104—104 in Figure 102, illustrating the mechanism for actuating the counter actuator as well as the control thereof.

Figure 105 is a sectional side elevation, taken generally along the line 105—105 in Figure 106, to illustrate the control mechanism for the left hand counter register as well as the mechanism for actuating that counter register.

Figure 106 is a section taken along the line 106—106 in Figure 105, illustrating the actuating means for the counter register.

Figure 107 is a side elevation, partly in section, showing the frame construction and the support for the casing.

Figure 108 is a detailed sectional view of the mounting means utilized in connection with the casing.

Figure 109 is an enlarged detail view of the counter operating mechanism, illustrating its movement diagrammatically.

The following copending applications claim certain subject matter disclosed but not claimed in the present application: Serial No. 653,207 filed January 23, 1933; Serial No. 84,927 filed June 12, 1936; Serial No. 104,471 filed October 7, 1936; Serial No. 159,523 filed August 17, 1937; Serial No. 217,993 filed July 7, 1938; Serial No. 228,613 filed September 6, 1938; Serial No. 305,311 filed November 20, 1939; Serial No. 313,918 filed January 15, 1940; Serial No. 314,597 filed January 19, 1940; Serial No. 315,055 filed January 22, 1940; and Serial No. 329,281 filed April 12, 1940.

MANUALLY SET SELECTION MECHANISM

The machine of the present invention is of the key set type in which means are provided for first setting one factor of a calculation upon a keyboard or equivalent mechanism, and subsequently operating the machine in a manner indicated by the character and amount of another factor of the calculation.

The mechanism for setting up the first factor may be considered as comprising a manually operated and a power operated portion, the manually operated portion being designed to be moved to a selected controlling position by the depression of keys or the setting of equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard. By such a division of the function of setting the first factor into the machine, the mechanical work done by the keys and hence the resistance to their depression is considerably diminished. Furthermore, the keys can be released and started on their return to the raised position as soon as the power operated portion of the machine acts. This permits very rapid operations, for the keys are returning to position during operation of the calculating mechanism and their return is not delayed until that mechanism has operated fully. Since the keys are not relied upon to hold the calculating mechanism in proper adjustment during a calculation, the first factor of a subsequent calculation may be set up on the keyboard while the first calculation is being performed by the machine, thus speeding up the machine additionally.

Figure 1:
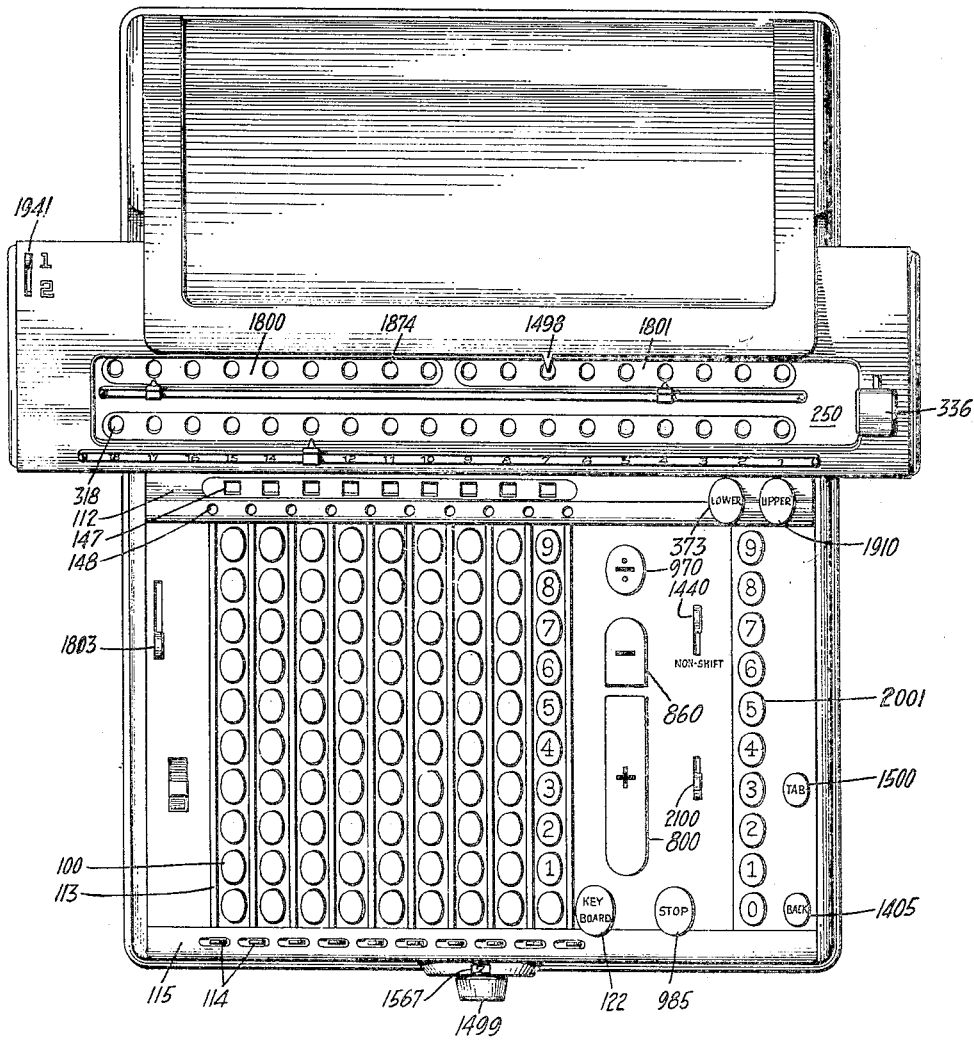
Figure 1 is a plan view of the machine of the present invention, showing the keyboard, carriage, and the several controls.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

In order to provide a compact keyboard requiring less travel of the operator's hand in setting operations and having certain other advantages, and to avoid decreasing the size of the key tops in proportion to the decrease of the spacing between rows of keys, the present invention contemplates the provision of specially shaped key tops which have a major dimension lying along the line of the key sections and a lesser lateral dimension.

Figure 5:
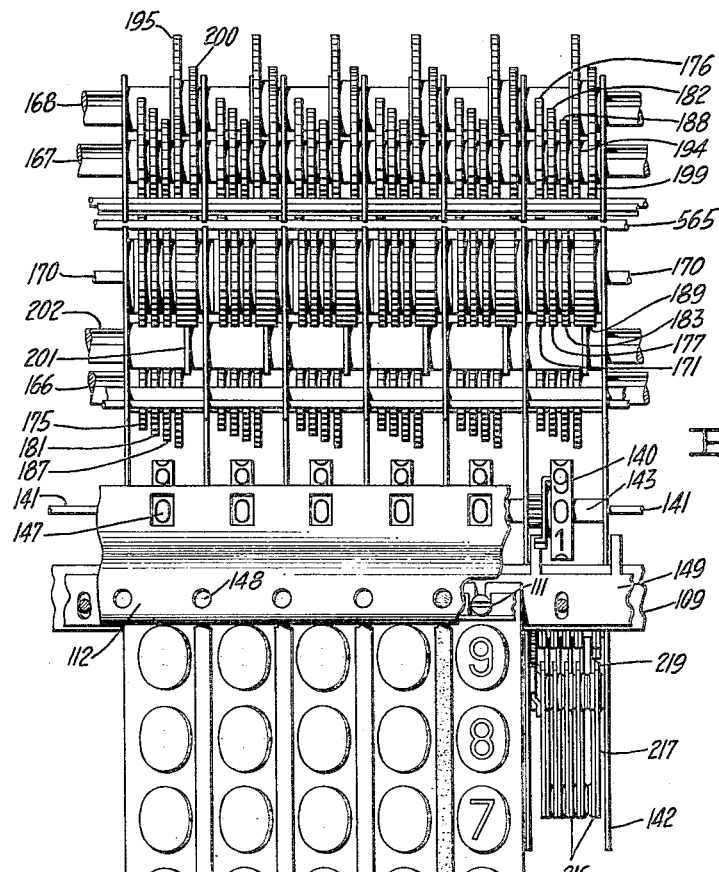
Figure 5 is a section taken generally along the line 5—5 in Figure 2, illustrating the arrangement of the keyboard and the actuator mechanism.
Figure 5A:
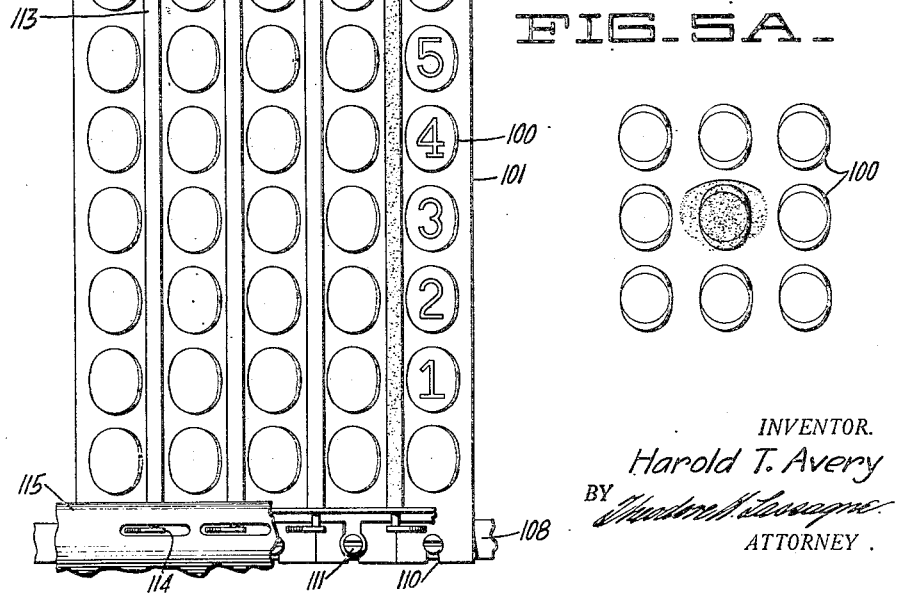
Figure 5A is a diagrammatic view illustrating the utility of oval keys.

In the preferred embodiment disclosed in Figures 1 and 5, oval key tops are shown, although the form might, alternatively, be made quadrangular. Figure 5A illustrates, diagrammatically, the advantages of compactness, et cetera, obtainable by the adoption of this key form.

Any decrease of the spacing between key stems has heretofore been accompanied by a proportionately doubled decrease in the diameter of the key tops in order to prevent interference with an adjacent key by the finger tip of the operator. To follow this practice in a machine using the key stem spacing of that herein disclosed would have necessitated the use of key tops of the size illustrated by the small circles within the ovals of Figure 5A, thus effecting an objectionable increase in the pressure per unit area on the operator's finger tip, as well as enhancing the possibility of its sliding off the key during rapid operation.

By the use of keys dimensioned according to the present invention, however, the factor of safety against depressing laterally adjacent keys is just as large as with the small circular key tops since the minor axis of the novel key top is no larger than that of the circular key. Since the form of the operator's finger tip is oval, as illustrated by the stippled area of Figure 5A, it will be apparent that no smaller factor of safety against depression of adjacent keys of the same key section is involved in the increase of the major axis of the key than is allowed between laterally adjacent keys, and such increase of this axis, by providing a larger surface, correspondingly decreases the pressure per unit area on the finger. Likewise, since the finger ordinarily approaches the key along a line forming an acute angle in a vertical plane coinciding with the major axis of the key top, the possibility of the finger slipping off the key top in rapid operation is also decreased by increasing this major axis.

The construction of one bank of keys is shown in Figures 2 and 3 on sheet 2 of the drawings. Each key section comprises the usual number of value keys 100, which are slidably mounted in a channel key frame 101 and are normally maintained in raised position by suitable coil springs 102. The key stems 103 are assembled into the channel frame 101 (see Figure 4) by insertion from the top, the slot in the upper side of the channel member being of sufficient width to pass the projection 104 of the key stem, but the registering slot in the lower side being of lesser width, preventing the key stem from dropping through and also adapted to contact projection 104 to provide a limiting stop in operation of the mechanism.

After insertion of the key stems, strip 105 is secured in place by means of screws 106, thus blocking a portion of the upper slot and preventing withdrawal of the key stems. Strip 105 also carries a strip 107 of rubber or other resilient material against which projections 104 abut when the key stems 103 are pressed upward by their springs. This serves to diminish the noise ordinarily incident to the release of keys from their latching means and their return to raised position.

Each key section is mounted in the machine between members 108 and 109 which extend between the side plates of the machine. Each end of the channeled key frame 101 is slotted as at 110 (Figure 5) so that the position of the key section may be varied, each key section being secured in the desired position by the screws 111. After the several key sections have been positioned and shielding plate 112 is in place, flat decimal markers 113 are positioned and suitably journaled between each bank of keys. A knurled finger piece 114 extends through a cover member 115 so that the flat decimal marker can be rotated to expose either of its sides, the markers being shown in the two different positions in Figure 5 and in Figure 2 in a position occupied while the markers are being turned. As is well known, one side of these markers is colored to correspond with the coloring of the top of channels 101 while their other side is colored to contrast therewith so that by turning selected markers, the keyboard may be set off in any desired manner.

All the key stems are of the same length and each has a cam extrusion 116 which, upon depression of the key, pushes a slotted key locking slide 117, slidably supported on the lower side of channel 101, to the right, as viewed in Figure 2, releasing any other latched down key in the same section. Upon full downward depression of the respective key stem, this slide, pressed forward by spring 118, snaps back to initial location and by overlying the upper end of extrusion 116, locks the depressed key.

The leftmost key (Figure 2) in each section, is the zero or clear key, and is provided for the sole purpose of releasing any latched down key in the same section. The stem and extrusion 103 of this key are identical with the other keys of the section, but latching down of the key is prevented by the provision, on the locking slide 117, of a lip 119, the lower edge of which lies below the lowest position assumed by the top of extrusion 116. Hence, while the slide is moved to the right upon depression of this key, the lip 119 prevents it from returning leftward during the depression of the key, and latching of the key can not be effected.

When a numeral key stands depressed and it is desired to depress a different numeral key in the same section, the first key must be released during the first part of the stroke of the second key in order to avoid interference between the respective key stems in moving the V-slot bar 120. For this reason the lower edges of extrusions 116 normally lie closely adjacent the locking slide 117. However, in order to avoid inadvertent release of keys when the person or clothing of the operator touches the zero keys, the lip 119 of each locking slide, through which it is moved by the associated zero key, is formed away from the cooperating extrusion 116 for a substantial part of its length, as indicated at 121, so that the extrusion does not move the slide until the key has moved through about half of its stroke. Since the zero keys do not contact the V-slot bar, this causes no interference.

Besides the individual clear keys for each key section described above, another clear key (shown in Figure 58) is provided, which, upon depression, will release every depressed key on the entire keyboard. This clear key 122, normally maintained in raised position by spring 123, is provided with a lug 124 which, upon depression of the key, rocks the gate 125 extending across the full width of the keyboard and journaled on studs 126 fixed in the frames. This gate is provided with an arm 127 having an angular rearwardly extending face disposed directly in front of all the key latching slides 117. Whenever said clear key 122 is depressed, the gate will be rocked in a clockwise direction about studs 126, moving all slides 117 to the rear and releasing all latched keys. Under some conditions, the keyboard is cleared automatically as will be described hereinafter.

Disposed underneath the value keys "one" to "nine" inclusive, is a differentially settable bar 120 which is pivotally suspended from the key section frame 101 by means of two parallel links 128 and 129. This bar 120 has nine identical notches 130, each of which has at its bottom a downwardly extending slot 131 adapted to receive the end of a key stem 103. The vertical center lines of the key stems 100 are spaced an equal distance apart. This distance, however, is slightly greater than the spacing between successive slots 131 so that each succeeding slot 131 will be spaced one increment further away from its cooperating key stem. This spacing is proportioned in such a way that depression of a value key will cam the bar 120 to the rear, a number of increments equal to the value represented by the depressed key.

The position of each key section and the relation of bar 120 to the segment member 132 is adjusted by a screw 133 (Figure 2) which engages an ear 134 on the channel frame 101 and is thereafter locked by nut 135 against channel 108. The section can thus be removed and replaced repeatedly without disturbing the adjustment.

It is to be noted that the edges 136 of each notch are convex so that the surface initially contacted by a key stem is relatively much flatter than the surface finally contacted by the key stem just prior to its passage into one of the slots 131. This results in a more equalized key touch, the pressure at the beginning of the stroke being heavier and becoming slightly lighter as the key is depressed, instead of having an initial light touch with a final very heavy touch just prior to entrance of the key stem into the notch. This more than compensates for the additional resistance offered by the progressive compression of springs 102 and, with the more uniform key touch, the fatigue of the operator is decreased and the speed of keyboard manipulation enhanced.

Movement of each bar 120 is utilized to set up a mechanical representation of the selected value whereby the calculating mechanism may be accordingly controlled as hereinafter set forth. A swinging segment member 132 is mounted upon a common shaft 137 which supports like members associated with other key banks. This member is provided at opposite ends with arcuate racks 138 and 139, which serve to transmit the movement of the differential bar 120 respectively to a check dial assembly 140 positioned on shaft 141 in alignment with similar dials associated with the other key sections so that the value set up on the entire keyboard is read in a straight line of dials, and to a cam unit 146 which is positioned by such movement so as to form a mechanical representation of the number set up whereby the calculating mechanism may be accordingly controlled as hereinafter set forth.

As appears in Figure 4, each check dial assembly is positioned between plate members 142 through which shaft 141 extends. A spacer 143 is also mounted upon the shaft to preserve the alignment of the dial assemblies with the sight openings and with the rack 138.

One of the check dial assemblies is shown in detail in Figure 4, and comprises a cylindrical shell 144 carrying numerals from "zero" to "nine" on its periphery (see also Figure 5) and secured to a gear 145 adapted to mesh with rack 138 whereby dial 140 is rotated upon its supporting shaft 141 an amount proportional to the movement of differential bar 120 and will display through the sight opening 147, a figure indicating the value of the depressed key 100. The sight opening 147 is formed in shielding plate 112 covering said check dials 140 which plate is also provided with decimal point sight openings 148 exposing the rear ends of the keyboard decimal bars 113 which are colored on one side to correspond to the color of plate 112 and on the other side to contrast therewith. By this arrangement, the check dials will be automatically pointed off decimally, to correspond to the pointing off of the keyboard, as hereinafter described. A comb 149 is clamped by screws 111 between each frame 101 and the member 109 to prevent backward rotation of said dials 140 beyond their zero point, a lug member 150 carried by said dials engaging a tooth of the comb at that point.

Each selection cam unit 146 is composed of a gear 151, five differently shaped cams 152 to 156 inclusive (Figures 2, 6, 7, 8, and 9), four spacers 157, and a sleeve 158. To facilitate manufacture of such broad faced cams by stamping, each one of the cams 152 to 156 inclusive, is formed of two duplicate members, as appears in Figure 7. The cams and spacers are alternately slipped on over the sleeve, the gear 151 being finally placed upon the sleeve and the end of the sleeve riveted over. The cams and gears are keyed to the sleeve so as to form a unitary structure, such units being rotatably mounted in each order of the machine upon the common shaft 159.

Each one of the cams has two high points 160 and two low points 161 on its periphery. The cams are staggered about the sleeve, as appears in Figure 6, and spacers 157 disposed between the various cams, provide suitable clearances for a sensing operation by cooperating feeler arms which, as will be presently described in detail, sense the juxtaposed face of each cam after it has been positioned by the keys 100.

The aforementioned cam units 146 are driven through a gear 151 forming a portion of the unit (Figure 2), the gear being in mesh with rack 139 on member 132. The member 132 and the selection bar 120 are connected by means of a pin and slot connection 163 so that the member is rotated directly about the shaft 137 upon depression of any key. Upon release of a depressed key, the return spring 164 (Figure 2) acts to return cam unit 146 associated therewith and the check dial to zero position.

ACCUMULATOR MECHANISM

From the foregoing description of the selection mechanism, it is apparent that a number comprising a plurality of figures can be registered upon the several sleeves 169 by differentially driving the gears attached to these sleeves various distances proportionate to the quantitative relation of the several figures composing the number. However, in order to perform any mathematical computation such as addition, subtraction, multiplication, or division, mechanism must be provided for advancing a superior registering element one extra increment whenever the next lower element has made a complete rotation. This process is known as "carrying the tens", in a machine operating according to the decimal system.

Figure 20:
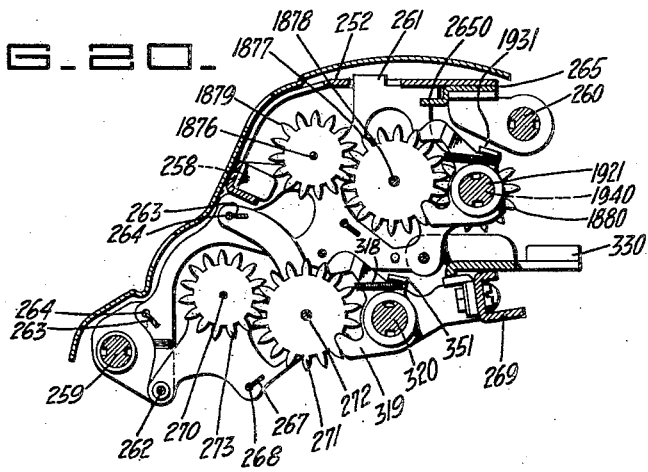

In the present machine this function is accomplished by accumulator mechanism mounted in a carriage 250 (Figures 1 and 16), the main frame of which comprises end plates 251 connected by a stop plate 252 (Figures 17 and 20) having apertures to receive lugs 253 on end plates 251 and secured at its forward end by screws 254 which extend into the end plates (Figure 17). The forward end of plate 252 is notched to fit into notches in the brace plates 255 and to provide extensions 256 fitting between adjacent brace plates 255 (Figures 22 and 24) and under ears 257 thereon. Screws 258 secure ears on some of the brace plates to the top plate 252 (Figure 20). The front and rear carriage track shafts 259 and 260, the ends of which are journaled in the two plates 251, and the several other cross shafts to be hereafter described, serve as additional bracing means for this main frame structure.

Mounted at even intervals between the two end plates 251 are a series of carriage brace plates 255 (Figures 16, 20, 21, 22, and 24) having lugs 261 projecting through spaced slots in the top plate 252 and supported at the front of the carriage by cross shaft 262. Locked spacing combs 263 extend through spaced slots in each brace plate and are locked in place by rods 264, while the top plate spaces adjacent plates 255, as has been described. A retaining comb 265 screwed to the top plate 252 spaces the rear edges of the plates and, by underlying lugs 265a formed on said plates, serves to hold lugs 261 in their notches in the top plate.

Supported in the end plates 251 and by the several brace plates 255, is cross rod 262 which serves as a pivotal support for a series of plates 266 (Figures 22 and 48), one of which is mounted on said rod 262 adjacent each of the carriage brace plates 255. These plates 266 are spaced and braced adjacent their forward ends by comb 267 interlocking with slots in each plate 255 and held in place by rod 268. The plates are connected at their rear end by a common bail 269 known as the "dipping bail," by means of which the entire body of plates 266 can be simultaneously oscillated about shaft 262 during operations hereinafter described (see Figure 48 also), in which description the mechanism supported by said plates 255 is referred to as the "dipping carriage".

The units of the accumulator are assembled on a shaft 270 supported by plates 255, there being one of such plates 266 between each adjacent unit, so that each unit forms a separate assembly between two of said plates. Each unit is adapted to be driven by one of the selection gears (Figures 2, 15, and 48) with which intermediate gears 271, rotatably mounted on shaft 272 and entrained with the gears 273 of the several accumulator units, may be meshed by lowering the dipping carriage, as hereinafter described. Suitable clearances are provided on the several plates 255 to permit the necessary connections between the orders of the accumulator for effecting tens transfer or carry operation.

Referring more particularly to Figures 25 and 26, it will be noted that each accumulator unit comprises a spider 274 which is rigidly secured to a sleeve 275 on shaft 270. This spider 274 carries an internal ring gear 276 on its right hand side, which is spot welded or riveted to the flared out portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine" arranged as shown. Integral with the sleeves 275 surrounding said shaft 270 is a sun gear 280 abutting a brace plate 255, and interposed between said sun gear 280 and the spider 274, is a snail cam 281 and spacer 282.

The snail cam 281 (see also Figure 22) has an aperture through which projects a lateral extension 283 of spider 274, thus causing said cam and spider to rotate as a unit and the sleeve 275 is riveted over the spider, forming these parts into a functional unit.

In Figures 27 and 28, I have shown a modified construction in which the snail cam is secured on a sleeve 285 for rotation about a cut-away portion of sun gear 286. Projection 287 from the spider extends into an enlarged slot 288 in the cam to permit limited movement of the cam with respect to the spider. A small wire spring 289 is extended around sleeve 285 between the projection 287 and a stud 290 on the cam so that the cam is urged into that position shown in Figure 27. This construction has the advantage that, under certain conditions to be pointed out hereinafter, spring 289 may be temporarily overcome and the cam moved slightly without moving the rest of the functional unit just described.

Assembly in properly timed relationship is secured by welding the ring gear 276 to the spider 274 in a certain relationship established by the position of the notch in the ring gear through which the lug 278 of the spider passes. Snail cam 281 is broached out to the pitch line of sun gear 280, as appears in Figure 26, and the teeth of the sun gear thus serve to locate the cam with respect to the sun gear. When the sun gear on its integral sleeve 275 is placed on the spider, the extension 283 then locates the snail cam with respect to the internal gear so that sun gear 280, snail cam 281, and ring gear 276, are fixed in a predetermined position relative to each other. Assembly by skilled mechanics is thus made unnecessary and possible errors are prevented, for the three units can be assembled in only a given relationship in which they are maintained by riveting over the end of the sleeve. In assembling the modification shown in Figures 27 and 28, a special assembly jig is used.

Located immediately to the right of mechanism just described is a plate 292 fixed to the spur gear 273 which is driven by a gear 189 (see Figures 2 and 5) through an intermediate gear 271 when plates 266 are dipped. These elements are rotatably mounted on a sleeve 293 which in turn is rotatably mounted on a sleeve 294. Plate 292, which includes an apertured ear 295 for use in timing, as will presently appear, is, in turn, fixed to a member 296 by studs 297 provided at each end of said member, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276, constitute a planetary assembly which rotates about the sun gear 299 and comprises the means by which the numeral bearing shell 279 can be rotated by the actuating mechanism of the machine which drives the gear 271 as hereinafter described. Secured to the right end of the above mentioned sun gear sleeve 294 is a spider 300 carrying an internal gear 301, the spider and gear being provided with four lugs 302 which serve as assembly guides and as stops, as hereinafter described. The spider also includes four apertured ears 303 for use in timing, as will appear.

For the purpose of carrying tens, means are provided for driving the spider 274 and its associated dial shell 279 by means of the spider 274 of the next lower order independently of any movement of gear 273. This means includes the aforementioned internal gear 301 and another unit sub-assembly now to be described. Sleeve 294 which, as previously described, supports the sleeve 293 on shaft 270, is provided with a double arm member 304, one arm 305 of which is apertured, while to the other, 306, is secured a stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing another unit assembly. The central portion of member 304 is equipped with a gear segment 311 meshing with teeth 312 (Figure 24) formed on a lever 313 pivoted to a shaft 272 which is mounted parallel to the shaft 270 in the plates 266. Lever 313 includes an extension 314 engaging a lever 315 also mounted on shaft 272 (Figure 22) which lever carries a roller 316 in the same plane as snail cam 281. Lever 313 is urged clockwise by spring 318 so that the roller 316 carried by lever 315 is urged thereby into contact with the adjacent snail cam 281. In the units order the sleeve 293 may be secured directly to the plate 266 adjoining it at the right, inasmuch as there is no lower order from which tens must be carried.

This arrangement of the several accumulator units permits simultaneous digitation and tens transfer operations known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 279, this movement will bring a figure opposite the sight opening 318 in the carriage cover, indicative of the portion of a rotation given gear 273.

Whenever a given amount is thus entered in any one unit of the accumulator, one tenth of that amount will be entered in the next higher unit by means of the carrying mechanism comprising sun gear 280 fixed to spider 274 and driving planetary gears 308 and 309, these, in turn, driving internal gear 301 fixed to sleeve 293 of the next higher unit in a direction opposite to that of spider 274, and, by rotating said sleeve, driving sun gear 299 integral therewith. If gears 273 and 298 are stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of that produced by the rotation of gear 299 and that produced by the rotation of gear 273, the movement of the ring gear, of course, being the resultant of the movement of the sun gear and the displacement of planetary centers. Thus the movement of any higher order dial becomes the resultant of the digitation entry into its own order and the carry movement from the next lower order.

The gear ratios are in usual practice, of course, such that the carry movement received by the higher order dial is one-tenth of that of the lower order dial. A typical arrangement to produce this result is as follows: sun gear 280—ten teeth; planetary gears 308 and 309—fifteen teeth; ring gears 274 and 301—forty teeth; sun gear 299—sixteen teeth; and planetary gears 298—twelve teeth. With this arrangement, one full clockwise turn of a lower order dial rotates sun gear 280 ten teeth, advancing ring gear 301 next to the left, ten teeth or one-quarter turn counter-clockwise. This advances sun gear 298 integral therewith, one-quarter turn, or four teeth counter-clockwise, which in turn advances ring gear 276 on the higher order assembly four teeth, or one-tenth turn clockwise. This carry movement will in turn impart one-hundredth of a turn to the dial next higher than that receiving the original carry movement; one-thousandth of a turn to the dial next higher than that, and so on.

With this gear arrangement, sun gear 299 having four-tenths as many teeth as ring gear 276, one full turn of digitation gear 273 will produce one and four-tenths turns of ring gear 276. Therefore, if gear 273 is made a fourteen-tooth gear, each tooth advance of the gear will produce one-tenth of a turn of ring gear 276, or one figure advance of the dial.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319 (Figure 20), freely mounted on shaft 320, each of which is adapted to engage the associated intermediate gear 271 in each order. As described above, these gears 271 mesh directly with the gears 189 of each accumulator unit and each pawl 319 therefore acts as a retaining means for one of said gears, being released during actuation, as will presently appear.

Thus, from the foregoing description, it is apparent that rotation of a numeral wheel in any order will cause all the numeral wheels in the higher order or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced so that the numerals are not properly lined up at the sight openings 318, and, in order to overcome this condition and render a readable indication of the result, mechanisms have been provided which will turn every numeral wheel to proper alignment with said sight openings directly after an actuation.

The mechanism for attaining this lineup operation of said dials comprises the snail cam 281 which is secured to the left side of each spider 274, and which cooperates with and serves to position the indirectly spring tensioned lever 315 pivoted at 272 (Figure 22). In this figure the snail cam 281 and lever 315 are shown in a position in which the roller 316 on said lever contacts with the higher point of said snail cam, which high point represents the zero position of its associated dial wheel 279. The contour of said snail cam is proportioned in such a manner that each higher digit up to nine on the dials is represented by a successive decrease in size of its radius until the lowest point on said cams represents the digit "9" on said numeral wheels; the values increasing on the dials as well as on the cams in clockwise direction, so that for addition the dials and cams are rotated in counter-clockwise direction and for subtraction in clockwise direction, when viewing the machine from the right hand side.

As the carriage is moved down into its lowered position, a notch in extension 340 on lever 313 engages shaft 339 which is extended through plates 255. This rocks lever 313 counter-clockwise and results in member 304 moving clockwise to advance gears 309 and 308. This results in the carry from the right, received by gear 309 from gear 280 with which it is meshed and which is in the next order to the left, being entered into the next higher order. When the dipping carriage is in its lowered position, lever 315 is freed by lug 314 and permitted to fall to a position in which roller 316 is just clear of snail cam 281. Under these conditions, sleeve 294 and stud 307 (Figures 25 and 26) are held in fixed positions, and each dial is in general advanced to a partial position depending on the digitation it has received and the carry from all orders to the right. For instance, if the resultant value entered is "2,375," the first dial stands between a "2" and "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

The relation of the steep face of cam 281 to the pivot point 272 of lever 315 is such that as the numeral wheel moves from "9" to "0," (as when the carriage is dipped while nines are registered) the steep cam face acting on roller 316 will tend to move lever 315 to the position shown in Figure 22. Now, the downward movement of lug 314 and the counterclockwise movement of cam 281 take place concurrently, but the steep cam face tends to move the lever 315 faster than the lug 314 will let it move, and the cam face can not be made less steep and still be capable of supporting roller 316 properly when the parts are positioned as shown in Figure 22.

It is therefore clearly necessary that this conflict be compensated in some way, and such is the function of the specially mounted cam shown in Figures 27 and 28, which has been heretofore described in detail. In a mechanism embodying this structure, resistance to the movement of cam 281 tensions the spring 289 until roller 316 has been permitted to move to its lowermost position, whereupon the said spring returns the cam to its normal position.

If rigid cams are used, resistance to movement thereof tends to cause rotation of gears 273 against the tension of springs 318 acting through holding pawls 319 and intermediate gears 271. While such movement is ordinarily less than half a tooth, it is clear that any excess thereover would cause inaccuracy in the computation.

When the calculating is completed and the dipping carriage raised, it is desired to back up each dial by the fractional amount it stands ahead of an even registration to secure a clear registration in the sight openings. To this end, each lever 315 (Figures 22 and 24) is allowed to rock clockwise under the tension of spring 318 until roller 316 rests against snail cam 281 which, with the cam shaped as already described, allows lever 315 to rock clockwise by an amount proportional to the registration on the dial to which the cam is attached. This rocking of each lever 315 rocks each associated sleeve 294 in a counter-clockwise direction, carrying stud 307 forward by an amount proportional to the registration on the dial to the right of it, thus rocking ring gear 301 by a corresponding amount and backing up thereby the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam standing under the roller prevents such backing out. The result is that when the dipping carriage is raised, each dial is controlled by the snail cam on the next lower order dial so that the proper figure will be squarely lined up to its sight opening.

Only the dial immediately to the right affects the backing up of a dial and the increment of carry in any one dial is not backed out entirely until that in the one immediately to the right is removed. Thus the task of having the last dial distinguish between two values, as "29,998" and "30,001", obviated. Thus, with "29,998", when the dipping carriage is returned, the "2" dial is not returned until the dials to the right have returned. Then the "2" dial is moved back only 0.9000 of the way and not 0.9998 of the way, the 0.09988 of a turn having been previously backed out.

If a value to be displayed upon the completion of a calculation involves a series of nines as in the figure 29,998 above mentioned, or as always occurs in case an overdraft has been made (that is, when a subtraction has been made with a subtrahend greater than the minuend), the dials which are to display the nines will stand substantially at zero except the extreme dial to the right of this series. As the extreme right dial is brought fully into its "nine" position by the removal of any increment of carry in the manner previously described, the roller is allowed to follow down to the lowest radius of the cam, thus backing the next higher order dial by very nearly a full step. If the higher order dials were already standing substantially at zeros, the backing up operation would thus bring each in turn to a nine which would allow the roller in that order to drop from the high portion of the cam down to the low radius of that cam. This dropping of the roller would in turn back the next higher order up one step which, if the dial were standing substantially at zero, would result in a repetition of the process. Thus, if with a series of dials standing at zero, the extreme right dial in the line is backed up to a nine registration, a carry wave results in which each of the dials successively moves from "zero" to "nine", each dial commencing its backward movement only when the next dial to the right has allowed the roller to drop over the corner of the high point of the cam and proceed to drop far enough to bring the order in question into operation.

If, due to back lash in the gearing, lineup of the dials in the sight openings should not be as accurate as desired, a more accurate lineup across the sight openings 318 of the indicia bearing shells 279 may be secured by providing the cams 281 (Figure 29) with a series of bumps 322, one of which is interposed between each portion of the cam corresponding to one numeral position and the immediately adjacent portion corresponding to the next higher or lower position. A cam provided with this "bump" contour is shown in Figure 29.

The assembly of the sun gear 280, snail cam 281, and numeral bearing dial 279 in proper timed relationship has previously been disclosed. Similarly, the assembly of gears 298, sun gear 299, plate 292, gear 273, spider 300, and ring gear 301 on sleeve 293 to provide another subassembly, has been disclosed. This unit is assembled with the aperture 295 opposite the space between two adjacent teeth on gear 273. The assembly of sleeve 294 and arm member 304 has also been disclosed. In assembling the accumulator, these units, shown in perspective in Figure 26, are assembled on shaft 270 as it is passed through the plates 255, each one of the unit assemblies being positioned on the shaft as it is advanced. The previously described unit subassemblies are quickly and easily brought into the proper timed relationship with each other, by, simultaneously with the positioning of the successive units on the shaft 270, passing a timing rod 323 through the aperture provided in each unit. Thus, the timing rod is first passed through the aperture 339 in the snail cam 281, as appears in Figure 26. The unit subassembly of the planetary gears and gear 273, and ring gear 301, is then placed on the shaft 270. The planetary gears are then rotated about shaft 270 until the aperture 295 in plate 292 will pass the timing rod as well as through an aperture in one of the ears 303 on the spider 300. Arm 304 is then revolved about the shaft 270 until the timing rod can pass through the apertured arm 305. When the rod has been passed through the several apertures in the several subassemblies, the whole will be in the proper timed relationship. In the same manner, successive units can be timed and the carriage thus readily assembled and timed.

The carriage is supported in the machine for transverse shifting in either direction by shafts 259 and 260 which slide through bushings 324 positioned in side frames on opposite sides of the machine (Figure 47). Springs 325 are slipped over the turned down ends of these bushings to provide cushioning means limiting traverse of the carriage.

The carriage is released for free traverse by rocking comb 330 (Figure 18) on shaft 331 out of engagement with shift mechanism, presently described, including rollers 332 mounted on the plate 333 secured on shaft 334 (Figures 18 and 65). The comb 330 is rocked about shaft 331, upon which it is supported, by means of lever 335 which extends through the cover of the carriage and carries a handle 336. The lever is pulled by spring 337 against a stop 338. Upon depression, the spring is tensioned and the comb 330 is rocked in a counter-clockwise direction out of engagement with the rollers. The connection between the lever 335 and the comb is made by means of an ear 338$^a$ on the lever extending into a slot in the comb. In this manner, the carriage can be freed and moved to any desired lateral position. Step by step shift of the carriage is effected by rotation of the shaft 334, each half turn of the shaft effecting a step of the shift. Thus, each roller 332 successively engages the teeth of the comb 330 to advance the carriage an order at a time. Rotation of the shaft 334 in either direction for one or more steps and the control of various operating means, is described hereinafter in detail.

POWER SET SELECTION MECHANISM

After the setting of the mechanism heretofore described has been completed and upon manipulation of one of the operating controls, the power operated portion of the selection mechanism is brought into operation prior to operation of the calculating mechanism, and acts, under control of the cams 146, to move elements of the calculating mechanism to the proper position to condition it for effecting entry of the value set up on the keyboard into the accumulator.

It is an important and distinguishing feature of the present machine that throughout the performance of a calculation, the registering elements are continuously driven by the prime mover, the entry of different amounts being effected by mechanism for varying selectively the rate at which each registering element may be driven by the prime mover.

This mechanism comprises three shafts 166, 167, and 168, hereinafter referred to as the half, quarter, and twelfth speed shafts respectively (Figure 5), and common to all orders of the machine. The shafts are connected to the prime mover through gearing and a cyclic clutch as hereinafter described, so that shaft 166 rotates through 180° for each cycle of operation of the machine, shaft 167 rotates through 90° for each cycle of operation of the machine, while shaft 168 moves through 30° for each cycle of operation. A series of sleeves 169 (Figures 2, 10, 11, 12, 13, and 15), one for each decimal order, is freely mounted on a common pivot shaft 170 disposed between the shafts 166, 167, and 168, and each sleeve has keyed thereto several spaced gears for driving the several orders of the registering mechanism, as hereinafter described.

Means are provided for connecting each of the several sleeves 169 so that each sleeve can be selectively locked or driven by shaft 166, shaft 167, or shaft 168 at any of nine different rates with respect to the prime mover, said rates corresponding to the values delineated upon keys 100. Since this mechanism is duplicated in each decimal order of the machine, only one of these orders will be herein described.

Keyed to sleeve 169 (Figure 10), is a gear 171 (see also Figures 2, 5, and 15), and mounted to freely oscillate upon a spacer mounted on said sleeve alongside said gear 171, is a selection plate 172 having rotatably mounted thereon an idler gear 173 and an idler gear 174 meshing with gear 171. Keyed to the half speed shaft 166 in radial alignment with gear 173, is a twelve tooth gear 175, while in radial alignment with gear 173, on its opposite side, is a twenty-tooth gear 176 keyed to the quarter speed shaft 167. Thus, if plate 172 be swung to the right as viewed in Figure 2, gear 176 will be brought into mesh with gear 173, whereupon the 90° rotation of shaft 167 which takes place during each cycle of operation of the machine, will drive the gear 171 five teeth, while if plate 172 be swung to the left, gear 175, upon the 180° rotation of shaft 166, will drive the gear 171 six teeth. By this means either a five or a six selection can be effected.

Also keyed to the sleeve 169 is a second gear 177 (Figures 5, 11, and 15), and mounted for oscillation on a spacer carried by the sleeve alongside this gear is a second selection plate 178 carrying an idler 179 and an idler 180 which, in this case, meshes with the gear 177. Keyed to shaft 166, in radial alignment with idler 179, is a fourteen-tooth gear 181, and keyed to shaft 167, in radial alignment with idler 179, is a sixteen-tooth gear 182. Thus, when this second selection plate 178 is swung to the right, as viewed in Figure 2, its idler 179 will mesh with the gear 182 and the 90° rotation of shaft 167 in each cycle will serve to drive the gear 177 four teeth, while, when the said plate 178 is swung toward the left, idler 179 will mesh with the gear 181 and the 180° rotation of shaft 166 in each cycle will serve to drive the gear 177 seven teeth. By this means either a seven or a four selection can be effected.

Also keyed upon sleeve 169 is a third gear 183 (Figures 2, 5, 12, and 15), and mounted to oscillate freely upon a spacer carried by the sleeve 169 alongside this gear, is a third selection plate 184 which is a substantial duplicate of the first two above described, and carries idler gears 185 and 186. Keyed to shaft 166, in radial alignment with idler 185, is a sixteen-tooth gear 187, and keyed to shaft 167 in radial alignment with idler 185 is a twelve-tooth gear 188. Thus, when plate 184 is swung to the left, as viewed in Figure 2, its idler 185 will mesh with gear 187 and the 180° rotation of shaft 166 in each cycle will serve to drive the gear 183 through eight teeth, while, when plate 184 is swung toward the right, idler 185 will mesh with gear 188 and the 90° rotation of shaft 167 in each cycle of operation will serve to drive the gear 183 through three teeth. By this means, either an "eight" or a "three" selection may be effected.

Also keyed to sleeve 169 is a broad faced gear 189 (Figures 13 and 15), and freely mounted for oscillation upon a spacer carried by the sleeve 169 on the left side of this gear, is a fourth selection plate 190, a substantial duplicate of those previously described and carrying idlers 191 and 192. Keyed to shaft 166 in radial alignment with this idler 191 is an eighteen-tooth gear 193, and keyed to shaft 168 to rotate gear 194 which is free on shaft 167 and in radial alignment with this idler 191, is a twenty-four-tooth gear 195. Thus, if this idler 191 be swung to the left, as viewed in Figure 2, it will mesh with gear 193 and a 180° rotation of the shaft 166 in each cycle will serve to advance the gear 189 nine teeth, while if the plate 190 be swung toward the right, the idler 191 will mesh with the gear 194 and the 30° rotation of shaft 168 in each cycle, and the twenty-four-tooth gear 195, will serve to advance the gear 189 two teeth. By this means either a "nine" or a "two" selection may be effected.

Mounted for oscillation upon sleeve 169 at the right of gear 189, is a fifth selection plate 196 having, rotatably mounted thereon, intermeshing idler gear 197 and 198 (Figure 14). Gear 198 is constantly in mesh with gear 189, while gear 197 may mesh with the twenty-four-tooth idler gear 199 free on shaft 167 when the plate is swung to the right, as viewed in Figures 2 and 15. This gear is driven by twelve-tooth gear 200 keyed on shaft 168 so that gear 189 will be rotated a single tooth upon a 30° rotation of gear 200 when the plate 196 is swung rearwardly.

A zero selection is effected by holding gear 189 against rotation. For this purpose, a pawl 201 (Figures 2 and 14) is mounted upon the shaft 202, so that, when the plate 196 is swung to the left, the edge of plate 196 will engage tail 203 of the pawl 201 and retain said pawl in engagement with the gear 189 when the shaft is rocked, as will be described.

The shaft 202 extends across the machine and one pawl 201 is provided in each order. This shaft 202 is rocked counter-clockwise to a limited extent by the carriage dipping mechanism to be presently described, and, when the machine comes to rest and the carriage is raised, the shaft 202 is rocked in a clockwise direction so that the wide keyway in the shaft engages the narrower keys 204 formed on the pawls to hold the pawls in against the gear 189 while the machine is at rest. Where some value other than a zero is selected, the initial rocking of shaft 202 frees these pawls and immediately upon rotation of sleeve 169, each gear 189 rocks its pawl out of the way. However, if a zero is selected in an order, the associated plate 196 engages the tail 203 of the corresponding pawl, as previously explained, and retains the pawl in engagement with the gear 189 even though the shaft 202 has been rocked. By this arrangement, when the selection plate 196 is swung toward the left, as viewed in Figures 2 and 14, the gear 189 is locked and a zero selection is made.

Each of the plates 172, 178, 184, and 190, includes a lug 205 which engages the adjacent plate to prevent one plate from hanging up on an adjacent plate as they swing by each other. The plate 196 is placed on the other side of gear 189, and is spaced so that hanging up thereof does not occur. One of the five plates of each order is positioned during a selecting operation to select a value or zero, the remaining four plates of the order being held in idle position. The value positions are positions in which the plate-carried gears mesh with gears on shafts 166 or 167, while the intermediate position is that in which no such connectiton is effected. Thus, if a "six" is to be selected, by way of example, plate 172 will be swung to the left in Figure 10, to engage gear 175, while all the other plates will be positioned in the intermediate positions in which they are shown in Figures 11 to 14 inclusive.

This simultaneous setting of the selection plates is effected by power driven mechanism which senses the cams 146 hereinbefore mentioned. This mechanism comprises a group of five feeler arms 210 (Figures 2 and 8), one for each of the five plates 172, 178, 184, 190, and 196, and pivotally connected thereto by studs 205. Each arm is provided with a sensing nose 211 adapted to be pressed against the associated cam with which it is in radial alignment. These feeler arms 210 are pivotally supported on a common shaft 213 supported by links 214 pivoted to the frame of the machine at 215, and each feeler arm 210 is connected by a link 216 with a second feeler arm 217 pivotally mounted on a shaft 218 supported in the frame, and provided with a sensing nose 219 adapted to contact the same cam at a point approximately 180° removed from the point at which it is contacted by nose 211. This sensing system is actuated by a plurality of pairs of complementary cams 220 and 221 adapted to be driven by means hereinafter described, and cooperating with cam followers 222 and 223 to rock lever 224 pivoted to the frame at 225 and connected by links 226 with shaft 213.

In operation, as cam lever 224 is rocked by these cams, each set of sensing noses 211 and 219 will be moved toward that cam in the cam unit 146 with which it is in radial alignment, and if nose 211 meets a low point 161 of one of the cams, the nose 219 will meet the opposite high point 160, thereby rocking the connected selection plate into its forward position, as viewed in Figure 2. If, on the other hand, nose 211 meets a high point 160 of one of the cams, the nose 219 will meet the opposite low point 161 and the selection plate to which arm 210 is attached will be moved into its rearward position, as viewed in Figure 2. If, in the third case, nose 211 meets only an intermediate portion and does not engage either a high or a low point of a cam, nose 219 will do likewise, and the connected plate will be positively positioned in central or neutral position in which its idler will be out of mesh with the gears on both shafts 166 and 167.

To accurately position each cam in cam unit 146 before this sensing operation, a pawl 230 (Figure 2) is mounted on shaft 218 and is urged by spring 231 against pin 232 on link 214. When link 214 is moved, the pawl is released to engage gear 151, aligning the unit 146 of which the gear forms a part, and holding it against possible displacement during sensing.

The five cams 152 to 156 inclusive, composing each selection cam unit 146, have their respective high and low points so positioned around their peripheries, and are so offset with respect to each other that, if one of the feelers 211 in each order meets either a high or a low point on one of the five cams, the other four feelers 211 in the same order will not meet either a high or a low point on their associated cams. Thus, in each sensing operation, only one of the five selection plates will be rocked either forwardly or rearwardly, the other four of said plates in that order being maintained in their intermediate, central, or neutral position. Thus, the gears carried by each sleeve 169 can be operatively meshed only by a single train with one of the gears carried on either shaft 166 or shaft 167, or else locked by pawl 201. By this means, any selection from "zero" to "nine" inclusive, is effected in each decimal order under the control of keys 100.

In Figure 8 are shown the five cams 152 to 156 inclusive in position to set up a zero. These cams respectively provide for setting values as follows: cam 152, values 6 and 5; cam 153, values 7 and 4; cam 154, values 8 and 3; cam 155, values 9 and 2; and cam 156, values 0 and 1. In the set-up shown, a zero value will be set up under the control of cam 156, nose 211 moving in to low point 161 and nose 219 engaging high point 160 to move the associated selection plate 196 to the forward position and hold pawl 201 in engagement with gear 189. All other noses engage intermediate cam faces and position the other four plates in neutral position.

It is to be noted that high points 160 correspond to the outer circle in Figure 9 and low points 161 to the inner circle, while the intermediate circle corresponds to the cam body. When the noses 211 and 219 are brought in to engage a cam, the distance they are finally spaced apart is always the same, it being the relative positions of the noses with respect to the center of the cam, or shaft 159, that controls the position of the selection plates. Thus the noses either engage the surfaces represented by the outer and inner circles in Figure 9, corresponding to distances A and B, and in which the associated plate is moved to a value setting position, or both noses engage the surface represented by the intermediate circle, which is a neutral plate position. Distances A, B, and C are equal but are differently arranged with respect to the center of shaft 159. It is this difference that results in the positive selective movement of each selection plate to one of these positions it can occupy.

Means are provided for locking the selection plates in the relationship above described, comprising a lock gate 236 (Figures 2 and 46) extending across all orders in the machine. The gate is pivoted to the frame of the machine at 237 and engages one of three notches 238 in each selection plate to hold said plate against movement in either direction. All the selection plates are engaged simultaneously, the gate being operated by means which willl be described in connection with the setting clutch mechanism hereinafter.

ACCUMULATOR CLEARING MECHANISM

It may be seen from the foregoing description that if ring gears 301 be locked against movement while segments 313 are rocked, then the teeth 312 will act to rock arms 304 and rotate planetary pinions 308 and 309 by feeding pinions 308 over the teeth of locked ring gears 301. If the gears 271 be now freed from the braking action of pawls 319, the rotation of planetary pinions 309 thus produced, can, since gears 273 are free to rotate, drive gears 280 to rotate spiders 274 and their attached numeral wheels 279 backwardly, toward the position in which their zero digits align with the sight openings 318. If a stopping means be placed in the path of lugs 278 carried on said numeral wheels to prevent them from being driven beyond zero position, the braking pawls 319 may be restored to operative position and the lock withdrawn from ring gears 301, leaving the numeral wheels 279 aligned in zero position.

This mode of operation is used to reset the accumulator to zero, by means of the following mechanism. Keyed upon shaft 320 (Figure 21), supported in plates 266, are rocking levers 350. The shaft 320 is rocked by the automatic clearance mechanism presently to be described, and movement of rocking levers 350 is transmitted to pawls 319, each pawl having a lateral projection 351 thereon which may be engaged by the associated lever 350 to free gears 271.

Lever 350 also acts to lock the ring gears 301 and place zero stops for the numeral wheels, and for this purpose is provided with an extension 352 engaging slot within lever 353 mounted on shaft 272, so that, upon clockwise rocking of lever 350, lever 353 is pushed in a counter-clockwise direction and lateral projections 354 on lever 353 are placed in a dial stop position. The lateral projections 354 are each of sufficient width to engage the zero stop projections 278 (Figures 25 and 21) on each dial assembly as well as to engage one of the four projections 302 on the spider 300 and gear 301 and limit the latter against movement past zero position during clearing of the accumulator, thus providing the aforementioned stopping means. Rebound of the dials is prevented by resilient member 355, on each lever 353 which engages the other side of projection 278 in each assembly from that engaged by projections 354, and retains each dial shell against rebound.

The dials are returned to zero position by mechanism comprising lateral projections 356 on each lever 313 (Figure 24), which are engaged by extensions 357 on pawls 319 to rock levers 313 counter-clockwise on shaft 272 against the pull of spring 318. Teeth 312 on levers 313 act to rock arms 304 and rotate planetary pinions 308 and 309 by feeding the former over the teeth of locked ring gears 301. Since gears 271 are free to rotate, rotation of planetary pinions 308 and 309 drives gears 280 to rotate spiders 274, and their attached numeral wheels 279, backwardly to the position in which the zero digits align with sight openings 318.

The shaft 320 is then rocked in a counter-clockwise direction to remove projections 355 and 354 from cooperative relationship with lugs 278. Spider 300 permits pawls 319 to reseat between the teeth of gears 271 and permit the segments 313 to return under tension of springs 318 until the engagement of roller 316 with the periphery of snail cam 281 blocks further movement of the segment 313 by engagement of lug 314 thereon with the roller carrying lever 315. For this purpose, shaft 320 has keyed thereto a lever 358 (Figure 18) which is pulled by spring 359 in a counter-clockwise direction so that, when shaft 320 is rocked to clear the dials, the spring is tensioned. As the clearance mechanism, to be described, is released, this spring returns shaft 320 to the position shown in Figure 18, leaving all the zero numerals on the dials aligned with the sight openings.

GENERAL CALCULATIONS DRIVE

Power for the various operations of the machine is supplied, under the control of the various control keys of the machine, through the main clutch 428, the setting clutch 430, the accumulator clear clutch 360, the restore clutch, 700, the presently described counter clear clutch, and the presently described shift unit. To drive these units, a motor 640 (Figure 53) is mounted within the frame of the machine, and its speed regulated by a speed governing device which includes a knurled knob 641 for enabling the machine operator to vary the motor speed from outside the machine casing. A flexible coupling 642 connects the motor drive shaft 643 to an overload release device as adjustable slip clutch 644. Any well known form of slip clutch may be used. A pinion 645, driven by the slip clutch, drives the main clutch 428 through a transmission system including gear 646 carrying gear 647 meshed with gear 362, which is engaged with idler 650, which in turn engages and drives the gear 415 on the main clutch. The main clutch 428, when engaged, results in selective directional driving of the half, quarter, and twelfth speed (Figures 2 and 53) shafts under the control of the reverse unit which determines initial power application to either gear 459 or to gear 458. Thus, as appears under the description of the reverse unit, gears 459 and 458 are selectively driven through the main reverse unit, to drive the half, quarter, and twelfth speed shafts in a selected direction.

The setting clutch gear 430 is driven by gear 648 on the same shaft with gear 362 in the main clutch train. Gear 362 also drives a gear 361 on shaft 649 upon which are positioned the restore clutch 700, and the clear clutches 360 and 1911. The shaft 649 rotates whenever the motor operates.

CLUTCH CONSTRUCTION

The construction of the main clutch and the setting clutch, previously mentioned, is substantially identical with the exception that while the main clutch 428, shown in Figures 32 to 35 inclusive, has its driven side keyed to a sleeve rotatably mounted on a stationary supporting shaft 429, the setting clutch 430 has its driven side keyed directly to its supporting shaft 431. With this difference in mind the structure of the setting clutch can be understood from the following description of the main clutch structure.

The driving side of the clutch comprises an annular gear 415 mounted on an annular laterally extending flange 416 of disc 417, the disc being capable of being driven by the gear, as will presently appear, and the gear being connected to the prime mover through transmission mechanism (see also Figure 53). The driven element of the clutch comprises a wedge disc 418 keyed to a sleeve 419. The flange 416 of disc 417 has three apertures spaced equally about its periphery and having rollers 420 therein, and wedge disc 418 has three cooperating flat areas 421 immediately adjacent the three rollers. Each roller floats between the adjacent flat 421 and the inner periphery of the annular gear 415 and rolls freely when the clutch is not transmitting power.

In operation, when the clutch is not engaged and the prime mover is in operation, gear 415 is rotated but wedge disc 418 and disc 417 are held against rotation by a clutch dog 395 (Figure 34), which is provided with a nose 422 adapted to enter one of the notches 423 on disc 417 and one of notches 424 in disc 418, notches being employed to prevent rebound.

In machines of the character herein considered, speed in operation is important and it is desirable that the clutch engage and transmit power immediately upon operation of dog 395 to release discs 417 and 418. Provision for friction between flange 416 on disc 417 and gear 415 is made, so that rollers 420 jam instantly and full power is transmitted through the clutch. In Figures 34 and 35 I have shown flange 416 of disc 417 provided with three receptacles 425 equally spaced about the flange and having therein metal cups 426 pressed against gear 415 by springs 427. The drag provided on gear 415 by the spring pressed cups in flange 416, causes the rollers to jam quickly and effectively when discs 417 and 418 are released.

It is to be noted that the described clutch 428 has a normal cycle consisting of half a revolution so that if clutch dog 395 is raised, even for an instant, and then released, the clutch and the elements it drives will make half a revolution before the nose 422 can again engage the notches 423 and 424 to open the clutch, stop and lock the mechanism.

When the clutch engages in the manner previously described, the disc 417 rides a certain angular distance in advance of the driven side of the clutch. When the clutch is to be disengaged, therefore, this disc 417 is stopped by nose 422 of clutch dog 395 before the driven side engages the nose. The momentum of the moving parts and the action of the spring pressed centralizers, serves to advance the driven side from this position, the advance immediately breaking the wedging effect of rollers 420 and declutching the driven side. However, the driven side is thus advanced a slight angular distance, and allows the nose 422 to drop into notch 424 in the driven disc 418, the notch retaining the driven side against rebound and definitely locking it in its full cycle position.

In Figure 45, a centralizer cam 432 is shown on the setting clutch shaft, and this is functionally similar to one used in conjunction with the main clutch but not shown. As appears in Figure 44, this cam includes two pockets 433 in which spring pressed roller 434 seats to position the cam very definitely. Roller 434 is carried upon arm 435 hinged on pin 436 and is pulled by spring 437 extended between the arm and a portion 438 of the frame. The centralizer cam 432 is rocked upon each cyclic operation of the setting clutch against the tension of the spring 437. As the setting clutch ends its operations, the roller 434 seats in one or the other of the pockets 433 in the cam, and ensures that the whole setting clutch line is returned to the same definite cyclic position, as well as aiding in declutching the setting clutch.

The clutch is readily assembled before disc 418 is mounted on the supporting shaft. The gear 415 and disc 417 are assembled with the springs 427 in place. Rollers 420 are then positioned whereupon the clutch is secured together as a unit by passing disc 439 over the enlarged heads of pins 440 and then sliding the disc into the position in which it appears in Figure 33 and in which position it is retained by passing the supporting shaft through the unit.

CARRIAGE CENTRALIZER

Dipping of the accumulator carriage, including rocking of the plates 266 about shaft 262 to bring gears 271 into mesh with gears 189, has been previously mentioned. To ensure that the carriage, when thus dipped, will mesh with the gears 189 and is properly aligned, means are provided for centralizing the carriage into its proper lateral position upon dipping. In Figures 46 and 47 this centralizing means is shown as including a fixed member 540 fastened to the plates 523 and extending upwardly to slip between the adjacent plates 266 in the carriage. This member is provided with a V-section so that the carriage is guided downwardly and is centralized as it is brought down into place by the previously described carriage dipping mechanism.

To locate the carriage laterally in advance of the carriage dip, as is particularly necessary in division operations, more positive centralizing means are provided in addition to those already described. This mechanism includes a U-shaped member 541 (Figures 46 and 47) free on the shaft 542 and having a V-shaped extension 543 which may be moved upwardly to slip between adjacent carriage brace plates 266 and centralize the carriage before it has begun its downward movement. Control of the member and proper movement thereof is secured by extending link 544 between the selection lock gate 236 and the member 543, as appears in Figure 46. Thus, upon downward movement of the selection locking gate, to release the selection mechanism, member 541 is rocked in a clockwise direction so that the extension 543 is moved upwardly to engage between the plates 266 and centralize the carriage. As the selection lock gate is thereafter moved into selection locking position and the dipping of the carriage begins, member 542 starts downward movement to guide the plates 266 as they are lowered into position. In this manner, the carriage is readily adjusted laterally so that proper meshing of the gears occurs.

SELECTION LOCK

The setting clutch 430 is effective to operate the previously described locking gate 236 (Figures 2 and 46) which is pivoted to the frame of the machine at 237 and adapted to engage one of the three notches 238 in each selection plate to hold said plates against movement in either direction. The selection mechanism is thus unlocked to permit the sensing system to operate, and relocked after the sensing system has operated.

The timing of release and locking of selection plates is such that at the beginning of the uni-cycle operation of setting clutch 430, all selecttion plates are released to permit setting by the sensing system including feeler arms 210 and 217, as previously described. The moment setting is accomplished, due to rotation of shaft 431, and cams 526 and 527 thereon, the locking gate is immediately positioned to lock the plates in the selected position until the beginning of the next uni-cycle setting clutch operation.

The lock gate 236 is moved into position to engage one of the three notches 238 by links 528 (Figures 2 and 46) which extend at opposite ends of gate 236 to the rock levers 529 pivoted on shaft 225 and carrying rollers 530 and 531 which are in engagement with complementary cams 526 and 527, respectively, and effect the requisite movement of lock gate 236 at the correct cyclic times, since the lock gate operates both before and after the previously described sensing system has operated. The cams 526 and 527 constitute a pair, one such pair being mounted upon shaft 431 at each end of the locking gate (Figure 45). Since the setting clutch controls rotation of the shaft 431, the proper sequence of operation is served, cams 526 and 527 being suitably contoured to this end. The selection lock is also effective to lock a selected multiplier value, as will appear hereinafter.

SELECTION SENSING

Operation of the sensing system, which, as previously described, comprises (Figure 2) feeler arms 210 and 217, and selection plates positioned by said arms in accordance with the sensing of the cams in cam unit 146 by feeler arm sensing noses respectively 211 and 219, is effected by complementary cams 220 and 221 on shaft 431.

The setting clutch 430, immediately upon release, is effective to rotate shaft 431 through half a revolution and release the locking gate 236 for the sensing plates. Cams 220 and 221 (Figures 2 and 45) thereupon operate rock lever 224 through rollers 222 and 223, to move links 226 to actuate the feeler arms to sense cam unit 146 and position the selection plates in one of the three possible positions in accordance with the setting of said cams. After locking gate 236 has been moved back into locking position by cams 526 and 527, the cams 220 and 221 move the rock lever 224 and its co-operative mechanism to remove the feelers from contact with the sensing cam unit 146. The sensing plates are thus retained against displacement until the beginning of another setting clutch cycle.

CARRIAGE DIPPING

After selection has been made of the values to be entered into the machine, and operation of the sensing system has occurred, which includes the previously described release by the setting clutch 430 of the selection plates by lock gate 236, the sensing in each order of the machine of cam units 146 by noses 211 and 219 on feeler arms 210 and 217, and the movement of the selection plates in each order to position the several idler gears followed by the locking of the selection plates; entry of the values into the accumulator is effected so that the values may appear on the dial faces 279 in alignment with sight openings 318.

As previously described, the accumulator includes (Figures 16, 22, and 48) a series of plates 266 connected by a common bail 269 and supported for a dipping movement by shaft 262. After selection, plates 266 are rocked about shaft 262 to bring gear 271 in each order into contact with intermediate gear 189 (Figure 15) keyed to sleeve 169 together with gears 171, 177, and 183. This group of gears 171, 177, 183, and 189, being keyed to a common sleeve 169 in each order, are rotated as a body at a certain speed and for a certain distance according to the value selected, as has been described in connection with Figures 2, 5, and 10 to 15, inclusive. Dipping of the carriage also results in the release of gears 271 from the braking action of pawls 319, each pawl being carried down into engagement with shaft 565 (Figures 5 and 48), whereby the pawls are rocked clockwise to release gears 271.

Meshing of intermediate gear 271 with gear 189 in each order, results in the selected value being placed in the accumulator by rotation of gears 189. To secure dipping of the carriage at the correct cyclic time, means operated by the setting clutch are provided for dipping the carriage and thus permitting transfer of the value selected.

The means for dipping the carriage, from that position in which it appears in Figures 2, 20, 21, 22, 24, and 48, to bring gears 271 into mesh with gears 189 and then elevate the carriage at completion of the calculation, comprise two vertical sliding links 566 (Figure 48) slidable over pins 567 on opposite sides of the machine. Each link is provided with rollers 568 engaging bail 269, the links being biased upwardly by a spring 569. Links 566 are hinged to cam levers 570 and 571 by eccentric studs 572 so as to provide for adjustment of the mesh between gears 271 and 189. The cam levers carry rollers 573 in engagement with cams 574 on shaft 431 so that the links 566 are positively pulled down by the setting clutch rotation.

Means are provided for latching the carriage in raised position when the accumulator is not in operation and during shifting or clearing operations, and for latching the carriage in its lower position during engagement of gears 271 and 189. This means includes a latch lever 575 in the form of a bell crank pivoted at 576 and having a nose 577 formed at the upper end thereof to engage the lower edge of lateral extensions 578 on cam levers 570 and 571. The latch levers are urged to engage the extensions 578 by spring 579, and are normally effective to maintain the carriage in its raised position.

To disengage the latch levers 575 and permit lowering of the carriage upon beginning of a setting clutch operation, as well as to latch the carriage in its lower position, means are provided to move levers 575 and so rock their noses 577 out of engagement with the lower faces of extensions 578, and back into engagement with the upper faces thereof. A lever 580 is secured to shaft 581 (see Figure 36) in position to be engaged by an extension 582 on rock lever 552, so that rocking of plate 552 by reverse cams 550 and 551 also rocks shaft 581, to which rocking arms 583 and 584 are attached (Figure 36). Arm 583 is connected to levers 575 by pivotal connections 585 so that when they are thus rocked, the links 566 are not held by noses 577, and cams 574 may then lower the carriage. As the carriage reaches its down position, cams 550 and 551, by rocking plate 552 and arm 580, permit springs 579 to pull the latch levers counter-clockwise to reengage extensions 578.

Rocking of shaft 202 to release pawls 201 from the blocking of gears 189 is accomplished in time with the dipping of the carriage so that release of the gears 189 is properly coordinated with the lowering of the carriage and the meshing of gears 271 with gears 189. Keyed to the shaft 202 on each side of the machine are depending levers 586 slotted to receive pins 587. The rocking cam lever 570 at the right hand side of the machine, looking from the front, includes an integral extension 588 which carries one pin 587 while, at the left hand side of the machine the lever 571 has an extension 589 carrying a similar pin 587. As appears in Figure 48, the members 588 and 589 are of different shapes because of the necessity of getting in and around certain other operating parts which might otherwise interfere.

When the setting clutch rotates the cam 574 to rock the cam levers 570 and 571, the pawls 201 are thus released, except in those orders in which a zero has been set up, as has been previously explained.

Movement of latch lever 575 is effected under the control of the described mechanism, and means are provided for releasing the latch lever 575 at the end of main clutch operation. These include (Figure 49) lever 584 secured to shaft 581, as are levers 580 and 583, so that the three move in unison. Hung on shaft 590 is a lever 591, one end of which is provided with an extension 592 lying against lever 584 and having a portion in engagement with cam 593 keyed to a sleeve 594 rotatably mounted on shaft 595. This sleeve is driven by a separate clutch operated only as an incident to the termination of operations, and known as the "restore clutch."

When the main clutch dog 395 is moved to stop and release main clutch 428 and open the motor circuit, as will be described hereinafter, the restore clutch starts operation and cam 593 is rotated. This rocks lever 591 clockwise to move lever 584 and so rocks levers 575 to release the latched-down carriage through the rocking of the levers 575 by levers 583 and pivotal connections 585.

The sleeve 594 carries another cam 596 (Figure 48) which is employed to prevent the carriage from rising too rapidly. Lever 597, hinged on shaft 598 bears against this cam and against a lever 599 keyed to shaft 600. Lever 601 is also keyed to this shaft and is joined by a pin and slot connection 602 to one of the links 566 so that the rate of rise of the carriage under the pull of springs 569 is no greater than that permitted by cam 596.

AUTOMATIC CLEARANCE INCLUDING MOTOR START AND STOP

To clear the previously described accumulator mechanism it is necessary to rock the clearing shaft 320 the requisite amount, as has been previously described. Since the shaft 320 is journaled in the carriage and moves laterally therewith in shifting operations, and since it is desirable to transmit power from the motor to rock the shaft in any lateral position of the carriage, an extensible driving connection is provided whereby a connection may be effected between the motor and the shaft 320 at any time.

Power for this clearing operation is transmitted through a one-revolution clutch 360 (Figures 30 and 31) driven by the motor through gear 361 (see also Figure 53) which meshes with idler 362 in the main clutch gear train. A cam 363, keyed on a sleeve integral with the driven side of this clutch, is adapted to impart a clockwise rocking movement to lever 364, pivoted at 365 and held against the cam by spring 366, and to thus move the rigid U-sectioned link 367, connected to the upper end of lever 364, to the right, as viewed in Figure 30. The left end of link 367 is pivotally connected to a lever 368 fixed to a sleeve 369 splined to slidable shaft 259, which shaft is journaled in and laterally shiftable with the carriage. This shaft is therefore rocked counter-clockwise by operation of the clutch 360, no matter what the position of the carriage at the time.

As shown in Figure 17, this rocking movement of shaft 259 is transmitted to shaft 320 by means of an arrangement comprising levers 370 fixed to opposite ends of shaft 259 and carrying rollers 371 adapted to cooperate with cam surfaces on levers 372 fixed to opposite ends of shaft 320, so that the latter shaft is rocked clockwise, as viewed in this figure, when the former is rocked counter-clockwise.

The accumulator clear key 373 (Figure 1), by which the clutch 360 is controlled, is mounted above the control keys, to be presently described, so as to be convenient to the operator. Frame stud 374 (Figure 30) lying in a slot in the clear key stem 375 limits its downward movement, while the end of key stem 375 is connected to lever 376. Stud 377 supports one end of lever 376 for rocking movement, while the other end of said lever carries a pin 378 engaged by bifurcated end of clutch operating lever 379 journaled on shaft 380 which also supports clutch dog 381. The clutch operating lever 379 is connected to the clutch dog 381, as shown in Figure 31.

The clutch dog 381 is normally held in position to lock clutch 360 against rotation, and the key 373 is held in raised position by spring 382. Thus, clear clutch 360 is not effective to transmit power from the motor until dog 381 is moved rearwardly to cause clutch engagement. The construction of this type of clutch is well known and is similar to that shown in Figure 11 of Friden patent 1,643,710 to which reference may be had for details thereof.

Upon rearward movement of the clutch dog and resulting engagement of the clear clutch, cam 363 on the driven side of the clutch rocks lever 364 which results in clearing of the accumulator, as has been described.

The clear key can start and stop the motor by means of the following mechanism. Clutch dog operating lever 379 has a downwardly projecting arm 383 positioned over a lateral shelf 384 on bell crank 385 freely supported on shaft 386 in a position wherein a pin 387 on said crank is within the bifurcated end of lever 388. This lever 38 is supported on shaft 389 and carries an extension 390 of insulating material, which is normally pressed against one of a pair of contact arms 391 to spread the contacts and maintain the motor circuit open. When arm 388 is moved counter-clockwise by depression of clear key 373, the motor circuit is closed until clockwise rocking of the lever occurs, when the motor circuit is opened, spring 392 biasing the lever 388 to keep the circuit open.

Operation of the motor for at least one clearing operation is secured, since, with the clearing clutch employed, clutch dog 381 can not enter the clutch housing and cause disengagement until one clutch revolution is practically complete, as is explained in the aforementioned Friden patent. Contacts 391 can not be opened therefore, since lever 388 is held depressed by arm 383 on lever 379 which is held depressed by the clutch dog until the clutch housing has made a revolution when, if the clear key is not held down, the clutch dog may enter the clutch housing and permit lever 379 to rise and release the contact opening mechanism.

To prevent operation of the clear key when one of the operation control keys is depressed, means are provided for locking out the clear key, upon operation of one of said keys. In the form shown, this interlock comprises lever 393 attached to shaft 386 and rotatable therewith. Upon rotation of shaft 386, as by movement of either the main clutch dog 394 or the setting clutch dog 395 which rocks lever 396 as hereinafter described (Figure 44), arm 397 on lever 393 is moved, against the pull of spring 398, to engage shelf 384 on lever 385 to move arm 388 to cause contacts 391 to close. Rotation of shaft 386 can be effected only by a control key other than a clear key and shelf 399 on lever 393 is moved rearwardly by rotation of this shaft 386 to underlie extension 400 on lever 376 and prevent effective depression of the clear key.

Depression of the clear key also locks out the other control keys, extension 400 rocking in to the right of shelf 399 and so preventing rocking movement of shaft 386. The free mounting of lever 385 on shaft 386 permits arm 388 to be moved without moving lever 397 so that the clear key can actuate the clearing mechanism and the motor without disturbing other controls.

The arm 388 can also be actuated to permit the contacts to close, if they are not already closed, by any one of the several carriage shift controlling means through lever 401 engaged with bell crank 402 by a pin and slot connection 403. The bell crank includes a lug 404 lying within a slot in arm 388 so that clockwise rocking of the bell crank results in a closing of the circuit. The pin and slot connection permits the other controls to open and close the circuit without operating link 401.

As has been previously mentioned, upon opening of the presently described main clutch by movement of its clutch dog 394, of the setting clutch by movement of its dog 395, or of the restore clutch by movement of its dog 405, the shaft 386 is rocked by lever 396 which is pinned thereto (Figure 44). Lever 396 includes a lateral extension 406 overlying the setting clutch dog 395 and another extension 409 on the main clutch dog 394. If, under the control of mechanism to be presently described, the main clutch dog is held open, the shaft 386 will be maintained rocked in a clockwise direction so that the contacts remain closed, and the motor continues to operate. Upon the setting clutch dog or the restore clutch dog being moved to a clutch opening position, the shaft 386 is immediately rocked, or is held in rocked position, depending on the sequence of operations which occurs.

A presently described operation of the machine includes an opening of the main clutch dog by the presently described setting clutch. In this operation, the setting clutch remains open for only one cycle of operation, the main clutch being opened during that cycle and remaining open under the control of the operating means initiating the operation. It therefore follows that the shaft 386 is initially rocked by the opening of the setting clutch, but is retained in rocked position by the later opening of the main clutch and the consequent clockwise movement of dog 394 around its supporting shaft.

ADDITION BAR MECHANISM AND OPERATION

The addition bar 800 is ordinarily used for securing a single additive operation but may be used for multiple addition as hereinafter disclosed. The bar is capable of initiating operation of the motor, the setting clutch 430, the main clutch 428, and the several functions and operations controlled by these clutches, including the operation of the restore clutch at the conclusion of main clutch operation, and this irrespective of whether or not the operator maintains the bar 800 depressed or permits it to be returned after or during the single cycle of operation.

This bar (Figures 1 and 54) is provided on the right hand side of the machine and is mounted upon the control plate. The bar proper is carried by a frame 801 which is supported by parallel link mechanism formed by bell cranks 802, both pivoted upon the frame plate. One end of each of these bell cranks is joined to the frame 801 while the other end is connected by link 803. Spring 804 is tensioned between one of the bell cranks and the frame proper to hold the bar in raised position. The frame 801 includes a projection 805 overlying a pin 806 which is carried by another parallel link mechanism (Figure 55) comprising arms 807 and 808, respectively carried by studs 809 and 810, and a connecting link 811.

The arm 807 has a depending arm 812 having a notched end thereof held, by a spring 815, in engagement with a shelf 813 on a bell crank 814 pivotally mounted on lever 816. Downward movement of the lever 812, when its end is hooked over the shelf 813, results in the bell crank 814 being rocked about its pivot on the lever 816, the shelf 813 depressing one arm of the lever 816 and causing that member to rock shaft 817, upon which it is pinned, clockwise. Lever 816 hooks over extension 980 on the division key link 903 to prevent the division key 900 from being depressed (see Figure 77). Also secured to shaft 817 is a member 818 (Figures 56 and 75) having an ear 819 extending into the path of movement of a spring pressed operating member 820, as appears in Figure 75. The ear retains this member 820 latched against the action of the strong spring 821 which tends to rock it clockwise. The member 820 is fixed to shaft 822 to which lever 823 (Figure 41) is also secured. This lever 823 is connected to the main operating bar 503 by means of link 824 and a pin and slot connection 825 so that movement of the member 820, under the pull of the spring 821, results in a downward movement of the main operating bar 503 and release of the setting clutch with consequent operation of the machine, as hereinbefore described.

Depression of the addition bar conditions the main reverse unit for positive drive if it is not in condition for this without altering the effective setting of the multiplier reverse lever, as will be presently described. The depression of the bar brings frame 801 (Figure 54) into engagement with foot 874 on bell crank 868 (see also Figure 57) to rock shaft 869 and lever 871 pinned thereto in case they have been previously set to negative position. Link 872 connects lever 871 to pendular lever 545 so that counter-clockwise rocking of shaft 869 and lever 871 moves link 547 rearwardly to condition the reverse unit and bring foot 867 into position to prevent depression of the subtraction bar 860. The reverse control lever 545 is maintained in position until completion of the operation, point 881 on member 818 abutting either side of extension 882 (Figure 56) on the lever 545.

After the selecting operation, as heretofore described, has been completed, and as the main clutch is being engaged by operation of the setting clutch operated cams, the keyboard is automatically cleared by the following mechanism.

The parallel link assembly comprising members 807, 808, and 811 (Figure 55), which was depressed by depression of the add bar 800, also has a pin support 821ª for one end of a link 830 (Figure 58) which has a slot 822ª adjacent one end, embracing said pin, and a bifurcation adjacent its other end embracing a pin 831 on the keyboard clearing gate 125, which as previously described, is also adapted for manual operation by the keyboard clear key 122 to release all depressed keys. A spring 834, tensioned between one end of link 830 and a frame stud, normally maintains the link 830 and the parallel link assembly in raised position.

When the link 830 is lowered, by depression of the add bar 800, a lug 829 on said link is carried into the path of a lever 827 pivotally mounted on shaft 386 and adapted to be rocked as the main clutch is engaged, by means of a link 826 connecting said lever 827 with a bell crank 520 pinned to the shaft 501, which is the shaft carrying the main clutch dog operating lever 519 (see also Figure 42). Since this shaft is rocked counter-clockwise by cam 517, bell crank 520 and lever 827 will be similarly rocked, and the nose 828 of the latter impinging upon lug 829 will move link 830 to the left (Figure 58), rocking gate 125 clockwise and releasing all depressed keys automatically.

The operation controlling mechanism is also freed from control of bar 800 by this movement of link 830. As the link moves to the left (Figure 58) a second lug 835 thereon rocks lever 812 clockwise removing its notched end from over the shelf 813 of bell crank 814 and permitting spring 837 (Figure 55) to rock the bell crank counter-clockwise against stop 836, thus preventing reengagement of lever 812 over the shelf 813 until the pin 806 has been permitted to rise.

Release of bell crank 814 permits spring 850 to rock lever 816 and its shaft 817 back to normal position as soon as ear 819 on lever 818 which is also fixed to shaft 817, has been released from its position underlying the hooked portion of lever 820.

Rising of pin 806 is prevented pending such release, however, by another interlock provided in the mechanism shown in Figure 55. Member 816 has a bifurcated extension 875 engaging a pin 876 on a bell crank 877 freely supported on shaft 878, which bell crank has a nose 879 over which a lateral extension 880 of lever 807 rides. Extension 880 rises as pin 806 is depressed, so that when pin 806 has reached its lowermost position, the extension 880 will overlie the end of bell crank 877, member 816 having been rocked in the meantime in a clockwise direction also, so that lever 807 can not rise until the end 879 of bell crank 877 has been removed from beneath the end 880 of the lever 807.

To restore these parts to normal position, it is therefore necessary to rock lever 820 counter-clockwise, against the tension of the strong spring 510, to its original position, where it will be latched by engagement of the ear 819 with the end of the hooked extension thereof. This function is accomplished by the operation of the restore clutch 700.

Unless a multiplier key has been depressed concurrently with the add bar, the main clutch will be disengaged after a single cycle of machine operation, and will initiate operation of the restore clutch, as previously described. This is because the multicycle clutch dog latch 635 (Figure 60) is held out of engaging relation with the clutch dog ear 620 by a lug 2053 on lever 2050 unless said lever has been rocked by the movement of the multiplier differential bar in setting a "two" or larger selection, as described in detail in connection with the automatic multiplication mechanism. Normally, therefore, the main clutch dog 620 is permitted to rock back into contact with the clutch as soon as it is released by the temporary latch 628 during the first cycle, and at the end of the cycle, operation of the main clutch will be arrested and operation of the restore clutch initiated as described in connection with the detailed description thereof.

Operation of the restore clutch relatches member 820 (Figure 75) in engagement with the ear 819 of lever 818 in the position shown in this figure. Freely mounted on the shaft 822 to which the member 820 is pinned, is a lever 844 which is adapted to be rocked through lever 847 and links 846 and 845 by a cam 849 keyed to a sleeve attached to the driven side of the restore clutch. Pivotally mounted on the lever 844 is a bell crank 843 (see also Figure 76) having a pin 848 lying in a slot in a bell crank 842, also freely mounted on shaft 822 and positioned by a spring 843A tensioned between one arm of the bell crank 842 and a frame stud. The other arm of bell crank 843 is notched to engage a lateral extension 841 on lever 820, but as lever 844 is rocked counter-clockwise by the cam 849, spring 843A is tensioned somewhat and rocks bell crank 842 clockwise, rocking bell crank 843 counter-clockwise enough to cause its notched arm to override and miss the lateral extension 841 if said lateral extension is in the position shown in Figure 75. However, if the lever 820 has been released by ear 819 and rocked clockwise by spring 821, extension 841 will intercept and engage the notched arm of bell crank 843 before it has been rocked too far by its spring 843A and movement of lever 844 will thus be transmitted to lever 820 to restore it to the position in which it is shown in Figure 75, the notch of bell crank 843 preventing disengagement of the parts during this operation. This arrangement prevents the bell crank 843 from striking the extension 841 during every operation of the restore clutch, in division operations, et cetera, and thus reduces noise in operation.

In this manner the mechanism is reconditioned and restored for another cycle of operation under any desired control mechanism.

SUBTRACTION BAR MECHANISM AND OPERATION

The subtraction bar 860 (Figures 1 and 54) is utilized for effecting a single cycle of negative operation or for repeated subtraction in connection with the multiplier keys. As appears in Figures 54 and 57, this bar is mounted upon a stem 861 supported by pins 862 in suitable slots therein and held in its raised position by a spring 863. The stem 861 is provided with a projection 864 which overlies the pin 806 and operates the mechanism associated with that pin which has been described at length under the operation of the addition bar 800. As has been disclosed, depression of the addition bar 800 positions the reverse unit disclosed in connection with Figures 36 to 40 inclusive, by rocking pendular lever 545 in a counter-clockwise direction, if necessary, so that link 547 is moved to the rear of the machine. Opposite movement of lever 545 by the subtraction bar is effected by extension 864 thereon engaging shelf 867 on a lever member 868 which is pinned to shaft 869. Lever 871, pinned to said shaft, is connected by link 872 to the pendular lever 545 so that when the subtraction bar 860 is depressed, the shaft 869 is rocked in a clockwise direction and lever 545 pulls link 547 to the left to condition the main reverse unit for negative operation.

Lever 868 includes a shelf 874 thereon which acts as an interlock, together with the shelf 867 between the addition and subtraction bars. Thus, when the subtraction bar is depressed, the shelf 874 is positioned against one of the links 802 in Figure 54, while, when the addition bar is depressed, shelf 867 is placed against extension 864 of the subtraction bar to prevent it from being depressed.

The member 818 includes a point 881 which, upon depression of the subtraction bar engages one side or the other of extension 882 of the pendular lever 545 to retain the reverse controls in set position.

CENTRALIZING OF HALF AND QUARTER SPEED SHAFTS

The half and quarter speed shafts, 166 and 167, are centralized so that the gears on each shaft are located in one of several predetermined positions of rest (Figure 52). The centralizing means include centralizing cams 650 and 651 respectively, provided on the half and quarter speed shafts, the cam 650 having two indentations and the cam 651 four indentations because of the difference in the cyclic rotation of the shafts. These cams are provided at the end of the respective shafts adjacent to the outside face of the left frame plate upon which are hinged pairs of arms 652 and 653 respectively engaging the quarter and half speed shaft cams. Each pair of arms is pulled together by spring 654 so that rollers 655 thereon engage the periphery of the cam. The centralizer for the quarter speed shaft operates at all times when the quarter speed shaft is rotated. The centralizing means for the half speed, however, is preferably locked out of operation during multicyclic operation to reduce the noise of operation. Thus the arms 653 include projections 656 between which lateral projection 657 on bell crank 658 can be positioned to hold the arms 653 apart. A spring 659 pulls the bell crank in a clockwise direction, movement of the bell crank being limited by a projection on an arm 660. The arm 660 is pinned to a shaft 661 at the left hand side of the machine. This shaft extends from the left hand frame plate of the machine through the machine to adjacent the main clutch operating dog at which point another lever 662 is pinned to the shaft. This lever has a nose 663 which is engaged by lateral projection 620 on the main clutch dog 395. Whenever the main clutch dog is rocked in a clockwise direction, to open the clutch, the arm 662 is released and is rocked in a counter-clockwise direction by spring 659 pulling on the bell crank. This brings the lateral projection 657 between the projections 656 on the arms 653. Thus, whenever the main clutch is held open for more than a single revolution, the arms 653 are latched apart and the centralizing means on the half speed shaft does not operate. This materially reduces the noise, since the centralizing of the shaft at high speed multicyclic operations is unnecessary and, in actual operation, produces some noise.

When the main clutch dog is released and is free to contact and stop the main clutch, the projection 620 on the clutch dog engages nose 663 and forces bell crank 658 counter-clockwise to remove projection 657 from between the arms 653 before the main clutch dog contacts the clutch.

RESTORE CLUTCH

The restore clutch 700 is employed to effect the release of the carriage latch member 566 and to control the rate of the return of the carriage from its dipped position, as well as certain functions hereinafter described in connection with multiplication and division operations. This clutch is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The lowering of the carriage creates a spring bias tending to move the clutch release dog away from the restore clutch and permit engagement of the restore clutch, but as this dog is normally latched by member 701, the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is finished, the clutch release dog is spring pressed into the full cycle notch of the clutch housing, bringing the restore clutch to rest upon the completion of one cycle of operation.

The clutch particularly employed is similar to that disclosed in the patent to Friden, number 1,643,710, previously referred to. This clutch, which is mounted upon and driven by shaft 649 (Figures 50 and 53), is directly controlled by an extending nose 702 on a clutch release dog in the form of a bell crank 405 which is freely supported on a shaft 600 (see also Figure 48). For controlling the clutch release dog, an M-shaped member 703 is provided which has one foot rotatably mounted on the shaft 600, and a lug 704 thereon, supporting a spring 705 compressed between itself and the left arm of bell crank 405.

An arm 722 keyed to the shaft 600, and thus rocked by dipping movement of the carriage, is resiliently connected to the M-shaped member 703 by a link unit 723 shown in detail in Figure 51A. As appears in this figure, the link structure includes a first link member 706 secured by a pin 709 to the arm 722, and another link 711 secured by pin 712 to the M-shaped member 703, the other ends of each link being slotted as at 713 to receive either the pin 709 or 712. Each link has a cut out portion into which two tenons 714 and 715 extend, the respective tenons being of different lengths so that a column support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 is withdrawn from contact with the main clutch and an extension 409 on said dog is withdrawn from beneath a latch member 701 pivoted on a frame plate, thus permitting said latch member to be rocked counter-clockwise by its spring 717 tensioned between one end thereof and the frame. A lateral extension 718 on said latch member is thereby brought beneath the face 719 of the M-shaped member 703 to prevent the lowering of the carriage, which ensues immediately, from rocking the restore clutch dog 405. The foot of M-member 703 is provided with a shelf 720 overlying one end of a bell crank 721 which is rotatably supported on shaft 611. The other end of bell crank 721 is provided with a roller 707 lying against the periphery of a cam 708 on the setting clutch shaft 431. On rotation of the setting clutch, the bell crank 721 is rocked and shelf 720 is raised by the end of the bell crank to rock the M-shaped member 703 slightly clockwise about the shaft 600. This raising of the member 703 not only insures that the lug 718 of the latch member 701 will engage under the face 719 properly when the main clutch is engaged, but provides for the situation, occurring in certain division operations, when operation of the setting clutch does not cause engagement of the main clutch. In this situation the latch member 701 is not permitted to rock and the cam 708 serves to delay operation of the restore clutch until near the end of the setting clutch cycle. The reason for this delay will appear in the description of the division mechanism hereinafter.

As the setting clutch continues to rotate, the dipping carriage is lowered and shaft 600 is rocked counter-clockwise by arms 601 (see also Figure 48) keyed thereto and connected with the carriage lowering links 566. Arm 722 (Figure 51) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 409 strikes the lateral projection 718a of the latch member 701, rocking it clockwise and removing its lug 718 from under the face 719 of member 703. Spring 716 is then permitted to expand, shortening the link unit 723 and rocking the member 703 counter-clockwise to correspondingly move the restore clutch dog 405 through its contact with lug 724 on said member 703.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 716 until the nose 702 of the restore clutch dog 405 can re-enter the aperture of the housing to disconnect the clutch, whereupon the mechanisms are brought to rest in the position shown in Figure 50.

MAIN REVERSE UNIT

For reversing the direction of drive of the elements driven by the main clutch, particularly the direction of rotation of the half, quarter, and twelfth speed shafts, as well as the drive to the presently described counter actuator, a selectively settable drive reversing unit is provided. This reverse unit 450 (Figures 36 to 40 inclusive) is mounted on the fixed main clutch support shaft 429 and is driven (Figures 32, 35, 36 and 38) from the main clutch by a sleeve 419 on shaft 429 which sleeve is keyed to the driven side of the clutch and has projections 451 engaging slots 452 in the end of sleeve 453 of the reverse unit.

The unit 450 includes a clutch plate 454 integral with sleeve 453 (Figure 39) which rotates on the fixed shaft 429. Notched drive discs 455 and 456 are rotatably mounted on sleeve 453 on opposite sides of plate 453 and disc 455 has rigidly secured thereto gears 457 and 458, while disc 456 has a gear 459 fixed thereto.

Driving connection between clutch plate 454, rotated by the main clutch, and either gears 457 and 458 or else gear 459 is secured selectively by effecting a driving connection between the plate and either of the discs 455 and 456. Clutch plate 454 includes three arms 460, 461, and 462. Hinged on opposite sides of arm 460 are a two-armed dog 463 and a member 464. The dog has radially shaped extensions 465 and 466 at each end thereof (Figures 36 and 37), which are cooperatively positioned with respect to notches 467 and 468 respectively in the discs 455 and 456 (Figure 39). When extension 466 is in engagement with notch 468 in disc 456, a driving connection is established between the plate 454 and disc 456, while if extension 465 is engaged with the notch 467 in disc 455, a driving connection is established between plate 454 and disc 455.

Selective engagement of notches 467 and 468 by the dog 463 is secured by a reverse control unit 469 (Figure 36) adapted to engage either lever 470 or dog 463. Lever 470 is hinged on arm 461 of the plate 454 and is secured to dog 463 by link 471 connected to opposite arms of the dog 463 and lever 470. The other arm of the dog 463 engages pawl 472 (Figure 36) which is hinged on arm 462 of plate 454. Pawl 472 is urged in a clockwise direction by spring 473 positioned between plate 454 and one end of the pawl.

The tail 474 of the pawl overlies the end of dog 463 when the unit is in the position shown in Figure 36 with foot 465 in notch 467. When the unit is in the opposite position and foot 466 is in notch 468, tail 474 of the pawl 472 abuts face 475 on the dog to lock the dog 463, the tension of spring 473 being sufficient to urge the dog into one of the two disc engaging positions.

Since the reverse clutch unit 450 rotates with the main clutch, a half turn constitutes a cycle and the unit always stops with either the ratchet dog 463 or lever 470 over the control unit 469. The arms of both the dog and the lever are formed to cooperate with offset plates 480 and 481 (Figure 40) of the control plate 469, said arms carrying projections or integral lugs 483 (Figure 37) to engage the offset plates.

The unit described provides a connection between the main clutch and the half, quarter, and twelfth speed shafts (Figure 53) in the following way. If gears 457 and 458 are driven by plate 454, movement will be transmitted to drive the half speed shaft directly through gear 484 engaging gear 457, in a one to one ratio therewith. The quarter speed shaft is driven off gear 485 on the half speed shaft at a two to one reduction by idler 486 and gear 487 on the quarter speed shaft. The twelfth speed shaft is driven at a three to one reduction by gear 488 on the quarter speed shaft driving gear 489 on the twelfth speed shaft.

When gear 459 is driven by plate 454, the twelfth, quarter, and half speed shafts are driven in the opposite direction. Instead of gears 457 and 458 being driven directly from the main clutch, a gear train, including idler 490 engaging gear 459, is used. This train includes gear 459, idler 490, gear 491, and gear 492 secured to a common sleeve 493 and driving gear 458, thus rotating gear 457 in the opposite direction.

CONTROL AND OPERATION OF MAIN REVERSE UNIT

Subtraction operations are accomplished by reversing the direction of rotation of the half, quarter, and twelfth speed shafts. Means are therefore provided (Figure 36) which may condition the main drive for reverse operation automatically by operation of the setting clutch 430. These include the previously described reverse unit.

A pendular lever 545 is capable of being acted upon by various control means and operating means hereafter described to cause actuation of the reverse unit and change its setting. The pendular lever 545 is hinged on stub shaft 546, and a reverse unit controlling bar 547 is hinged thereon and supported by a link 548 having a bifurcated end slidable about setting clutch dog shaft 501. The reverse unit control bar 547 has an upturned end 549 underlying the reverse control unit 469 which is hinged on shaft 386 so that whenever shaft 431 is rotated by the setting clutch, and cams 550 and 551 rock plate 552, shelf 553 will engage and raise the reverse control bar 547 to bring the upper face of its upturned end 549 into contact with one or the other of cross-ties 554 and 555 (Figure 36) on the reverse control unit 421.

The reverse control unit 469 includes a portion 556 having a radial slot 557 therein through which shaft 558 extends, and a spring pressed pawl 559 is hinged on the plate to releasably retain the control unit with the pawl on one side or the other of shaft 558, after it has been set by movement of reverse bar 547. Spring 560, as shown in Figure 36, is normally effective to position lever 547 in its rearward position so that it will be raised by cams 550 and 551, upon rotation of the setting clutch 430 and shaft 431, to engage cross-tie 554. The reverse clutch is thereupon conditioned by control unit 469 to drive the calculating mechanism in the adding direction.

If the pendular lever 546 is moved to draw reverse bar 547 forward, by any of the controls hereinafter described such as the subtraction bar, or any of the minus setting mechanisms, the upturned end 548 of lever 547 is placed beneath cross-tie 555 so that, when the cams 550 and 551 are rotated, the reverse control unit 469 conditions reverse unit to drive the calculating mechanism in the subtractive direction. The pawl 559 retains the control unit 469 in position between operations of the setting clutch.

SETTING CLUTCH

The present machine employs a setting clutch and mechanism driven thereby to effect various operations incident to the commencement of a calculation under the power of the motor. In this way the operator is not required to furnish the power requisite to such operations by manipulation of a control key. This improves the accuracy of the operator and quickens operation since the operator is not tired as much as with a machine requiring heavy pressure to manipulate its keys.

Operation of the setting clutch 430 is under the control of the machine operator, particularly through the instrumentality of various operation control keys presently described. The control of the clutch 430 is such that, immediately upon depression of one of said keys, the clutch is engaged, clutch dog 394 being raised to release the clutch, start the motor, and permit shaft 431 to be driven. Normally, however, the clutch dog 394 (Figure 41), which is freely supported on shaft 501 (Figure 44), is held in engagement with the clutch by spring 502.

To permit operation of the setting clutch by any one of the control mechanisms hereinafter described, an operating bar 503 is provided which is adapted to be directly or indirectly operated by all of them. Bar 503 is supported on the right side of plate 524 (see also Figure 45) by means of levers 504 and 505 pivoted to the plate 524 at 506 and 507, respectively, and to the bar at 508 and 509, respectively, and is normally held in raised position by spring 510 tensioned between the lower end of lever 504 and shaft 822.

So that lowering of the bar 503 may lift the clutch dog 394, a bell crank 512 is pivoted to the lever 505 at 513, and provided with a notched arm 514 which overlies a lateral extension 515 on clutch dog 394 when the bell crank is in the position in which it is normally held by a spring 516 tensioned between the other arm of the bell crank and bar 503.

To limit operation of the setting clutch 430 to a single cycle, since this is all that is required to operate the mechanisms actuated by clutch 430, means are provided for returning the clutch dog 394 to cause disengagement of the clutch and shaft after half a revolution of the clutch and shaft 431, even though the control key initiating operation of the clutch 430 is held in depressed position. This includes releasing the clutch dog 394 from hooked arm 514 so that the spring 502 may move the clutch dog to contact the clutch 430, particularly one of the notches 423 and 424.

The mechanism for effecting this operation includes the cam 517 (Figure 42) on the setting clutch shaft 431 (Figure 45), which is engaged by a roller 518 on the rocking lever 519 pinned to shaft 501. A bell crank 520 (Figure 41) is also pinned to shaft 501 and is provided with a lateral projection 521 at its forward end which may engage the arm 514 and rock the bell crank 512 against the tension of spring 516, about pin 513, to release the lateral projection 515 of the clutch dog 394.

Immediately upon operation of clutch dog 394 by arm 514, engagement of clutch 430 ensues and shaft 431 is rotated. Cam 517 thereupon rotates and moves projection 521 to engage hooked arm 512 and release the clutch dog 394 which, under the tension of spring 502, is urged to stop the clutch 430 and the shaft 431 upon completion of half a revolution. Spring 522 tensioned between bell crank 520 and the frame, urges shaft 501 clockwise and keeps roller 518 against cam 517.

The setting clutch, under the control of the operation control keys of the machine, operates the previously described power set selection and locking system, and effects the dipping of the accumulator carriage. The main clutch, for driving the actuator, is also operated by the setting clutch, the two clutches being interlocked so that another setting clutch operation can not be initiated during operation of the main clutch.

For these purposes, the setting clutch controls the operation of a shaft 431, which, in Figure 45, is shown extended between the left side plate 523 and the center plate 524. Upon this shaft are mounted in succession from left to right, the first dipping mechanism cams, the first set of selection lock gate cams, the several selection setting cams, of which three sets are usually employed, the shaft centralizer cam, another set of selection lock gate cams, the second dipping mechanism cams, the center plate; and, on the other side of the center plate, the main reverse cams, the setting clutch proper, the restore clutch conditioning cam, and the main clutch starting cam, at the end of the shaft.

MAIN CLUTCH OPENING

The main clutch is engaged and its operation initiated by the setting clutch. Thus, when any one of the operation control keys is depressed, and the setting clutch started in operation, as has been previously described, the main clutch is automatically engaged, upon operation of the setting clutch, and may be held engaged for one or more cycles of operation, depending on the operation called for by the key depressed.

The main clutch structure has been described, it being of the roller clutch type as disclosed in connection with Figures 32 to 35, inclusive. The main clutch 428 is fixed to a rotatable sleeve mounted on the fixed shaft 429 which is positioned between frame plates 524 and 610 of the machine (Figure 53). The clutch is controlled by clutch dog 395 (Figure 42) mounted on stub shaft 611 and urged into engagement with the main clutch by spring 612ª, tensioned between the left end of the dog and the frame.

A rocking lever 519 is pinned to shaft 501 and carries a roller 518 in engagement with the cam 517 carried by the setting clutch shaft 431 (Figure 42). The rocking lever carries a member 612 hinged thereon and urged to rock clockwise with respect to the rocking lever by spring 613, movement between the lever and member being limited by a pin 614 on the lever lying within a notch on the member 612. The member 612 is provided with a nose 615 which may engage a notch 616 on clutch dog 395 with a hooking action to prevent disengagement of these two parts. The push of member 612 against the dog serves to raise said dog toward the end of the half rotation of setting clutch shaft 431, the dog being rocked clockwise, and the main clutch 428 is freed for operation. Further rotation of cam 517 permits return of the rocking lever to the position shown in Figure 42 and permits clutch dog 395 to contact with and stop the clutch when it is freed from the holding means, hereinafter described, which can selectively lock the dog out of clutch engaging position for a plurality of cycles. The hinging of member 612 to the rocking lever 519 permits the setting clutch to operate without opening the main clutch in certain phases of the division operation as hereinafter described.

INTERLOCK BETWEEN MAIN AND AUXILIARY CLUTCHES

To prevent initiation of another setting clutch operation by depression of a control key before the main clutch has completed operation and has come to a full stop, means are provided for preventing actuation of the setting clutch during operation of the main clutch.

This means is in the form of an interlock which, as is shown in Figure 43, includes rocking bell crank latch 617 freely mounted on shaft 561. As disclosed in connection with control of the setting clutch, bar 503 is depressed upon operation of any of the control keys, and acts through bell crank 514 to cause engagement of the setting clutch. Spring 619 pulls latch 617 in a clockwise direction and normally holds it against extension 620 on main clutch dog 621 so that when dog 395 is rocked to cause engagement of the main clutch, latch 617 rocks forward and engages extension 622 on bar 503 (see also Figure 41). As latch 617 is released to rotate in a clockwise direction upon movement of the main clutch dog 395, the side of the latch strikes and is held against projection 622. The latch continues in this position until the depressed key is released and bar 503 is raised by spring 510 when the latch, under the tension of spring 619, is released and immediately passes on in its interrupted journey to come to rest with shoulder 623 beneath projection 622. In this position, spring 619 maintains latch lever 617 in position to prevent depression of bar 503 regardless of the operation of the operation control keys. The main clutch is thus free of interruption by intentional or inadvertent depression of another control key during its operation.

Stopping of the main clutch includes counter-clockwise rotation of the clutch dog 395 and consequent counter-clockwise rotation of latch 617 to return it to the position shown in Figure 43 wherein the mechanism is shown free of the interlock and capable of carrying out any selective operation upon depression of bar 503.

MAIN CLUTCH CONTROL

To insure proper engagement of the main clutch, temporary retaining means are provided for locking the clutch dog out of engagement with the clutch during the first portion of the first cycle of its operation. This means comprises lever 625 (Figure 42) rotatably mounted on shaft 626 and urged by spring 627 to engage lateral projection 620 on the main clutch dog 395. The lever 625 includes a notch 628 which engages lateral projection 620 and retains the clutch dog 395 in clutch opening position upon the very first movement of the clutch dog by the setting clutch, as has been previously described. During the first rotation of the main clutch, cam follower 629 is rocked about shaft 611 by cam 630 on the main clutch shaft 428, so that the pin 631 on the cam follower rocks the lever 625 on the shaft 626 and releases the main clutch dog.

An additional latch is provided, however, whereby the main clutch dog may be latched free of the clutch for any selected number of cycles, and comprises an arm 632 (Figure 42) and lever 633 pinned to shaft 626 and urged in a clockwise direction by spring 634 tensioned between lever 633 and the frame. When the machine is at rest and bar 503 is in raised position, arm 632 is held by projection 622 on bar 503. Downward movement of bar 503 is accompanied by movement thereof to the right and permits lever 632 to rock clockwise so that shaft 626 is rocked by the said spring 634. Also pinned on the shaft 626 is an arm 635 having a notched upper end and a roller 635 provided adjacent one face of the notch which may engage lateral projection 620 on the main clutch dog and latch the main clutch dog out of contact with the clutch. The roller 635 permits the main clutch dog to slide off it easily and quickly when the end of the clutch operation has been determined and holds the main clutch dog slightly lower than does notch 628 so that after lever 625 is once released it can not reengage the main clutch dog and the dog is thus left free to drop home as soon as lever 633 is released.

If the lever 633 has not moved into position to engage the lateral extension 620, then the clutch dog can move to engage the clutch and stop it after a single cycle of operation. Lever 633 is latched from engaging the main clutch dog except when multicyclic operations of the main clutch are called for. As will presently appear, particularly during multiplication and division operations, a lever 2050 (Figure 60) is hung from a shaft 2004 and is biased in a clockwise direction by a spring so as to overlie the tail of a lever 2051, also keyed upon the shaft 626. Except when multicyclic operations of the main clutch occur as called for, a shelf on the lever 2050 overlies the tail of lever 2051 and prevents clockwise rocking of shaft 626 so that lever 633 is prevented from engaging the extension 620 of the main clutch dog. However, if the lever 633 is permitted to rock, it will engage the lateral extension 620 and will retain the clutch dog in clutch open position so that further rotations of the main clutch will occur as has been predetermined.

The main clutch is thus operatively closed and engaged to drive as long as the operation control is effective, after which spring 510 returns bar 503 and pulls lever 632 in a counter-clockwise direction. Shaft 626 is thus rotated and bell crank 633 rocked to release the extension 620 of the main clutch dog which contacts, stops, and disengages the clutch.

AUTOMATIC MULTIPLIER UNIT

The machine of the present invention includes an automatic multiplier unit comprising a row of multiplier keys 2101 which is shown in Figure 1 adjacent to the right hand side of the machine, under control of which automatic positive and negative multiplications can be effected. This unit also includes a key section 2002 (Figures 59 and 60) which is quite similar to that employed for setting a factor of a calculation, and disclosed in connection with Figure 2.

In the present machine, the key section 2002 is placed adjacent to the right hand side of the machine, as appears in Figure 1. However, the mechanism set thereby is placed adjacent to the keyboard and between the keyboard and the division, plus, and minus keys in Figure 1. The key section 2002 (Figure 59) includes the usual differentially settable bar 120 which acts, indirectly, to move the swinging member 132 mounted on shaft 2004. For this purpose, a lever 2003 is pinned to a shaft 2004 which extends to the left from the key section 2002 as appears in Figures 1 and 59. The differentially settable bar 120 is engaged with a pin 2005 upon this lever. At the other end of the shaft 2004 another lever 2006 is secured and is provided with a bifurcated end receiving a pin 2007 which is mounted upon the multiplier selection segment 132. As has been disclosed in connection with the manually set selection mechanism, the swinging member 132 is likewise effective to rotate a selection cam unit 146 described in detail in connection with Figures 2, 6, 7, 8, and 9.

The multiplier unit includes members 216 and 217 which, as has been disclosed in connection with the power set selection mechanism, are effective to sense the setting of the cam unit 146 and, when the selection gate 236 is released, position plates 172, 178, 184, and 190. In the present instance, the multiplier unit includes four plates designated 172, 178, 184, and 190, and cooperating with driven gears 2009 (Figures 53 and 59) driving idler 2010 which in turn drives gear 2011. The gears 2009 are keyed to sleeve 2012 supported by shaft 170 which is in turn driven by the twelfth speed shaft 168 (Figures 53 and 61) through a gear train including gear 2025 on the twelfth speed shaft, idler gear 2026, and idler gear 2027 driving gear 2028 on the sleeve 2012. Since the twelfth speed shaft is rotated whenever the main clutch is open, gears 2011 are driven thereby. As has been developed in connection with the power set selection mechanism, any one of the group of plates may be selectively moved to engage the gear carried thereby with gears which, in this case, are carried by sleeves rotatably mounted on the half or quarter speed shafts. Movement of these gears is utilized to control the number of actuations of the main clutch and thereby effect a positive or negative multiplication in all operations where in the multiplier value is two or greater. As will presently appear, rotation of the driven sleeve is utilized to disengage the main clutch after the predetermined number of main clutch operations have occurred.

The driven sleeve rotatably mounted upon the half speed shaft 166 carries gears 2013, 2014, 2015, and 2016 connected thereto as a unit. The driven sleeve mounted upon the quarter-speed shaft carries gears 2017, 2018, and 2019 connected together as a unit and rotatably supported upon the quarter-speed shaft. These gears are mounted upon the half-speed shaft for the sake of convenience and are not connected thereto, the half-speed shaft only providing a convenient support. Gear 2020 is also mounted upon the quarter-speed shaft but is not connected to the sleeve carrying gears including 2017, 2018, and 2019. As typical of the gears which may be used, the gears 2013 to 2016 respectively include gears having twelve, fourteen, sixteen, and eighteen teeth, while the gears 2017 to 2020 inclusive, include gears having twenty, sixteen, twelve, and twelve teeth, respectively. The ratio of these gears to the gears driving them is such that gears 2013 to 2019 inclusive respectively provide selection ratios extending from a "nine" multiplier to a "three" multiplier, while the gear 2020, as will presently appear, provides in combination with other mechanism, the "two" selection.

Depending upon the selection which has been made, one of the plates is swung either to the right or to the left, as viewed in Figure 59, to engage one of the gears in the group 2013 to 2020 inclusive. The three other plates remain in that position shown in Figure 59 in which gears 2011 are not meshed with any gear in the group 2013 to 2020 inclusive.

A single cam member 2021 (Figures 61 and 62) is attached to the sleeve carrying gears 2013 to 2016 inclusive and, as will presently appear, is adapted to rock a bell crank 2022 universally pivoted on the frame at 2029 so as to open the main clutch and stop the machine as hereinafter described, after the cam member 2021 has made a single rotation in either a clockwise or a counter-clockwise direction. Thus, for example, gear 2014 which is that providing for seven main clutch actuations and results in a positive or negative multiplication by the value "seven," makes one rotation while the main clutch is making seven rotations. Since member 2021 is connected to the unit which includes gear 2014, it will likewise make one rotation and at the end of this rotation is effective to rock the bell crank 2022.

A double cam member 2023 is included in the same unit with gears 2017, 2018, and 2019, and is effective upon half a rotation in either clockwise or counter-clockwise direction, to rock the same bell crank 2022. Thus, gear 2018 is effective to control the multiplication, either positive or negative by the value "four," the main clutch making four rotations. During the four main clutch rotations, gear 2018 and the member 2023 make but half a rotation, the direction depending upon positive or negative multiplication. At the end of this half rotation, the member 2023 is effective to rock the bell crank 2022. Gear 2020, providing for multiplication by the value "two," is connected to the triangular member 2024 adapted to cooperate with a roller 2077 on one arm of bell crank 2022. This member is adapted, when gear 2020 is being driven, to rock the bell crank 2022 during the second cycle of main clutch operation.

Depression of any one of the value keys from "one" to "nine", inclusive, is effective to open the setting clutch, and this in turn initiates operation of the main clutch. The multiplier key section includes, in addition to that mechanism disclosed in Figure 2, a bar 2030 (Figure 60) which is engaged by the stems of keys "one" to "nine" inclusive and is mounted for parallel movement by link 2044 and by a bell crank 2031, the bell crank being urged in a clockwise direction by spring 2032. A link 2033 is extended between an ear of the bar 2030 and a lever 2034 included in a lever system comprising lever 2034, lever 2035, and lever 2036, as appears in detail in Figure 63. These three levers are pivotally mounted upon a common pin 2037 fixed in an ear of the key frame. Levers 2034 and 2035 include projections 2038 and 2039 between which spring 2040 is compressed to urge the levers apart. Similarly, lever 2036 includes projection 2041 while lever 2035 includes another projection 2042 between which projections, spring 2043 is compressed. Lever 2035 includes a projection 2045 limiting movement of lever 2036 and a projection 2116 limiting movement of lever 2034 with respect to said lever 2035. Lever 2035 also includes a pin 2046 which lies beneath bar 2030 and which is forced downwardly when the bar 2030 is depressed upon lowering of any one of the key stems associated with keys "one" to "nine" inclusive. Depression of the "zero" key also rocks lever 2035 downwardly by means of lever 2090 which underlies said key and carries a pin 2093 overlying the end of lever 2035.

It is desired to cause engagement of the setting clutch upon complete depression of any key from "one" to "nine", and to prevent the initiation of operation before depression of such a key has been completed. The final trip-off in such a case is placed under control of the key latching mechanism. However, the key latching mechanism also operates when the "zero" key is depressed for a carriage shifting operation, and operation of the setting clutch should not be initiated. For this reason, control of the trip-off is effected jointly by the bar 2030 and the key latching mechanism, as exemplified in the following structure.

It will be recalled by reference to Figure 75, that engagement of the setting clutch may be effected by rocking lever 818, connected to shaft 817, so that its lug 819 underrides the upper extension of member 820. As shown in Figure 60, there is also connected to shaft 817, a lever 2047 having a lug 2048 underlying the lever 2033, so that a sufficient lowering of lever 2033 will rock lever 2047, shaft 817, and lever 818 to release member 820 and start the setting clutch.

Opposite ends of lever 2033 may be lowered by different means, as will appear, but the leverages are so arranged that the lowering of either end alone will not rock shaft 817 enough to cause operation of the setting clutch. As soon as both ends have been completely lowered, however, the additional rocking of shaft 817 will have released member 820 to cause operation of said clutch.

As a multiplier key of any value from "one" to "nine" is depressed, the underlying parallel bar 2030 is depressed lowering the right end of lever 2033. The lever 2035, having a pin 2046 underlying bar 2030, is also rocked by this movement and compresses spring 2040 rocking lever 2034 slightly and causing the lug 2062 to move the latch bar 2055 to the left until it abuts the lug 2015a of the moving key, arresting further movement of lever 2034 and causing spring 2040 to be further compressed. As the lug 2015 is moved below latch bar 2055, spring 2040 is permitted to expand rocking lever 2034 to simultaneously bring the latch bar over the lug 2015a and lower the left end of lever 2033. Both ends of the lever 2033 being now lowered, shaft 817 will have been rocked sufficiently to cause engagement of the setting clutch.

The latch bar 2055 holds the depressed key down and all other keys up until it is retracted. Means are provided for positively retracting the latch bar, so that proper operation will be insured even though the operator is bearing down on another key, and for holding it in retracted position until the operator has released the first key, so that a key can not be left in latched down position after the machine has come to rest.

For this purpose, there is provided a lever 2058 (Figure 60) pivotally mounted on the key frame at 2059. As the setting clutch shaft 431 revolves at the beginning of a multiplication operation, cam 517 thereon rocks shaft 501 bringing arm 2060 against the lower end of said lever 2058, or as link 1396 (Figure 68) is reciprocated in the course of a manually initiated carriage shifting operation, its lug 1399 is brought against the lower end of said lever 2058. The upper end of lever 2058 (Figure 60) engages an abutment on the latch bar 2055 so that when the lever is rocked by either of these means, the latch bar is positively moved to the right to release the previously depressed key and permit the depression of any other key. By the time this is done, the gate 236 (Figure 59) has locked in the selection made by the first key, and the depression of a second key will have no effect until the first operation is concluded.

If the operator is continuing to bear down upon the first key at the time the latch bar 2055 (Figure 60) is returned to the right, the bar will be latched in its rightmost position until pressure on the key is relieved. This is the function of the member 2036 (see also Figure 63). The slight initial leftward movement of latch bar 2055 as a depression of a key is begun, is sufficient to carry the notch 2057 therein out of alignment with the lug 2061 of member 2036 so that the lug rides along the smooth under surface of the bar during further leftward movement thereof, and spring 2043 is compressed by depression of the key. However, if the key is being held down at the time that latch bar 2055 is returned to the right, spring 2043 will expand to move lug 2061 into the notch 2057 and thus hold the latch bar in its rightmost position until the key is released, permitting lug 2045 of member 2035 to rock the member 2036 so as to remove its lug 2061 from the notch 2057. Under such conditions the latch bar returning mechanism overcomes spring 2040 and rocks lever 2035 to raise the left end of lever 2033 so that the setting clutch can not be engaged a second time by the key held down.

When a multiplier key is depressed, the V-slot bar 120 (Figure 59) moves toward the right with the result that lever 2050 (Figure 60) which hangs from shaft 2004, is rocked by bar 120 engaging projection 2052. However, the movement thereof caused by the "one" key is insufficient to remove shelf 2053 from over lever 2051 so as to permit spring 634 to rock lever 633 and its roller to latch the main clutch dog 395. However, when a "two" key or a key of a higher value is depressed, the bar 120 is moved a greater amount and lever 2050 is rocked so that lever 2051 is freed and lever 633 latches the main clutch dog 395 until after the desired number of multicyclic operations have taken place, as determined by the depressed key.

To stop the machine after a predetermined number of multicyclic operations have occurred, cams 2021, 2023, and 2024, and bell crank 2022 are employed. As appears in Figure 61, the right hand face of cam 2021 has a cam face at 2070, so that at the beginning of clockwise or counter-clockwise rotation of cam 2021, end 2071 of the universally pivoted bell crank 2022 is moved aside and rides along the outside face of the cam until the high point thereof has been passed, when the bell crank end is moved back into cooperative relation with the peripheral face of the cam by spring 2122 which includes a flat strip 2123 therein to act as a guide for the spring and to centralize lever 2022. As the cam approaches the end of its rotation, the bell crank is rocked in a counter-clockwise direction. This rocks lever 2072 clockwise about its pivot and rocks lever 2117 in a counter-clockwise direction. Lever 2117 is pivotally mounted on the frame by pin 942 and connected by a pin and slot connection to a lever 2118 pinned on shaft 2119. Shaft 2119, as appears in Figure 42, also carries a bell crank 2073 which, upon clockwise rotation of shaft 2119, engages extension 2075 on member 633 and rocks that member to release the main clutch dog latch 635.

The inside face of cam 2023 is provided with similar cam faces, as appears in dotted lines at 7076 (Figure 61), so that a roller 2077 on bell crank 2022 first rides about the outside face of that cam and then onto the peripheral surface of the cam to ride over the high point thereof, irrespective of whether the cam is rotating in a clockwise or a counter-clockwise direction. When a "two" selection is made, and cam 2024 is rotated by gear 2020, the cam follower follows the periphery of the triangular-shaped cam 2024, under the pull of spring 2122, and rocks lever 2072 and shaft 2119 upon riding over the high point of the cam 2024. Either of these operations releases the main clutch dog latch and stops the machine as hereinbefore described.

To prevent rotation of gears 2017, 2018, and 2019, when a selection is made on any one of gears 2013, 2014, 2015, 2016, or 2020, a pawl 2080 (Figure 59) is provided which is held by spring 2081 in engagement with one of the gears in the group of 2017, to 2019 inclusive. However, when a selection is made in this group, shelf 2082 on the pawl is engaged by one of the multiplier selection plates 172, 178, 184 and 190 and is moved in a counter-clockwise direction, against the tension of spring 2081, to permit these gears to rotate freely. A similar pawl is provided in connection with gear 2020 so that when a selection is made with any one of the gears of the groups 2013 to 2016 inclusive, or 2017 to 2019 inclusive, gear 2020 is held. Another pawl 2083 is associated with the group 2013 to 2016 inclusive and is held in engagement with this group by spring 2084. This pawl, upon a selection being made in the group 2013 to 2016 inclusive is rocked in a clockwise direction by one of the plates engaging shelf 2085 thereon to permit rotation of this group of connected gears.

Plus or minus multiplication operations are secured by manipulation of lever 2100 (Figures 1 and 57). This lever, as appears in Figure 57, is mounted on shaft 869 and is connected by link 2101 to a link 2102 supported from a stud 2103, and a spring link unit 2104, similar to that used for restore clutch control and shown in Figure 51, supported on a stud 2105. The link 2102 and the unit 2104 cooperate to maintain the lever 2101 definitely in either a left or a right position. Also depending from the shaft 869 are a pair of links 2106 (Figure 57B) which are connected together by a tension spring 2107. These links each include an ear 2108 extending to engage the lever 2100 (Figure 57A). Each of the links also include an ear 2109 between which the spring 2107 is positioned and which extends on either side of the lever 871 which is pinned to the shaft 869. When the lever 2100 is moved, as from the plus position in which it is shown in Figure 57, to a position toward the rear of the machine, unit 2104 is compressed and as the lever continues in its journey, the link expands and forces the link over positively into the other position. Movement of the lever 2100 also moves the links 2106 and, through the medium of the ears thereon, pulls the lever 871 around in a clockwise direction to position pendular lever 545 so as to thereafter cause negative operation by a suitable adjustment of the reverse unit upon operation of the setting clutch, as has previously been described.

It has been previously mentioned that operation of either the addition bar 800 or the subtraction bar 860 did not affect the setting of lever 2100. This is because rotation of the shaft 869, by either the addition bar or the subtraction bar, results in the movement of lever 871 in the direction necessary to condition properly the reverse unit if that unit is not set for the direction called for. However, the strength of spring in unit 2104 is such that instead of the lever 2100 being moved, the spring 2107 is extended and while the lever 2100 is moved slightly, it is not taken from out of that position in which it is set. Multiple addition and subtraction operations can be secured by depressing the addition bar or the subtraction bar simultaneously with depression of a multiplier key. The effect of depressing the addition bar and subtraction bar is to prevent a carriage shift operation from following the multiple operation, and to clear the keyboard so that thereafter other values can be entered. The disabling of the shift at the end of a multiple addition operation will be presently described in detail. The clearing of the keyboard has been previously described in connection with the addition bar.

Under the "Power Set Selection Mechanism" has been described the feature of the value selected in the keyboard being released as soon as the power set selection mechanism has operated and the power set gate 236 has moved in to lock the setting. This feature is also useful in multiplication, for as soon as the gate has been moved to lock the multiplifier setup, the multiplier key is released and another value can be set up in the multiplier key section, if desired. This feature enables very rapid multiplications to be secured for values can be set into the machine as soon as the previously depressed key is released and while the machine is running out the previous multiplication operation. The time lapse between successive multiplication operations is practically negligible, since, due to the high speed of operation of the machine, and the comparatively slow rate of manual operation by the operator, the machine is frequently waiting upon the operator for entrance of another multiplier value. The positive operation of the key lock bar, in any event, eliminates the possibility of interference with operations caused by "riding" a raised key before the lock bar has receded to permit its depression.

Depression of the zero key is effective to rock member 2090 secured to shaft 2091 to initiate operation of the shift mechanism, as hereinafter described. While the movement of this member also forces lever 2035 to move and thereby cause movement of lever 2047 to some extent, the operating bar 2030 is not depressed and lever 2047 is not moved the extent necessary to rock shaft 817 sufficiently to cause operation of the setting and main clutch. Movement of lever 2035 brings extension 2062 into notch 2092 in the channel bar 2055 to move the bar and lock the value keys when the zero key is depressed. When a value key is depressed, as has been previously pointed out, lever 2035 is moved and pin 2093 is free to follow lever 2035. However, the shift is delayed until the end of the main clutch cycle when it takes place automatically, as will be presently explained.

DIVISION

The machine of the present invention includes means for automatically performing problems in division. In such operations the dividend is set up in the accumulator, the divisor is set up on the keyboard, and the automatic division key is depressed. The machine thereupon carries out automatically the operation of dividing the divisor into the dividend and registering the quotient in the counter 1801, the carriage being automatically shifted after registration of each quotient digit successively. The operation consists of successive subtractions of the divisor from those digits of the dividend which are registered in orders of the carriage aligned with the actuating mechanism, and which may be called the "effective dividend". As the carriage is automatically shifted to the left, additional dividend digits are successively brought into alignment with the actuating mechanism until the carriage reaches its leftward limit.

In performing such an operation it is necessary to shift the carriage when the aforementioned subtractions have reduced the effective dividend to a value below that of the divisor. Prior machines have done this automatically by utilizing the overdraft registration of nines across the accumulator to initiate, first a corrective addition cycle, and then a carriage shifting operation. The present machine, however, provides mechanism for mechanically comparing the dividend and divisor and utilizing the indication of their relative magnitude, thus secured, to select the proper ensuing operation. All overdrafts, which have heretofore been necessary only for control purposes, can theoretically be eliminated by the use of such a mechanism, but in practice it is not practicable to set the controls to such a fine adjustment and some overdrafts do occur. These are, however, properly corrected by the mechanism provided.

Keyboard controlled mechanism

It will be recalled, from the description of the accumulator mechanism of the present machine, that when the carriage is dipped to bring the accumulator in position for operation by the actuating mechanism, the numerals registered may be moved out of alignment with the sight openings since each accumulator element assumes a position indicating not only the value registered on itself, but is also moved ahead to indicate such partial increments of an additional unit as have been transmitted to it from lower orders by the entrained carry mechanism. It is therefore necessary to provide mechanism for forming a similar representation of the divisor value in the decimal orders selected for effecting control of the operation.

Levers 900 (Figure 86) carrying sensing shelves 901 are adapted to be proportionately positioned, under control of the manually set selection mechanism of a plurality of keyboard orders, so as to form such a mechanical representation of the true rather than the decimal value set up in that order and to the right thereof. According to the present disclosure, it is unnecessary to transmit partial increments to each lever 900 from keyboard orders below the next adjacent order, and no provision for it is therefore disclosed.

Each sensing lever 900 is pivoted by pin 902 on a bell crank member 903 and is urged to rock counterclockwise by a spring 904 tensioned between member 903 and a stud 900a on the sensing lever 900. The lever 900 includes a stop lug 905 which overlies and engages member 903 to limit the movement of the lever 900 and has a blocking tail 906 which may be positioned to permit a gate 907 to rock in a counter-clockwise direction and prevent further actuation or to block the gate from rocking and thus have the machine operation continue, as will presently appear.

Bell cranks 903 are pivotally supported, in each order, between adjacent brace plates 142, as appears in Figure 87, and include a bridge 913. Upon an extension 914 of each bridge is fixed a small sleeve 915 having a pin 916 slidably positioned therein and enclosing a spring 917a adapted to push the pin to the left, engaging head 916a on the pin with the end of the sleeve to limit the travel of the pin. The pin of each order extends through a hole in each brace plate into the bell crank member 903 of the next higher order to support both the bell crank member upon which it is carried and the corresponding bell crank member in the next higher order. This construction, as contrasted with the use of a solid continuous line shaft, not only permits easy removal of parts for servicing, et cetera, but, as will presently appear, permits certain members to swing across the center line of pins 916 (see Figure 87).

Bell crank member 903 and lever 900 may be rocked as a unit about the pivot provided by pins 916 by lever 917 freely mounted on shaft 131 and carrying a pin 918 projecting into an open slot 919 in the member 903. Pivotally mounted on lever 917 (Figure 85) is a second lever 921 having an offset portion 922 adapted to bear against the end of an extension 923 on an adjacent higher order selection segment 132. Another offset portion 924 on the opposite arm of lever 921 is adapted to bear against an extension 925 of an adjacent lower order selection segment 132. The two arms of lever 921 are so proportioned, and their bearing points on the two segments are so located, that movement of the lower order segment will transmit only one-tenth as much movement to the supporting lever 917 as will corresponding movement of the upper order segment. By this arrangement, lever 900 with its sensing shelf 901 may be raised about pivot pins 916 a number of increments corresponding to the setting of the adjacent higher order selection segment 132, plus an additional fraction of an increment decimally proportionate to the setting of the adjacent lower order selection segment.

To avoid undue loading of the key section, since the keys move the selection segments 132 directly, it is not desirable to move the levers 921 by the depression of keys, and since it is also necessary to keep the sensing shelves 901 out of range of possible interference with carriage elements except during certain portions of the division operation, mechanism is provided for normally maintaining all levers 921 raised beyond the furthest points reached by selection segment extensions 923 and 925 and for maintaining all levers 900 lowered sufficiently to avoid the possibility of contact with any carriage parts.

This is accomplished by mechanism including a plurality of levers 930 connected to shaft 931 by means of a narrow key in a wider keyway (Figures 86 and 88), and normally maintained in their extreme counterclockwise position with respect to shaft 931 by individual springs 931a. Each of these levers is provided with fingers 932 and 933 adapted to cooperate with lateral extensions 934 on levers 917. When the machine is not operating in division, and in division, until the setting clutch has started its cycle, the fingers 932 of members 930 are retained in engagement with these extensions and hold levers 917 rocked about shaft 137 in the position shown in Figure 88. This carries levers 921 sufficiently clear of selection segment extensions 923 and 925, and lifts bell crank members 903 so that the levers 900 thereon are pressed against cross rod 935 and rocked clockwise against the tension of springs 904 to lower the sensing shelves 901 sufficiently.

The sensing shelves 901 associated with lower orders than the highest order in which a divisor digit has been set up are blocked out of operation and are not permitted to rise beyond the position in which they are held by the blocking mechanism. Connected by a separate sleeve 936 (Figures 86 and 88) with each of the members 930, is a member 937 having a shelf 938 adapted to cooperate with a lug 939 on selection segment 132 of the adjacent higher order so that if the segment 132 of that order is advanced out of the zero position in which it is shown in Figure 86, the lug will overlie the shelf and prevent the member 937 from rocking with shaft 931, the loose keyway permitting its retention in this manner.

If one lever 930 is so blocked, all those to the right of it will be similarly blocked even though zeros are set therein, since lugs 940 on each lever 930 each overlie the next member 937 to the right, as is clearly shown in Figure 88, and all sleeves 936 to the right of a blocked sleeve are prevented from rocking in this manner.

From the foregoing it can be seen that when a divisor is set up on the keyboard and the shaft 931 is rocked counter-clockwise, the following positioning of parts described will be assumed:

1. The extension 925 of the selection segment on which the leftmost, or highest digit of the divisor is set up will cause the sensing shelf 901 of the next higher order to be positioned a fraction of an increment above its zero position depending upon the digit set up in that keyboard order alone;

2. The shelves 901 of all higher orders will assume a zero position;

3. The extension 923 of the previously mentioned selection segment, and the extension 925 of the next lower selection segment will jointly cause the sensing shelf 901 associated with the order in which the leftmost digit of the divisor is set up to be positioned so as to mechanically represent the actual value of the two digits in their proper decimal relation of ten to one;

4. The sensing shelves 901 of all lower orders will be blocked out of operation.

*The division control gate*

The positioning of the sensing shelves 901 (Figure 86) to the left of the highest digit of the divisor and in the highest significant order, when a divisor is set up on the keyboard and shaft 931 is rocked, effects control of the division operation. When the aforementioned shelves are positioned, that shelf in the highest significant order, and the next shelf to the left thereof, may control movement of gate 907. This gate is mounted for a swinging movement about pins 942 (Figures 80 and 86) and extends across the machine with a finger 943 extending rearwardly in each order between bell cranks 903 and cooperating with adjacent blocking tails 906. Before shaft 931 is rocked, the gate is held away from the blocking tails and out of a controlling position. For a short period after shaft 931 is rocked, the gate is held before being released. When the gate is released it is pulled counterclockwise by spring 944 until it engages one of the blocking tails 906 or, if it does not engage any tail, rocks through to that position shown in Figure 86 wherein it is effective to stop or prevent main clutch operation and actuation of the accumulator. However, so long as the gate is in engagement with a single blocking tail 906 and is prevented thereby from assuming that position shown in Figure 86, the main clutch will operate.

The fingers 943 which engage the blocking tails 906 are each slightly shorter than the finger in the next order to the left so that the abutments thereof cooperating with the blocking tails are echeloned so that said tails act in progression from left to right. A blocking tail in one order may therefore release the gate but the gate may only swing slightly before it engages the tail in the next lower order. The tail in that order may then block the gate from swinging through and so permits main clutch operation to continue.

The cooperation of the shelves 901, in the order to the left of the first value order, and in the first value order, with the accumulator mechanism, will be described presently.

The gate 907 controls operation of the main clutch. A lever 2117, pivoted coaxially with the gate, has a lug extending into the path of movement of the gate and is (Figure 80) connected by slot and pin connection to lever 2118 which is secured on shaft 2119. Rocking of shaft 2119 is effective to rock bell crank 2073 thereon (Figure 42), which has one arm adapted to contact with a lug 2075 on lever 633 fixed to shaft 626 and rock the shaft counter-clockwise to release the main clutch dog 395 from restraint of the multicycle latch 635, stopping the actuator. A second arm of the bell crank 2073 is adapted to contact with a lug 945 on the main clutch engaging interponent 612 and rock the interponent counter-clockwise to prevent its extension 615 from engaging the hook 616 of the main clutch dog 395. This prevents engagement of the main clutch by the setting clutch, unless the gate 907 is restrained by a blocking tail 906.

In Figures 95 to 101 inclusive, a modification of the gate structure previously described, is shown. This mechanism functions in much the same manner as that previously described and is structurally very similar thereto. However, the gate 907 in this form, instead of being a single structural element having fingers successively decreasing in length from left to right across the machine, is composed of a plurality of separate elements mounted upon a shaft 1030 (Figure 96) and so operated that the blocking tails in operation in three orders, the units, tens, and hundreds orders, assume a staggered relation to each other, presenting echeloned abutments for cooperating with the blocking tails.

In this form, the gate is constructed of a plurality of members 951 keyed to shaft 1030 which extends across the machine and carries one of the members 951 in each decimal order thereof. The stagger is provided by advancing levers 900 in the units and tens orders, while the levers 900 in the hundreds and higher orders are stationary. As shown in Figure 98, sensing lever 900 is supported by a pin 902 on bell crank 903 which, in turn, is secured by pin 953 on the lever 954 mounted for rocking movement about shaft 137. A spring 955, tensioned between lever 954 and a tail on bell crank 903, urges the said bell crank in a clockwise direction about pin 953, while spring 955A urges lever 954 in a counter-clockwise direction about shaft 137. Lever 954 carries a pin 956 which is engaged on the bifurcated end of arm 957 (Figure 97) of a U-member which includes another arm 958 and which is supported upon shaft 959. It will be remembered that when the shaft 931 is permitted to rock, the blocking-out shelves 938 rock upwardly to engage extension 939 on the selection segments. If a value is not set into an order, the shelf rocks upwardly into that position shown in broken lines in Figure 86, while if a value is set in an order, all the shelves to the right thereof are latched down, as has been explained in connection with the levers 930 and members 937 carrying the shelves 938. However, in the first order in which a value is set, the shelf is held down by the extension 939 on the selection segment and lug 960 on lever 958 rides on shoulder 961 on member 937, as shown in Figure 97, instead of dropping down onto the notch 962, as appears in Figure 99.

In Figure 96, it will be seen that arm 957 includes an extension 963 lying in the path of movement of the lever 958 in the next higher order. This ear is so positioned with respect to the height of shoulder 961 that, even though the next higher arm 958 is freed by its shoulder 961, its lug 960 can drop but half way into the notch 962 before the arm 958 strikes the ear 963 and blocks further movement. The third arm 958 to the left of the first blocked one can, however, move still further and bring its lug 960 against the bottom of notch 962 at the same time it is blocked by ear 963. Thus the blocked arms 958 will all be held in the position shown in Figure 97, the first free arm to the left will assume a position half way between that position and the position shown in Figure 99, and the remaining arms to the left will assume the position shown in Figure 99.

This results in a relative offset of the pivot points 953 of bell cranks 903 such as is illustrated in Figure 95, that associated with the leftmost order in which a digit is set up assuming the position designated "A", that associated with the next higher order, the position designated "B", and all higher orders, the position designated "C". Since the sensing levers 900 are carried on the bell cranks 903, this positioning offsets the blocking tails of the highest digit order and its next superior order to permit the former to move freely into and out of the path of the gate members during division operations, the necessity for such movement having been previously explained. Rocking of shaft 931 also bring hooks 964 on members 930 into the position shown in Figure 101 to prevent displacement of this mechanism during operation.

*Initiation of division operation*

The operation of the machine to perform a division calculation is initiated by depression of division key 970. This key, when depressed, is latched down and causes engagement of the setting clutch dog 394, conditioning of the reverse unit to ensure negative actuation of the main actuator, including gears 189 therein and rocking of shaft 931.

The division key 970 is mounted upon a key stem 971 which is supported by parallel links 972 and 973 (Figure 79) upon a frame plate in the control unit. The key stem 971 carries a roller 974 which lies in front of division control member 975 (Figures 75, 77, and 89). Member 975 is rotatably mounted upon shaft 976 and is urged clockwise by a strong spring 977. When the division key is depressed, the roller 974 passes beneath face 978 on the member 975 and spring 977 rocks the member 975 clockwise until upper roller 979 thereon contacts the main operating bar 503 (see also Figure 41) and depresses said bar to rock the setting clutch dog 394, as has been previously explained. When the key is first depressed, extension 980 (Figure 79) on link 973 is brought into notch 981 on latch 982 and is held in the notch by the pull of spring 983 on arm 984, integral with 982, until the stop key 985 is depressed or until the last order is reached, as will appear.

The main reverse unit, previously explained in connection with Figures 36 to 40 inclusive, is also conditioned, upon depression of the division key, to insure negative operation of the main actuator. In Figure 77, a bell crank 986 is shown mounted for hinged movement about stud 987. When the division control member 975 is released and rocks clockwise, the roller 979 is brought into engagement with the lower arm of bell crank 986 to rock it in a counter-clockwise direction. Bell crank 986 includes an extension 988 which overlies extension 989 (Figure 36) on pendular lever 545, and this rocking of the bell crank 986 thus rocks the pendular lever in a clockwise direction to condition the reverse unit for negative operation if it is not already so set, as has been previously explained.

Rocking of the shaft 931 (Figure 86) and the levers 930 and 937 thereon, is effected under the control of the mechanism particularly shown in Figures 80 to 84, inclusive. As there appears, a member 990 is fixedly keyed to the shaft 931 (Figures 82 and 83) while another 991 (Figures 83 and 84) is loose upon the shaft. Latch member 992 is pivotally mounted on the frame at 993 and is urged by spring 994 into engagement with an ear 995 on member 990 so as to prevent premature counter-clockwise movement of shaft 931 to which the member 990 is keyed. These members also include extensions 997 and 998 respectively, for cooperation with a T-shaped member 999, supported from a rocking lever 1000 (Figure 80) carried on a shaft 1001, and provided with a pin 1002 lying in a slot 1003 in cam operated lever 553. Upon rotation of main reverse cams 550 and 551 (see also Figures 36 and 45) on the setting clutch shaft, the T-member 999 is rocked down and then up. Depending upon the position of the T-member, it may engage selectively either the extension 997 on member 990 or 998 on member 991.

The T-member is positioned by the division control member 975, this member carrying a pin 1005 (see also Figure 77) which extends into a slot in the end of rocking lever 1006, the lever 1006 being pivoted on a stud 994 on the right side frame. The T-member 999 carries a projection 1007 which extends into a cam slot 1008 in the lever 1006. When the division member is rocked toward the left, the T-member overlies extension 997 while, when the division member is rocked toward the right, to start a division operation, the T-member overlies extension 998. With the T-member in the latter position, rotation of the reverse conditioning cams 550 and 551, is effective to bring the T-member into engagement with the extension 998 and cause counter-clockwise rotation of the member 991. Such movement of member 991, which is freely mounted on the shaft 931, first presses a lug 1010 on said member against the latch member 992, rocking it away from the ear 995 and freeing shaft 931 for counter-clockwise movement. As the movement continues, face 1009 of member 991, presses against the opposite side of ear 995, rocking the member 990 and the shaft 931 counter-clockwise. Levers 917, 921, and 900 are thereupon released to take up those positions determined by the selected value as heretofore described, and levers 930 and 937 are permitted to assume various positions dictated by the setting of the keyboard.

Counter-clockwise rotation of shaft 931, releasing the sensing mechanism, is effective to lock the carriage against lateral shifting movement (Figure 83). Member 990 keyed on shaft 931 is provided with an extension 1012 against which spring 1013 pulls lever 1014. Lever 1014 is positioned adjacent the right hand frame plate and includes an extension 1015 which is notched to engage a carriage brace plate 266 and retain the carriage against shifting movement until the extension 1012 is rerocked in a clockwise direction so that the extension 1015 assumes that position shown in full lines in Figure 83. When the sensing mechanism is released, therefore, the carriage can not be shifted until the sensing mechanism is returned to its inactive position. The gate 907 is also released by rocking of shaft 931, a lever 1016 being fixedly keyed to the end of this shaft, as appears in Figure 81. When this shaft is rocked, roller 1017 on lever 1018 is moved away from gate 907, but, to ensure that the several sensing shelves and their associated parts will have sufficient time within which to arrive at the positions dictated by the keyboard setting, the gate 907, although released upon rocking of shaft 931, is temporarily held by other means until well toward the end of the setting clutch cycle and after the gears 271 and 189 have been brought into mesh by dipping of the carriage.

The several plates 214 (Figures 2 and 77) carry a shaft 213 which extends across the machine through all orders. Mounted upon a stud 1020 on the control plate frame, is a delay latch 1021 (Figures 77 and 80) which is urged in a clockwise direction by spring 1022. When plates 214 are rocked in a counter-clockwise direction, upon initial operation of the setting clutch, as has been explained in connection with selection, the end of the delay latch 1021 is released by movement of the shaft 213 and is thereupon pulled in a clockwise direction by spring 1022 to position its nose 1023 behind an offset portion 1024 of rocking lever 2118 which is fixed on shaft 2119. This prevents lever 2118 from rocking in a clockwise direction and prevents the gate 907 from rocking into operation, upon rocking of shaft 931.

At the end of the setting clutch cycle, after the carriage has been lowered by the carriage dipping mechanism (Figure 48) and gears 271 and 189 are meshed, plates 214 are rocked clockwise and the shaft 213 returns to engage the delay latch and force it counter-clockwise to release gate 907 which is then pulled counter-clockwise by spring 944 to engage one of its fingers 943 with the blocking tail 906 in that order of the keyboard which is in control.

Toward the end of the setting clutch cycle (assuming that the gate 907 has been restrained by a blocking tail 906), the cam 517 (Figure 42) will rock lever 519 moving the extension 615 of interponent 612 into engagement with hook 616 on the main clutch dog 395 and rocking the said clutch dog to cause transmission of power through the main clutch.

The multicycle latch 635 (see also Figure 60) then engages the clutch dog 395, lever 2050 (Figure 60) having been rocked to permit it to do so, by an arm 1025 fixed to shaft 976 and rocked clockwise by depression of the division key (Figure 77) by arm 1026 also fixed to the shaft and link 1027 and lever 973 connecting said arm to the stem of the division key.

Operation of the actuator is thus initiated, and continues until the blocking tails 906 are moved to release the gate 907, or until the special stop key, hereinafter described, is operated.

In the modification shown in Figure 91, the gate shaft 1030 is rocked out of operation by a roller 1031 on arm 1032 of member 990 (Figures 91 and 93). Keyed on shaft 1030 is lever 1033 having an extension which is engaged by a notch 1034 at the end of lever 1035. The lever 1035 functions as a delay latch and is mounted upon the left control plate by a stud 1036. The other end of lever 1035 carries a pin 1037 lying in a slot in lever 1038 and a spring 1039 urges lever 1035 in a clockwise direction. Lever 1038 is mounted upon the selection locking plate 214 and when this plate is rocked, the slot in lever 1038 permits the spring 1039 to pull the delay latch into engagement with lever 1033 to retain lever 1033 in the position in which it prevents the shaft 1030 from rocking and the gate from engaging the ends of members 900. Whenever member 990 is rocked by the T-member 999 so as to latch out of operation the levers 930 and 937, the roller 1031 rocks the gate out also by means of roller 1031 which also engages lever 1033.

*Accumulator controlled mechanism and operation*

The blocking tails 906 may be moved to release the gate 907 at the proper time, by elements of the previously described accumulator.

It will be recalled from the description of the accumulator mechanism that when the carriage is dipped to bring gears 271 (Figure 2) therein into mesh with gears 189 in the actuator for actuation, the numerals registered on the dial shells may be moved out of alignment with the sight openings 318 since each accumulator element assumes an intermediate position indicating not only the value registered on itself but is also advanced such a partial increment of an additional value as has been transmitted to it from lower orders by the entrained carry mechanism. The dial shell therefor, in the first order of the value set up in the accumulator, includes not only its own order value, but the decimal value of all lower values set in the accumulator.

It will also be recalled that snail cam 281 (Figure 22) moves with the dial shell and that lever 315 carries a roller 316 which may be pressed against the periphery of the cam so that the position of each lever will be a representation of the value position of its associated dial shell. This structure is used to control the release of the gate 907 at the proper stages in division operations.

Each roller carrier lever 315 has pivoted thereon, for limited movement, a lever 1040 (Figure 86), the nose of which can engage the sensing shelf 901 in the aligned order of the keyboard if that shelf is standing in a zero position, or any position representing a value. Now, with the first five orders from the left in the accumulator reading "00024", the noses of the first two levers

1040 will stand practically at a zero cam position, the tail of the third will stand at a position corresponding to a 0.24 position on the cam 281, the fourth at a position corresponding to a 2.4 cam position, and the last at a 4.0 position.

If the first five orders, from the left, on the keyboard are set "00008" and the shaft 931 is rocked, the first three sensing shelves 901 will assume their lowermost effective position, which in practice should be about equivalent to a .5 registration. The fourth shelf 901 will be positioned at an .8 registration by the mechanism described earlier herein, and the fifth shelf will be positioned at an 8. registration. Any remaining levers at the right will remain out of blocking relation with the gate, as previously set forth.

As the shaft 931 is rocked, the noses of the levers 1040 in the first three orders in the carriage, will be pressed against the shelves 901 and rock levers 900 clockwise so that the tails 906 thereof will be ineffective to block the gate. However, in the fourth order, the tail of the compounding lever will stand at a 2.4 value. Since this is a greater value than the .8 represented by its cooperating and opposite shelf 901, it will not contact this shelf 901 and the blocking member in this order, termed the "tens order", will restrain the gate and the gears 189 will drive gears 271 negatively to subtract "8" from "24".

During the first cycle of subtraction, in the foregoing example, the remainder in the accumulator will be reduced to "16", the dial in the fifth order being driven backward from "4" through "0" to "6". Since its original 4. registration was, in the first place, less than the 8. registered on the aligned keyboard order, the original rocking of the shaft 931 pressed the shelf 901 of this order against the nose of aligned lever 1040 so that the blocking tail 906 was moved out of the path of the gate 907 leaving said gate restrained by the blocking tail of the next higher order alone. As this dial passes from "0" to "9", in this first cycle, the conformation of cam 281 permits the spring 904 to raise the shelf 901 high enough to carry the blocking tail 906 into the path of the gate 907, but this is only a temporary condition, for as the dial progresses to its final 6. position, the cam 281 again raises the blocking tail out of the path of the gate. It should be noted, however, that the progressive shortening of the fingers 943 of gate 907, previously referred to, permits blocking tails to the right of one which is holding the gate, to drop into holding position at any time prior to full release of the gate.

Although the position of the lever 315 in the fourth order of the accumulator is changed from a 2.4 registration to a 1.6 registration during this first cycle, its aligned sensing shelf is positioned at .8 and hence is not moved out of blocking relation with the gate. A second subtraction cycle therefore ensues.

During this second subtraction cycle, the position of the lever 315 in this fourth order of the carriage is changed from a 1.6 registration to a .8 registration equaling the .8 registration position of the aligned sensing shelf, but still failing to rock the lever 900 to remove the blocking tail thereof from the path of the gate 907.

The lever 315 in the fifth order of the carriage is moved, during this second subtraction cycle, from a 6. registration downward to a 0. registration, upward to a 9. registration, and back downward to an 8. registration. The upward movement permits its associated blocking tail 906 to move into the path of a finger 943 of the gate 907 and the subsequent downward movement is insufficient to remove it from that position, so that at the close of the cycle both the fourth and fifth blocking tails 906 lie in the path of the gate 907 and another subtraction cycle ensues.

During the very first part of the third subtraction cycle, the downward movement of the fifth lever 315 in the carriage will be sufficient to remove its associated blocking tail 906 from the path of gate 907 leaving the gate held by the fourth blocking tail alone.

The registration on the fourth sensing shelf and its cooperating carriage lever were equal at the end of the second cycle, so that further lowering of the carriage lever during the third cycle immediately begins to rock the lever 900. A small movement of this lever is sufficient to remove its blocking tail from the path of the gate 907 which, thus released from restraint, is pulled counter-clockwise by spring 944 rocking shaft 2119 (Figure 77) clockwise, and thereby rocking bell crank 2073 (Figure 42) to carry the multicycle latch 635 away from the main clutch dog 395 and thus arrest operation of the actuator.

In order to insure proper movement of "tens order" blocking tails, a compounding tip for lever 315 is provided in lever 1040, pivotally mounted thereon. When cooperating with a sensing shelf in any registration from "two" to "nine", lever 1040 assumes the position shown in dotted lines in Figure 95. As the lever 315 moves from a "one" to a "zero" registration, however, the tail 1041 of lever 1040 is pressed against the cross rod 263 so that the lever 1040 is rocked counter-clockwise on the lever 315 and its tip describes an arc about three times as long as between other positions. When functioning as a "tens order" control lever, the throwoff is always between "one" and "zero" and the compounding lever is brought into play for such control.

Rocking of the main clutch dog 395 by its spring 612 initiates operation of the restore clutch 700 in the manner previously described. Certain additional functions are performed under control of this clutch in division operations.

During the restore clutch cycle the dipping carriage is raised, and link 846 (Figure 75) is moved to the left by cam 849 rocking lever 347 counter-clockwise about its pivot 976. This operation rocks the division control member counter-clockwise by an arrangement similar to that described in connection with the restoration of member 820 and comprising a bell crank 1042 pivotally mounted on lever 347 and having a notched end adapted to engage a lateral extension 1043 on the member 975. A second bell crank 1044 is freely mounted on shaft 976 and has one arm provided with a slot embracing a pin 1046 on the bell crank 1042. A spring 1045 tensioned between the other arm of bell crank 1044 and the frame, holds the bell crank 1042 in position to engage the extension 1043 during the first part of the movement of cam 849, but causes the bell crank 1042 to be rocked so as to override and miss the extension 1043 when the member 975 is in the position shown in Figure 75 when the cam operates. This movement of the member 975 carries its pin 1005 (Figure 80) to the right, rocking lever 1006 and, through lug 1007, the member 999, so that the T-shaped head of the latter overlies the lug 997 of member 990 (see also Figure 83) keyed to shaft 931.

The division member 975 is retained in its leftward position by latch lever 1050 (Figure 77) which is urged by spring 1051 to engage extension 1052 on the division member. The division control member remains latched in this position during the remainder of the division operation in that order.

Return of the division member 975 is effective to set the reverse unit for positive actuation, and open the setting clutch for another cycle of operation. Division member 975 carries a link 1054 which is provided with a notch 1055 which, upon the first clockwise movement of the division member, is pulled into engagement with extension 1056 on a bell crank 1057 (Figure 77) by a spring 1058a. Upon return of the division member, the bell crank 1057 is rocked in a clockwise direction so that extension 1056 thereon presses down upon the main operating bar, as appears in Figure 41, to start a second setting clutch cycle. The bell crank 1057 also carries a roller 1059 which, upon clockwise rotation of the bell crank engages the pendular lever 545 (Figure 36) and rocks the link 547 to set the reverse unit for positive operation of the actuator by the main clutch. Movement of the link 846 by the cam 849 also rocks the gate 907 so that it may be relatched by the blocking tails if an overdraft has rendered the value registered by the accumulator greater than that set up on the keyboard. For this purpose link 846 is provided with an extension 1060 adapted to rock an arm 1061 pinned to shaft 2119 and thus to rock the gate 907 (Figure 80) through levers 2117 and 2118. If the gate is not latched by the blocking tails, however, it will rock back as soon as the cam 849 permits it to do so, at the end of the restore clutch cycle.

As the restore clutch cycle terminates, the gate 907 is released unless it is held by the blocking tails, and is free to rock forward under the pull of springs 944. If the gate can pass through, as in the foregoing problem where there was no overdraft, bell crank 2073 is rocked and interponent 612 is moved by the initial rise of cam 517 so that it will pass beneath and miss the main clutch dog and main clutch actuation will not occur. If the gate is blocked, however, a main clutch actuation follows. The main clutch actuation, controlled by opening of the main clutch dog, depends upon whether or not an overdraft has occurred, for if an overdraft has taken place, it is necessary that a positive operation follow.

The initial small rise of the main clutch opening cam 517 (Figure 42), either hooks the extension 615 of the interponent 612 into the hook 616 of the main clutch dog 395 or else carries the extension under the hook so that operation of the dog can not take place. As the setting clutch cycle proceeds, the main reverse cam lever 553 (Figure 80) not only sets the reverse unit for positive rotation, but also rocks lever 1000 lowering member 999 which engages lug 997 and rocks shaft 931 to restore the sensing shelves 901 to the position in which they are shown in Figure 88 in which position they are lowered out of contact with the carriage elements. The shaft 931 is held in this position by the latch 992. Rocking of the member 990 also brings its arm 1012 (Figure 83) against lever 1014 raising its extension 1015 out of locking relation with the carriage so as to permit a shifting operation.

In any event it is necessary that the corrective positive actuation, if initiated, be limited to a single cycle of operation. During the setting clutch cycle, shaft 501 (Figure 42) is rocked by cam 517 rocking bell crank 520 (Figure 77) pinned to the shaft 501. By means of a lateral extension 521 on one arm of the bell crank 520, a lever 1062 freely mounted on the shaft 976 and having an end underlying the extension 521 is rocked to bring an extension 1063 on the other arm of lever 1062 against the link 1054 lifting its notched end 1055 and releasing the bell crank 1057 which is thereupon rocked counter-clockwise by its spring 1064. This raises the lug 1058 of the bell crank 1057 away from the main operating bar 503 (Figure 41) permitting the spring 510 to raise the bar and carry its lug 622 against the arm 632 (Figure 42) pinned to the shaft 626 so as to rock the shaft and remove the multicycle latch 635 from restraining relation with the main clutch dog 395. The main clutch dog therefore arrests operation of the main clutch after a single cycle of operation, and a second restore clutch operation proceeds in the usual manner.

If such a corrective cycle is not initiated, the restore clutch will be automatically engaged toward the end of the setting clutch cycle. Since, in such an operation, the main clutch dog 395 is not removed from the position in which it is shown in Figure 50, its extension 409 prevents any engagement of the latch member 701 under the M-shaped member 703 controlling the restore clutch, and as the carriage is dipped, engagement of the restore clutch is prevented only by engagement of the cam-rocked bell crank 721 with the extension 720 of the M-shaped member. As the setting clutch cycle draws to a close, the cam 708 permits its bell crank 721 to recede from under the extension 720 and, since the latch 701 is already held released by the extension 409 of the main clutch dog 395, the tensioned link unit 723 will cause the restore clutch to be engaged immediately.

Operation of the restore clutch causes the dipping carriage to be raised and initiates an automatic carriage shifting operation through mechanism described in detail hereinafter.

Before proceeding to a description of this mechanism, it may be well to give an example of the sort of division problem in which an overdraft would occur and be corrected, since the problem considered did not result in an overdraft. Assuming a dividend of 0002402, let us assume a divisor of 0000801, so that at the end of the second cycle of subtraction the dividend will be reduced to 0000800. According to the previous description, the comparison of values will be effected in the fourth and fifth orders from the left only, and will not be affected by the registration of a "one" in the seventh order of the keyboard, since this figure appears to the right of a significant digit and is thus rendered ineffective by the blocking mechanism comprising shelves 901 (Figure 88).

The comparing mechanism which is in actual control will therefore be adjusted exactly as it was in the preceding problem, and a third subtraction cycle will be initiated in the same way. Since the 801 divisor is greater than the 800 dividend, however, this third subtraction cycle will produce an overdraft and necessitate a corrective cycle of operation of the main actuator in the positive direction.

It will be recalled that the gate 907 is released at the end of the restore clutch cycle. At that time the dipping carriage is in its upper position, and if an overdraft has taken place, all dials to the left of the first significant digit will show a "nine" aligned with the carriage cover sight opening. Levers 315 (Figure 86) may therefore rise in these orders until the rollers 316 contact the lowest points of cams 281, permitting all the blocking tails 906 associated with them to be rocked by spring 904 into the path of gate 907, sensing shelves 901 being arranged at such an angle with respect to levers 1040 (as shown in Figure 86, radius lines "a" and "b") that it makes no difference in the positioning of the blocking tails whether the dipping carriage be lowered or raised at the time of sensing.

Under these conditions, gate 907 will be restrained by the leftmost blocking tail, and the right arm of bell crank 2073 (Figure 42) will be held out of the path of lug 945 on the interponent 612, permitting the extension 615 thereon to effect engagement of the main clutch for the corrective cycle, as hereinbefore described. At the end of the main clutch cycle the restore clutch is engaged in the usual way, described in connection with that clutch, and an automatic carriage shifting operation is initiated through the mechanism described in detail hereinafter.

*Operation of carriage shifting in division*

The mechanism for initiating an automatic carriage shifting operation in multiplication has been previously described in detail, and functions similarly in division. During the second cycle of operation of the restore clutch in each carriage position, counter-clockwise movement of lever 570 (Figure 48) carries its lug 1386 against the end of link 1377 (see also Figure 89) moving said link to the left to initiate operation of the carriage shifting mechanism as previously described.

The first cycle of operation of the restore clutch in each carriage position does not initiate operation of the carriage shifting mechanism because, at that time the division control member 975 stands rocked clockwise from the position in which it is shown in Figure 89, and the roller 1065 on said member has lifted the left end of link 1377 depressing its right end below the path of movement of lug 1386. Later in the first restore clutch cycle, however, the member 975 is rocked counter-clockwise and latched in the position in which it is shown in Figure 89, as previously described, removing the roller 1065 from under link 1377 and permitting spring 1382 to rock the link until it abuts the under side of lug 1386. Subsequent dipping of the carriage by the setting clutch, preparatory to a possible correction cycle, then moves lug 1386 to the right permitting link 1377 to be rocked still further and to thus be brought into the path of the leftward movement of lug 1386 during the following cycle of operation of the restore clutch. The carriage is thus moved one step to the left bringing another digit into the "effective dividend."

Operation of the shifting mechanism, thus initiated, is automatically limited to a single cycle, and the division mechanism is automatically restarted at the end of that cycle. About the middle of the carriage shifting cycle, the floating cam 1334 (Figure 89) rocks lever 1356, as has been described in connection with the shifting mechanism proper. Bell crank 1387, pivoted on shaft 1388, has one arm adapted for engagement by a lateral extension 1066 on lever 1356 and has its other arm provided with an extension 1389 underlying both the shift control link 1377 and an extension of the division control member latch 1050. Clockwise rocking of the bell crank 1387 therefore rocks the link 1377 to depress its right end and carry it clear of lug 1386, thus permitting centralizer 1410 to disengage the shift power transmission at the end of the cycle, and also lifts the latch 1050 (see also Figure 77) freeing the division control member 975 which is thereupon rocked clockwise by its spring 977, restarting subtractive operation in the new carriage position as soon as centralizer 1410 has settled into the position in which it is shown in Figure 89 so as to carry the interlock lever 1416, attached to the centralizer by link 1418, out from under lug 1420 on the main operating bar link 505 (see also Figure 41).

*Termination of operation*

This repetitive tour of operations is repeated in each successive carriage position until the carriage reaches its leftmost position, when further operation of the carriage shifting mechanism is prevented and the machine is brought to rest. As the carriage moves into its leftmost position, projection 1570 (Figure 79) on the right carriage end plate 251 contacts the under side of the cam end 1571 of lever 1572, rocking the lever counterclockwise against the tension of spring 1573. Another arm of lever 1572 carries a pin 1575 lying in a slot 1576 in dog 1383, so that this rocking of lever 1572 serves to lift member 1383 clear of the lug 1384 on link 1374 and breaking the connection whereby movement of lug 1386 is ordinarily transmitted to link 1374 to start the shift. Since restarting of the devision mechanism is dependent upon release of latch 1050 by the shifting mechanism, such disabling of the shifting mechanism causes the machine to be brought to rest at the end of the tour of operations in the last carriage position.

During division operations, with the carriage in its leftmost position, the division key is unlatched and permitted to rise. A third arm of lever 1572 (Figure 79) underlies a lateral extension 1067 on the upper end of a bell crank 1068 pivoted at 1069 to the division key latch 982. When the lever 1572 is rocked by the carriage, bell crank 1068 may be rocked by spring 1070 to hook its other arm around lateral extension 1056 of the bell crank 1057 (Figure 77). This bell crank, it will be recalled, is rocked by link 1054 during the first restore clutch cycle in each order for the purpose of initiating a setting clutch cycle. If the end of bell crank 1068 (Figure 79) be hooked to extension 1056 of bell crank 1057 during such rocking, the bell crank 1068 will be pulled to the left, rocking the latch member 982 counter-clockwise about its supporting shaft 822 and releasing the lateral extension 980 of lever 973, permitting the division key 970 to be raised by its spring, since member 975 (Figure 77) is concurrently removed from its position overlying roller 974 on the division key stem. The machine is thus completely conditioned for subsequent operations of any character.

*Automatic tabulation*

As an incident to the termination of a division operation, operation of the carriage tabulating mechanism may be initiated in the same way as has been described in connection with shift control in multiplication operations, to bring the carriage back to any desired position.

*Interruption of division operations*

A division operation may be terminated at the conclusion of operations in any carriage position by a single depression of the stop key 985 (Figure 78), leaving the quotient digit in that order accurately registered, or terminated at once by two successive depressions of the same key, which will leave a possibly inaccurate quotient digit in the counter. This mode of operation is planned to take advantage of the instinctive action of the operator, who will naturally strike the stop key a second time if the machine fails to stop as soon as was desired when the key was first struck.

Stop key 985 is slidably supported on pins in the frame and normally held in raised position by a spring 1075 tensioned between a lub on the key and an upper pin on the frame. Lug 1076 on the key overlies one arm of a bell crank 1077 freely mounted on shaft 1078, the other arm of the bell crank being pivotally attached to a link 1079 (Figure 79), deflectably supported by a spring 1080.

A link 1081, pivotally attached to the link 1079, has a slotted end engaging a pin 1082 on arm 1083 pinned to shaft 976 so that depression of the division key 970, by rocking shaft 976, will permit spring 1080 to raise link 1079 slightly so that lug 1084 thereon will lie against tail 1085 of the latch member 982 which moves down against it as the latch is rocked into engagement with extension 980 of the lever 973.

As the link 1079 is moved to the right during the first depression of the stop key 985, the latch spring 983 overcomes the link supporting spring 1080 and the tail 984 of the latch engages a shelf 984a on link 1079 and deflects the link so that the point 1086a thereon passes below the stud 1087 on the frame. As movement of the link 1079 continues, lug 984A thereon strikes the tail 984 of the latch member 982, rocking it counter-clockwise to release the extension 980 and permitting the division key to rise slightly until its roller 974 meets the under side of the division control member 975 (see also Figure 77). The right end of link 1079, however, due to its deflection by latch tail 984, underrides and misses the lug 1086, which, during operation, is in the position indicated in dotted lines in Figure 79.

Release of the latch 982 permits the division key 970 to rise as soon as the division control member 975 has been moved to the position in which it is shown in Figure 77. This occurs during the next cycle of operation of the restore clutch, and the roller 974 on the division key stem is brought into blocking relation with member 975 preventing operative movement thereof upon its release from the latch 1050 by operation of the shifting mechanism. Upon being released by latch 1050 however, the member 975 moves slightly to the right against the roller 974, thus preventing reengagement of the latch. The division operation is thus interrupted at the conclusion of the first shifting operation subsequent to depression of the stop key.

A second depression of the stop key, after the latch 982 has been tripped, also moves link 1079 to the right. This time, however, it is not deflected by the latch tail 984 since the latch is held in released position due to the slight rocking of lever 973 at the time of its release. The point 1086a therefore passes above the frame stud 1087 and the right end of lever 1079 is brought against lug 1086 on arm 1088 pinned to shaft 626, rocking the shaft counter-clockwise.

As shown in Figure 60, the multicycle latch 635 is also fixed to shaft 626, so that movement of this shift by the link 1079 releases the main clutch dog 395 and thus immediately arrests operation of the actuator and initiates operation of the restore clutch. The operation is then terminated as in the case where the stop key was depressed but once, a positive cycle of actuator-operation intervening in appropriate cases.

*Miscellaneous functions of the stop key*

The stop key may be used also to normally reset the main control member 820 (Figure 75) in cases where it has been released by depression of an operating key during, for example, shipment of the machine, and subsequent jolting has displaced link 514 (Figure 41) to let the setting clutch dog 394 back into contact with the clutch before the application of power.

Lever 1090 (Figure 78), connected by a sleeve with bell crank 1077, carries a broadheaded pin 1091 lying in a slot in a link 1092 pivotally connected to the lower end of control member 820. The slot of the link 1092 permits member 820 to rock, in its normal position, without interference from the pin 1091, but rocking of lever 1090 by depression of the stop key 985 will, if the member 820 has been released, restore it to the position in which it is shown in Figure 78, where it may be relatched by the lug 819 (Figure 75).

Relatching of the division control member 975 under similar conditions, may be effected by pressing the ear 1093 (Figures 77 and 90) to the right by means of a tool. This first rocks the small lever 1094 counter-clockwise around its pivot 1095 on the lower part of control member 975, and brings an upper ear 1096 of the lever against lever 1062, raising it and thus raising link 1054 to prevent rocking of bell crank 1057 by movement of member 975. The ear 1093 then strikes an ear 1097 on the member 975 and further movement of the tool to the right, rocks member 975 back toward the position in which it is shown in Figure 77, where it may be held by latch 1050 until the release of the division key 970 by depression of the stop key 985. As the division key rises, roller 974 thereon first moves in front of member 975 and then raises ear 1098 (Figure 77) on the latch member 1050 to release member 975 from the latch, leaving it restrained by roller 974 alone, and ready for operation upon depression of the key.

Since depression of the add or subtract bar under the above mentioned conditions also sets the lever 1425 (Figure 78) to non-shift position, an arm 1100 integral with lever 1090 is provided with an ear 1101 underlying the tail of the non-shift latch 1446, so that the lever 1425 may also be released by depression of the stop key. A similar arrangement is shown in connection with the modified form of non-shift control in Figure 78A for releasing the non-shift latch under the foregoing conditions, or when the non-shift key 985 has been inadvertently depressed.

DOUBLE COUNTER

Counter mechanism

Counter mechanisms are provided in the upper portion of the carriage (Figures 1, 12, 16, 17, 18, and 19) so that the number of operations performed in addition and subtraction can be recorded, the mechanism also serving as a multiplier register in multiplication operations, and a quotient register in division operations. The counter mechanisms include two counters 1800 and 1801 (Figure 1), respectively provided on the left and right hand sides of the carriage. As will presently appear in detail, each counter includes a series of dials connected by tens-carrying mechanism, and control mechanism is provided for each counter so that the two counter mechanisms can be respectively used for registering a multiplier in register 1801 and accumulating multipliers in register 1800; for indicating the quotient in register 1801 while accumulating quotients in register 1800; for indicating the multiplier in register 1801 while the complements of multipliers are accumulated in register 1800; and, in general use, for positive registration in register 1801, while complementary registrations are secured in register 1800.

*Counter control*

The character of count in the left hand counting register is controlled by lever 1803 (Figures 1 and 105). When this lever is in its forward position, counting register 1800 will give a direct or positive count of multipliers in case of multiplication, and of quotients in the case of division; while, when lever 1803 is moved to its rearward position, the counter will give a complementary or negative count of multipliers in multiplication and a complementary count of quotients in division.

In order to obtain a direct count in multiplication operations, it is necessary that the counter dials in both registers be driven in the same direction that the accumulator dials are driven, while, to obtain a direct count of quotients in division operations, it is necessary that the counter dials in both registers be driven in the opposite direction to that in which the accumulator dials are driven. This requires a reversal of the drive of both counting registers upon the initiation of the division operation. Thus, in whichever position lever 1803 stands, the interchange from the proper direction of actuation of the counter for multiplication to the proper actuation for division, is automatically secured for register 1800 as well as for register 1801. In the present machine, this is accomplished without moving the lever 1803 from its forward position.

While counting register 1800 is subject to the control of lever 1803, counting register 1801 can not be shifted by the operator and the count in this register is always such that the counter dials are driven in a positive direction, giving a direct count of quotients in division operations and a direct count of multipliers in multiplication operations.

The construction of the counter actuator for register 1801 will now be described, while the construction of the counter mechanism will be considered presently.

A slide 1812 is supported in the slotted end of shaft 1819 and includes a projection 1814 which can be selectively engaged with slot 1815 provided in gear 1816 and slot 1817 in gear 1818 mounted on shaft 1819 which extends across the machine to a counter actuator to be described in connection with register 1800.

Gear 1816 is driven directly by gear 491 (Figures 103 and 53) from the main clutch, while gear 1818 is driven through gear 492 and idler 1820. Whenever the main clutch is rotated, therefore, gears 1816 and 1818 will be rotated but in opposite directions, so that when the projection 1814 is engaged with the slot in gear 1818, it will be driven by that gear in one direction, while, if it is in the slot in gear 1816, it will be driven in the other direction, driving gear 1821 keyed to shaft 1819 selectively in opposite directions. The gear train, including gear 1822, is thus reversed in its direction of rotation to rotate shaft 1823 in either a clockwise or a counter-clockwise direction. The ratio between the gears is such that finger 1824 (Figure 102) will describe a complete cycle for each half revolution made by the main clutch. This arrangement results in the counter dial in register 1801 being advanced one full increment, against the restraint of its pawl, for each main clutch cycle, although this main clutch cycle is completed in only a half revolution.

The relation of the gearing is such that, upon additive rotation of the twelfth, quarter, and half speed shafts, with projection 1814 in the slot in gear 1818, the counter actuating finger moves the counter dial in the same direction as the accumulator dials while, with the projection 1814 in the slot in gear 1816, similar actuation results in the dials being moved in the subtractive direction and complementary figures being entered in the dials. The direction of rotation of the counter dials is under the control of the radial cam on lever 1808. This cam operates in a notch in a slidable shaft 1810 which is supported by a sleeve 1811. One end of shaft 1810 is keyed into the flat slide 1812 by enlarged portion 1813, whereby lateral movement of the shaft 1810 moves slide 1812. This cam lever 1808 has an extending offset end 1825 which shifts shaft 1810 to set the counter dials for rotation in the same direction as the accumulator dials, and another portion 1826 whereby the dials are set for rotation in the opposite direction to the accumulator dials. In division, the counter drive is reversed with respect to the accumulator dials and lever 1808 is automatically moved by shaft 976.

As previously described, shaft 976 (Figure 102) is rocked clockwise by depression of the division key 970 (see also Figure 77). Lever 1804 is pinned to this shaft and upon clockwise rocking of shaft 976 pushes lever 1805, which is loose upon the shaft, to the rear against the tension of spring 1804A which urges lever 1804 counter-clockwise, while spring 1806 pulls the two levers together. A link 1807 extends from lever 1805 to one end of the lever 1808 pivotally mounted on a shaft 1809. Immediately upon operation of the circuit controlling means, bell crank 385 (Figures 30 and 102) is rocked on shaft 386 and projection 1827 thereon is brought down to engage either notch 1828 or 1829 to retain link 1807 rocked until the circuit is reopened, thus preventing reversal of the counters upon release of the division key, but before completion of the operation.

The counter actuator finger 1824 serves to operate the counter one step for each cycle of accumulator actuation and, as the carriage is shifted across the machine, the gear 1880 in each order is selectively presented to the actuating finger (Figure 102). This finger is mounted on lever 1830 which is rotated by an eccentric 1831 on shaft 1823. The finger is supported intermediately by pin 1831 while the lever is supported by pin 1832 so that the finger is moved to engage and rotate the particular gear 1880 presented. The gear 1880 is selectively reversed by reversing the direction of rotation of the eccentric. In one case the finger is moved toward the gear, then up and back to drag the gear around. In the other, the finger is moved forward and down, to push the gear around in the opposite direction, and then out of engagement, and back. The finger is retracted from the gear 1880 after each single actuation so that the counter dial is moved one step at a time, each successive counter dial unit to the left of that unit actuated by finger 1824 being moved as hereinafter described. A lever 1833 is supported from pin 1832 and is biased by spring 1834 against a surface on the eccentric to centralize the eccentric and thereby the finger 1824.

In view of the fact that this machine is designed to operate at very high speeds, it is an object of the invention to provide a counter actuating mechanism which will positively prevent overthrow of the registering mechanism at such speeds. This actuating mechanism is shown greatly enlarged in Figure 109 so that the diagrammatic showing of its movement will be clear.

On reference to this figure, the theoretical considerations on which the structure is based will be apparent. The eccentric mounting 1831A causes the point of attachment of lever 1830 to shaft 1823 to be revolved through the path indicated by the "stations" indicated diagrammatically at "A". Fulcrum 1832 would, were the slot 1832A straight and the lever arms equal, transform this circular movement into movement at the upper end of lever 1830 which might be described as a circle slightly flattened on top and oppositely deformed at the bottom side, such modification being caused by vertical shifting of the lever with respect to the fulcrum.

The first modeling of this transmitted movement toward that desired is effected by curving the slot 1832A substantially as shown so as to cause the vertical center line of the geometrical figure described by the upper end of the lever to be deformed in a manner determined by the conformation of the slot, causing said end to describe a roughly triangular path as indicated diagrammatically at "B" in the figure.

Further modeling of the pattern of movement of the actuating tooth is accomplished by transmitting the above described movement of the upper end of lever 1830 through a second lever 1824 which carries the actuating tooth and which is fulcrumed at 1831. When the lever 1824 is in its leftmost position, the left lever arm is longer than the right and vertical movement of lever 1830 is thus increased as it is transmitted to the tooth. The actuating tooth is thereby given sufficient movement to carry it distinctly beyond its next position of rest, thus insuring that any back lash in the gearing connecting the driven gear with the numeral wheel will be taken up. As lever 1824 is moved to the right, however, the relation of the lengths of its arms progressively reverses, causing the tooth to describe the patch indicated at "C" on the diagram.

If the tooth path pattern is found to be too asymmetrical because of the vertical shifting of lever 1830 with respect to its fulcrum, as hereinbefore mentioned, this condition can be compensated for by making the slot of lever 1824 slightly angular, as indicated. The ideal tooth path is one in which the actuating tooth upon passing out of contact with the driven tooth sweeps away from the driven gear along a path retrograding slightly toward the following gear tooth so as to meet and check it if it is overthrowing past the position in which it should be centralized. In a type of counter in which the actuating tooth is not reversible, no compensation for asymmetry of its path is necessary. In a reversible actuator structure such compensation may or may not be necessary, depending upon the centers originally chosen.

By these means an actuator is provided which, first, sweeps into engagement between two teeth of a gear in a direction which definitely precludes it from picking up more than one tooth, second, overdrives the picked up tooth to insure full advancing of the driven mechanism, and lastly, sweeps out of engagement with the driven gear in a path and at a relative speed which insures interception and complete checking of the next advancing gear tooth so as to prevent overthrow by momentum.

As has been previously mentioned, the counter register 1800 is under the control of lever 1803. This lever controls manual reversal of the direction of actuation of the counter dial. As appears in Figure 105, lever 1863 is mounted upon a stud 1840 on the left hand side frame of the machine and is connected by link 1841 to a lever 1842. Lever 1842 is connected by link 1843 to a reversing lever 1844 mounted upon a stud 1845 and having an extending end 1846 providing a two place radial cam 1847. This cam operates in a notch in a flat slide 1848 (Figure 106) which is supported in the slotted end of shaft 1819 (see also Figure 104) driven through the other reversing mechanism, more particularly shown in Figures 102 and 104, and upon which shaft gears 1852 and 1857 are freely mounted. The gear 1852 meshes with a gear 1853 mounted upon a shaft 1854 upon which is also secured a gear 1855 in mesh with an idler 1856. The gear 1857, supported on shaft 1819, is in mesh with the idler 1856 and the gear 1858 mounted on the shaft 1859. The gear 1858 corresponds to gear 1822 and shaft 1859 corresponds to shaft 1823 in the right hand counter actuator shown in Figure 104.

Under the control of lever 1803, lever 1844 is moved selectively to position slide 1848 so that projection 1860 thereon is engaged selectively with either the slot 1861 in gear 1852 or slot 1862 in gear 1857. In Figure 106, the projection is shown in engagement with the gear 1857 so that shaft 1819 is effective to rotate gear 1858 directly. If the lever is moved in the opposite direction, the slide shaft 1848 is moved so that projection 1860 thereon engages gear 1852 and gear 1857 is driven in the opposite direction through gears 1852, 1853, 1855, and idler 1856. Rotation of the shaft 1859 is effective to move the actuating finger 1863 (Figure 105) by the same type of eccentric and centralizing mechanism as has been described in connection with Figure 102 and to which like reference numerals have been applied.

Lever 1803 is positioned so that link 1843 is maintained in only one of two selected positions at one time. Thus the end of lever 1803 is provided with two adjacent angular faces 1865 and 1866 against which a lever 1867 is pulled by spring 1868. Rocking of the lever 1803 in either direction causes the lever 1867 to be moved in a clockwise direction and tension spring 1868 so that when the lever has been moved approximately half way between its two positions, the spring 1868 forces it over and completes the movement thereof, finally positioning the link 1843.

The counter mechanism proper includes a plurality of dials 1875 which may be observed through sight openings 1874 (Figure 1) in the accumulator carriage. The construction of these dials is similar to that of the accumulator mechanism dials to which reference may be had for a detailed description of the construction thereof. The construction of both registers 1800 and 1801 is practically the same except as hereinafter noted.

In the present case, the dials in both registers are mounted upon shaft 1876 (Figure 20) extending through end plates 251 and brace plates 255. Each order of the counter unit includes a gear 1877 rotatably mounted upon a shaft 1878 being engaged with a gear 1879 and its cooperatively associated counter dial 1875. Gear 1879 corresponds to gear 273 in Figures 20 and 25. Gear 1877 is also in mesh with a gear 1880 which, in each actuated order in both counters 1800 and 1801, may be engaged by the actuating fingers 1824 and 1863.

Immediately prior to each operation of the counter dials, either clockwise or counter-clockwise, roll carriers 1881 (Figure 22) are freed from spring tension to permit rollers 1882 to move out of contact with and out of the path of snail cams 1883. This occurs, upon each dip of the dipping carriage, only in the operated order and all orders to the left thereof in register 1801, but in all orders in register 1800. This obviates the strain on the mechanism which would result if the rollers had to be backed up the steep rise in the cam in additive operations.

The levers 1884 are rocked against the tension of their springs 1885 upon each carriage dipping by a member 1890 carried by bell cranks 1891 on shaft 542 (Figure 24). The bell cranks lie beneath dipping bail 269 so that each time the carriage dips, member 1890 rocks counter-clockwise to rotate levers 1893 on shaft 1894 and rock levers 1884 opposite to such of the levers 1893 as are engaged by member 1890. Roller carrier levers 1881, being held against the snail cams only by spring 1885, are thus freed from this tension and do not interfere with operation in either direction.

In the left hand register 1800, levers 1895 are mounted on shaft 1894, with their tails beneath the dipping bail 269 so that each time the carriage is dipped, the counter dials are free, levers 1895 serving in place of member 1890 in register 1801.

*Clearance of the counter*

Figure 21:
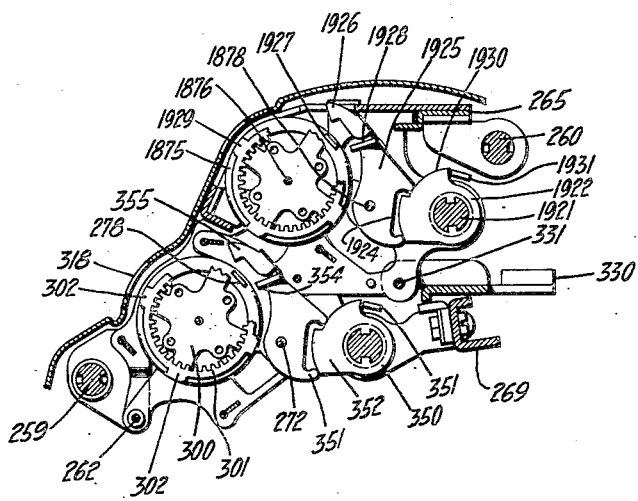

As has been described under "Automatic Clearance", automatic means are provided for clearing the accumulator mechanism. In addition to the means previously described, a counter clear key 1910 is provided adjacent to the accumulator clear key 373 (Figure 1) for selectively clearing counter 1801 and, if desired, counter 1800. This clear key 1910 sets into operation mechanism similar to that described in connection with automatic clearance and shown in Figures 30 and 31, to close contacts 391 and start the motor into operation. A clear clutch 1911 released by a clutch dog 1912 controlled by a lever 1913 serves to rotate cam 1915 to rock a lever 1916. Lever 1916 is attached to a link 1917 which is connected to a forwardly rocking lever 1918 supported at its forward end and keyed to counter clear shaft 260 (Figures 20, 21, and 30). Rocking of shaft 260 rocks lever 1919 (Figure 17) to move an associated member 1920 positioned on shaft 1921 which extends only through counter 1801. Members 1922 are keyed to shaft 1921 and each includes a projection 1923 lying in a niche 1924 of a rocking lever 1925 supported on shaft 1878. Rocking of levers 1922 brings projection 1926 into the path of the zero stop projection 1927 (Figure 21) on each dial stop assembly, and projection 1928 into the path of one of the four projections 1929 of each dial unit. Rocking of levers 1922 also results in ear 1930 thereon engaging projection 1931 on pawl 1932 to lift the pawl free from gear 1877. Further movement of lever 1922 brings projection 1933 (Figure 24) on pawl 1932 into engagement with ear 1934 of member 1884. This member, as previously described, rocks levers 1881 and returns the dial to zero position where projection 1926 engages projection 1927 on the dial. The dial is then in zero position where it remains.

The left hand counter 1800 includes a shaft 1940 which is functionally similar to shaft 1921 and upon which similar units are mounted so that rocking of this shaft is effective to clear this counter. As has been previously mentioned, register 1800 is selectively cleared, lever 1941 (Figure 19) being mounted on the shaft 1940 for this purpose. The lever 1941 includes a radial extension 1942 providing a two place cam which bears against a pin 1943. The pin 1943 is thus slidable in shaft 260 against the pressure of a spring 1944.

The end of the shaft 260 is slotted as is the hub of lever 1945 mounted on the shaft and lever 1945 carries a roller 1946 which operates against the lever 1947 mounted on shaft 1940. Slidable rod 1943 carries a transverse pin 1947 which is selectively moved into and out of engagement with the slotted ends of shaft 260 and the hub of lever 1945 to clutch them together. With the lever 1941 in that position designated as "1" in Figure 1 (see also Figures 16 and 19), depression of the counter clear key will clear only the right hand counter 1801. However, if the lever is moved to the downward position, that opposite the figure "2" in Figure 1, the transverse pin will engage the hub of lever 1945 and the shaft 260 whereby, upon depression of the counter clear key, both counters will be cleared by rocking of the shaft 260, thereby rocking both shafts 1921 and 1940.

FRAME CONSTRUCTION

The frame members of the present machine are secured together in such a manner that they provide a rigid, strong frame, of sufficient strength and inherent rigidity to be satisfactory and yet be relatively light in weight. As appears in Figure 107, a novel manner of connection is utilized to secure the abutting frame members together. Thus, the right side frame member is provided with extensions 2150 which extend through suitable slots provided in the base plate 2151. Screws 2152 are extended through from the base plate and engage square headed nuts 2153 slipped into recesses 2154 in the side frame member. The nuts extend over the inner edge of the extension 2151 so that when the screw is turned, the frame member is forced through and section 2155 is brought into engagement with the adjacent portion of the base plate. A similar manner of connection can be utilized between any other abutting frame members in the machine.

The light sheet metal covering 2156 is provided to enclose the machine and prevent entrance of dust and unauthorized tampering with the mechanism of the machine. This enclosing casing can be suitably lined with sound deadening material if desired and is preferably mounted upon resilient feet 2157, usually of rubber. Stud 2158 is ordinarily extended through the rubber foot, a washer 2159 being provided between the stud and the rubber foot. A piece of sound deadening material, such as rubber or some other effective sound deadening composition 2160, is positioned between the base plate 2151 and the casing. Sound deadening connections are also provided between the casing and the frame, one of these connections being shown in section in Figure 108. This connection includes a cupped member 2162 having a plurality of fingers 2163 bent over a disc 2164 to which a screw 2165 is fastened. Within the cup member are placed two pieces of sound deadening material, 2166 and 2167, while a bushing 2168 is extended through large aperture 2169 in the rear of the cup 2162. A disc 2170 is fast to the bushing and is positioned between the two pieces 2166 and 2167 so that a direct metallic connection between the frame and casing is not made. The disc is secured by screw 2172 to casing 2156 while the stud is fastened to the frame by nut 2171.

The pieces 2166 and 2167 are of a sound deadening material such as a condensation product having very light flow characteristics and a very low period of vibration, so that its sound absorbing qualities and vibration transmitting qualities are very poor. While the machine is inherently free from vibration, particularly since all operations are practically continuous in contrast to those of present commercial machines, the type of connections heretofore discussed prevent any resonance or vibration of the casing and prevent any amplification of the sound of operation thereby.

SHIFT MECHANISM

Means are included in the present machine for shifting the carriage 250, either to the right or to the left. The controls for this shift include an automatic one step shift of the carriage to the left after each automatic multiplication or division operation until the last carriage position is entered when, after the operation of the machine in that position, the carriage may shift automatically to the right to a position as predetermined by the tabulating mechanism; a one step shift to the right, initiated by depression of the back space key 1405 (Figures 1 and 68); a one step shift to the left indicated by depression of the zero multiplier key (Figures 1, 60, and 68); a shift of the carriage to that order determined by the position of mechanism set by knob 1499 (Figures 1, 69, and 72) upon depression of the tabulator key 1500 (Figures 1, 68, and 69); a lever 1440 (Figures 1 and 78) controlling shift or non-shift of the carriage in the automatic multiplication and division operations, as well as means disabling the shift during multiple addition or subtraction operations (Figure 78). These several controls will be described after the power driven mechanism for rotating shaft 334 to move comb 330 to slide the carriage, has been disclosed.

Movement of the carriage by the power driven mechanism is immediately under the control of a member 1300 (Figures 64 and 68) supported on a shaft 1301. This member is connected by a link 1374 to a lever 1375 which is rocked counter-clockwise or clockwise about shaft 1376, to move member 1300 likewise. When member 1300 is moved clockwise, extension 1302 (Figures 64 and 68) thereon is positioned in engagement with toothed wheel 1303 whereby shaft 334 (Figure 65) is rotated to shift the carriage to the right. When member 1300 is moved counter-clockwise, member 1300 positions point 1304 in engagement with star wheel 1305 whereby shaft 334 rotates to slide the carriage to the left. The engagement of the toothed wheel 1303 or of the wheel 1305 results in the selective turning of the shaft 334 by power derived from the following mechanism.

A gear 362 (Figure 65), driven by idler 647 (see also Figure 53), is secured to a shaft 1306 which is positioned between the center and right side frames. Gear 648, also driving the setting clutch (Figure 53), is also secured to shaft 1306 by member 1307. Member 1307 (Figure 65) is secured by riveting over the end of sleeve 1308 upon which the gear 648 is fixed as is a spider 1309. Member 1307 is provided with two extending lugs which engage keyway 1328 in shaft 1306. The member 1307, spider 1309, and gear 648 are mounted and secured on sleeve 1308. The member 1307 and the spider 1309 include extending lugs 1311 engaging slots in the gear 648.

An internal ring gear 1315 is welded to the spider 1309. This gear is in mesh with three planetary gears 1316 (see also Figure 64), riveted to one end of shafts 1317 which have gears 1322 fixed to their other ends. These shafts extend through bearings 1318 provided in the toothed wheel 1303 and the gears 1316 thereon mesh with the internal gear 1315 and with a sun gear 1320. The sun gear 1320 is formed upon an end of sleeve 1321 to which star wheel 1305 is keyed, shaft 1306 being turned down to receive the sleeve 1321. Gears 1322, formed on the ends of shafts 1317, mesh with sun gear 1327 to which is secured gear 1324.

Gear 648 is always rotated when the motor is rotating, so that the ring gear 1315, planetary gears 1316, and their associated gears 1322 turn idly. If the toothed wheel 1303 is held, however, by extension 1302, revolution of the planetary gears 1316 and 1322 is prevented and the planetary gears serve to rotate the sun gear 1327 and its associated gear 1324 to turn gear 1326 with which gear 1324 is in mesh. If, however, the star wheel 1305 is held by point 1304 rocking into engagement therewith, sun gear 1320 will be held stationary and the planetary gears 1316 and 1322 will both revolve and rotate with the internal gear 1315 whereby the gear 1324 will be driven in the opposite direction and the rotational direction of gear 1326 reversed. This selective reversal of rotation of gear 1326 is utilized to effect a shift of the carriage in either direction.

The gear 1326 is rotatably mounted on a hollow shaft 1331 between cam 1332 and a spacer 1330 thereon keyed to said shaft. Sleeve 1333 is also rotatably mounted on the hollow shaft and supports a cam 1334 thereon, while a centralizer disc 1335 is keyed to the hollow shaft 1331. Spring 1337 is compressed between lock washer 1338 and lock nuts 1339 on the threaded shaft 1336 which is screwed into the hollow shaft 1331. This construction provides for the support of gear 1326 on the hollow shaft and for a friction drive connection effected by cam 1332 and spacer 1330 which are keyed to shaft 1331 and pressed against the gear 1326 by spring 1337 bearing against the lock washer 1338, the centralizer cam 1335, the spacer 1333, and the spacer 1330.

The hollow shaft 1331 is supported in a suitable bearing 1340 provided in the left control plate 524 of the machine. A mitre gear 1341 is fixed on the end of the shaft and meshes with mitre gear 1342 mounted on the lower end of vertical shaft 334. Shaft 334 is supported in an angle piece 1343 secured to the base plate of the machine and carrying a sleeve bearing 1344 riveted to the angle piece and which supports an end of the hollow shaft 1331.

When link 1374 is first moved to either the right or left, latch lever 1350 (Figure 64) is released from against ear 1354 to rock about shaft 1351 under the pull of spring 1352 and seat its projection 1353 either above or below ear 1354 on member 1300 so that the member is latched, and rotation of the unit commences once link 1374 is moved.

Upon rotation of shaft 1331, lever 1350 is moved by cam 1334 to release the ear 1354 at about the middle of the cycle. An arm 1356 (see also Figure 66) is secured to a bushing 1345 pinned to shaft 1351. This arm includes an extension or nose 1357 engaging the periphery of cam 1334 so that when this cam rotates, the lever 1356 is moved in a counter-clockwise direction to engage ear 1358 on lever 1350 and rock it to release extension 1354.

It is to be noted that the cam 1334 includes two opposite steep rises over which the nose 1357 rides. Upon clockwise rotation of the cam from the position shown in Figure 66, the nose 1357 rodes over one of these at about the middle of the cycle while, if counter-clockwise rotation of the cam 1334 took place with the shaft, the arm 1356 would be moved a distance sufficient to release the ear 1354 early in the cycle. To secure the same cyclic time of operation of the lever 1350, the cam 1334 is free on the shaft and is driven by the centralizer disc 1335. As appears in Figure 64, this disc includes two notches 1360 on opposite sides thereof. Upon clockwise rotation of the centralizer disc 1335 from the position shown in Figure 64, roller 1361 on cam 1334 is engaged immediately and the cam is rotated. However, upon counterclockwise rotation of the centralizer cam, the roller 1361 is engaged by the notch in the opposite side only after the centralizer has rotated nearly half a revolution so that the rocking of the arm 1356 and disengagement of the ear 1354 occurs at the correct cyclic time.

The centralizer disc carries two rollers 1363 against which an arm of bell crank 1364 bears under the pull of spring 1364A so as to centralize the drive unit as well as the shaft 334 on the carriage proper.

Lever 1365 is also mounted upon the shaft 1351 (see also Figure 67) and is pulled by spring 1366 in a counter-clockwise direction so that tail 1367 on the lever rides against the periphery of cam 1332. This cam, which is keyed to the hollow shaft 1331, serves to rock the point 1368 on the lever into and out of engagement with the shelf 1354, the point lying either above or below the shelf depending upon the direction of movement of the member 1300. The lever 1365 is moved in to hold the shelf 1354 just before the projection 1353 is pulled out and thus ensures that the clutch operation will continue. This lever 1365 is rocked out just before the end of each individual shaft cycle so that member 1300 can be moved to disengage the unit and the shift end, unless the shift called for is a multi order shift, when the mechanism or key controlling will prevent member 1300 from being disengaged until projection 1353 again engages shelf 1354.

In automatic division and multiplication operations, except when the carriage is in the left end position, link 1374 is moved to the left (Figure 68) to engage point 1304 with the star wheel 1305 to secure an automatic shift of the carriage one step to the left after the operation has been completed. The operation of link 1374 in division will be described presently, while the construction of the mechanism associated with the link and its movement in automatic multiplication operations is here disclosed.

The link 1374 is extended between member 1300 and lever 1375 pivotally mounted on shaft 1376. A lever 1377 having an upwardly turned end 1378 is secured by a pin 1379 to a lever 1380. The lever 1380 is pivotally supported on shaft 1381 while the spring 1382 is provided between an extension of the lever 1380 and the lever 1377 to pull lever 1377 counter-clockwise. The lever 1380 also carries a dog 1383 having a shoulder formed thereon to engage extension 1384 on the link 1374. The right hand end of lever 1377 is formed with nose 1385 which normally lies below and against extension 1386 on lever 570. Upon dipping of the carriage, lever 570 moves in a clockwise direction so that the extension is moved to the right (Figures 48, 68, and 89), and the spring 1382 pulls lever 1377 so that its nose lies to the left of the extension 1386. This counter-clockwise movement of lever 1377 is limited by its extension 1390 which underlies shaft 1388. Upon the following restore clutch operation and raising of the carriage, the cam lever 570 is rocked in a counter-clockwise direction and extension 1386 pushes lever 1377 to the left (Figures 48, 68, and 89) so that the dog 1383 is effective to pull link 1374 to the left and thus engage point 1304 with star wheel 1305 and start a shift of the carriage to the left.

To ensure that the shift is limited to a single step, lever 1377 is rocked clockwise and is disengaged from extension 1386, spring 1382 being tensioned. It will be recalled that during the shift operation cycle, cam 1334 operates to move lever 1356 in a generally counter-clockwise direction to remove lever 1350 from engagement with extension 1354. Movement of the lever 1356 also rocks bell crank 1387 about shaft 1388 (Figure 89) so that shelf 1389, which lies beneath lever 1377, rocks lever 1377 clockwise to release its nose 1385 from extension 1386. The member 1300 is thus freed from the restraint of extension 1386 and can be released and centralized, as explained in connection with the shift motor circuit control.

The above described shift occurs after each multiplication operation except when the carriage reaches the last order when control of the shift passes to the presently described tabulating shift mechanism.

Since during the shift operation, the setting clutch, the main clutch, and the restore clutch, are not operating, the circuit to the motor is open in so far as these are concerned. The shift mechanism includes (Figure 89) means for closing the circuit independently of these, as has been mentioned in connection with Figure 30. Rocking of lever 1375 about shaft 1376 is effective to move link 401 (Figures 30 and 89) to close contacts 391 in the motor circuit. Lever 1410 hangs from a pin 1411 adjacent the lever 1375 and the end of lever 1410 is connected by pin 1419 to a link 1412. The pin 1419 extends into a slot in the link 1412 so that member 402 can be moved without moving lever 1410. The links 1412 and 401 are joined by the screws 1413a extending through slots in each of the links so that the overall length of the links can be adjusted.

When the lever 1375 is moved in a counter-clockwise direction it engages against extension 1410a on lever 1410 to rock that lever in a clockwise direction and pull links 1412 and 401 to the left (Figure 89) whereby member 402 is moved in a clockwise direction to permit the contacts 391 to engage and close the motor circuit. When lever 1375 is moved in a clockwise direction, it engages the offset lower end of lever 1410 and rocks that lever also in a clockwise direction whereby links 1412 and 401 are pulled to the left (Figure 89) and the contacts are closed. The lever 1410 includes extending fingers 1415 which lie on opposite sides of lever 1375 and act as guides.

Movement of lever 1410 thus closes the circuit upon operation of any of the shift controlling means. Since the carriage is only shifted when the main clutch and setting clutch are not in operation and since the operation of the setting clutch and main clutch is controlled by depression of the main operating bar, an interlock is provided to prevent depression of the main operating bar and consequent operation of the setting and main clutches whenever the shift mechanism is operating. To this end, a lever 1416 is pivotally mounted on shaft 1417 and is connected by link 1418 to the end of lever 1410. Whenever lever 1410 is rocked in a clockwise direction, lever 1416 will be rocked likewise in a clockwise direction to bring its nose 1419 beneath extension 1420 on the main operating bar link 505 (Figure 41) to temporarily interrupt lowering of the main operating bar until the circuit is opened and the shift has consequently come to an end. The lever 1416 then recedes permitting setting clutch operation to proceed if the main operating bar has been depressed in the meantime.

The member 1300 is disengaged and centralized at the end of the shift operation by member 1410. This member is rocked clockwise about its pivot 1411 by lever 1375 so that spring 1400, which extends between pin 1401 on a frame member and extension 1402 on member 1410, is tensioned. When link 1374 on lever 1375 is released, during a shift cycle, the levers 1350 and 1365 serve to retain the member 1300 in its shift controlling position until practically the end of the cycle, as has been explained. The spring 1400 is then capable of rocking lever 1375, and moving link 1374 to position member 1300 as it appears in Figures 64 and 68, momentum and the centralizer 1364 completing the operation.

Depression of the zero key in the multiplier row is also effective to initiate a one-step shift of the carriage to the left and to disable the other shift control keys as well as the multiplier keys. Pinned to shaft 2091 (Figure 60) is a lever 2090 which is rocked in a clockwise direction when the multiplier zero key is depressed, to move the lock bar 2055 to latch the other multiplier keys in their raised position. The lever 1460 (Figure 68), also pinned to shaft 2091 overlies an extension 1463 on lever 1464 pulled in a clockwise direction by spring 1465 about a supporting pin 1466. This lever includes an extension 1467 to which is secured a link 1468, joined by pin 1469 to another link 1470. When the lever 1460 is rocked in a clockwise direction, the lever 1464 is rocked in a counter-clockwise direction so that pin 1469 is moved to the left (Figure 68) and rocks the shaft 1485 counter-clockwise through the bifurcated arm 1482 which is pinned to the shaft and embraces the pin 1469. Situated adjacent each other on the shaft 1485 are two similar V-shaped members 1480 and 1481, each of which is provided with two facing lugs 1486. Spring 1490 is compressed between these four lugs, so that rocking movement in either direction may be transmitted from one of the V-shaped members to the other through the spring. Member 1480 is pinned to the shaft 1485 and is rocked by movement of the arm 1482, thus rocking the member 1481 which is free on the shaft 1485 and which has a tail pivotally connected to the link 1483 which is thus pushed to the right (Figure 68) to move pin 1487 lying in a notch in said link, also to the right. This results in movement of link 1473 to the right and a counter-clockwise rocking of lever 1375, which link 1473 embraces in its notch 1474. The link 1473 is supported with the notch 1474 in engagement with the end of lever 1375 by a link 1476 connected to the member 1026, as will appear in the division mechanism (see Figure 79) and by the member 1509 supported on shaft 1478 (Figure 69). Counter-clockwise rocking of lever 1375 is effective to pull the link 1374 to the left (Figure 68) and institute a one-step shift of the carriage.

It will be recalled that the normal position of lever 1377 is with its nose 1385 underlying extension 1386. Since the zero multiplier key does not institute a main clutch cycle, the carriage is not dipped and consequently the restore clutch is not operated, so that extension 1386 is not moved to release lever 1377. Accordingly, when lever 1356 is rocked by the cam 1334 at about the middle of the shifting clutch cycle, arm 1391 is moved to the left (Figure 68) to strike pin 1393 to release the zero key and to disable the lever 1375 to the end that the shift operation ceases after a single step. Arm 1391 is supported on lever 1392 on shaft 1351. Lever 1392 is connected to lever 1356 by a bushing 1345 so that whenever lever 1356 is rocked, arm 1392 is also rocked. A link 1403 connects lever 1377 to arm 1391 so that whenever lever 1377 is in that position shown in Figure 68, the arm 1391 can engage against pin 1393. However, if extension 1386 is rocked upon dipping of the carriage, link 1403, upon upward movement of lever 1377, moves the arm 1391 so that subsequently, if lever 1356 is rocked, the pin 1393 is not struck. However, during the shift operation occasioned by the zero key, lever 1377 remains in that position shown in Figure 68, and arm 1391 is in the position wherein it can engage pin 1393 upon rocking of the lever 1356. The pin 1393 is carried on one arm of the two-armed member 1394 supported on shaft 1395 and pulled to the left (Figure 68) by spring 1404. Link 1396 is connected to the other arm of member 1394 and is supported at its left hand end by bell crank 1397 supported on shaft 1398. This link includes a shelf 1399 which lies cooperatively adjacent to lever 2058 (Figure 60). Upon depression of the zero key, the lock bar 2055 is slid toward the left (Figure 60) to prevent depression of another multiplier key, as well as to maintain the zero key in depressed position. However, when the arm 1391 engages the pin 1393, the shelf 1399 is moved to the left and lever 2058, which is rocked in a counter-clockwise direction upon depression of a zero key, is moved in a clockwise direction to move the lock bar 2055 to the right (Figure 60) to release the zero key. At the same time, bell crank 1397 is rocked counter-clockwise so that pin 1484 thereon engages the under side of link 1483 and rocks that link in a counter-clockwise direction to remove the notch in said link from engagement with the pin 1487 so that spring 1400 (Figure 89) can centralize the lever 1375 and the member 1300 toward the end of the setting clutch cycle after levers 1350 and 1365 have released the extension 1354 on the member 1300. Rocking of the lever 1375 also rocks the lever 1410 to open and close the motor circuit, as has been previously described.

If the "zero" key is depressed while the machine is running out an operation initiated by previous depression of a multiplier key, the shifting operation must be delayed until the conclusion of the previously initiated operation. In other words, the digitation must be followed first by an automatically initiated one-step shift and then by another one-step shift initiated by the "zero key." In this situation the mechanism operates as follows.

It is assumed that, say, a "nine" multiplier key has been depressed, that the setting clutch cycle for releasing said key and engaging the main clutch has been completed, and that the machine is engaged in running out the nine successive cycles thus initiated. The release of member 820 (Figure 75) has permitted shaft 822 to rock, lowering bar 503 (Figure 41) and rocking frame 505 downward. Lug 1420 on said frame has thus been brought into contact with the right side of lever 1416 (see also Figure 89) preventing clockwise movement of said lever and thus preventing clockwise movement of the shift centralizer 1410 to which lever 1416 is connected by link 1418. Locking of the centralizer 1410 in this manner, locks the main shift control member 1375.

The "zero" key is connected to this control member 1375 through (Figure 60) lever 2090, shaft 2091 (Figure 68) lever 1460, lever 1463, link 1468, arm 1482, shaft 1485, the spring unit 1480, 1490, 1481, link 1483, and link 1473, the latter directly engaging the lower end of control member 1375. Since member 1375 is locked at the time the key is depressed, spring 1490 in this connecting linkage will be compressed, the key being latched down as heretofore described.

As digitation is concluded, operation of the restore clutch will be initiated, returning member 820 (Figure 75) to the left and removing lug 1420 (Figure 89) from the path of lever 1416. This will not only permit expansion of the compressed spring 1490 (Figure 68) to initiate a shift operation but will positively insure such operation, since as the carriage rises, the lug 1386 (Figure 89) will be brought against the right end of member 1377 as in the ordinary course of initiation of an automatic carriage shifting operation.

However, the shifting operation will not, in this case, be terminated at the end of one step of carriage movement. It will be recalled that the shift terminating mechanism includes an arm 1356 (Figure 89) adapted to be rocked by cam 1334, and an arm 1392 (Figure 68) connected to the arm 1356 by a bushing 1345. The arm 1356 is adapted to terminate an automatically initiated shift by rocking lever 1387 to lift the left end of member 1377 and release the right end thereof from lug 1386, while the arm 1392 is adapted to terminate a manually initiated shift by moving link 1396 to the left to rock bellcrank 1397 and lift link 1483 away from pin 1487. These means are, however, interconnected by link 1403 (Figure 68) so that, when the right end of member 1377 is in raised position, arm 1392 can not operate link 1396.

Toward the middle of the first shift cycle, therefore, arms 1356 and 1392 are simultaneously rocked by cam 1334. Since the right end of member 1377 is in raised position, interponent 1391 is held up by link 1403 and over overshoots pin 1393 without moving link 1396. Although the same cam action lowers the right end of member 1377 releasing it from lug 1386, member 1375 remains held by link 1473 and thus can not be centralized to terminate the shift. Another cycle of operation of the shifting mechanism therefore ensues.

This time the interponent 1391 has been lowered into line with pin 1393 by the lowering of the right end of member 1377 during the previous cycle, so that as the arm 1392 is rocked during the second cycle, link 1396 will be moved to the left, rocking lever 2058 to release the depressed "zero" key and raising link 1483 away from pin 1487 to permit centralization of control member 1375 and termination of the shifting operation whether or not the key is being held down manually.

The back space key 1405 is employed to secure a one-step shift of the carriage to the right. This key is mounted upon a key stem 1406 which is held in its raised position, as shown in Figure 68, by spring 1407. The key stem is connected by pin 1409 to link 1470 and 1408 which are pulled upwardly by a spring connected to the frame. When the back space key is depressed, pin 1469 moves in a clockwise direction, whereby lever 1480 is moved counter-clockwise to move the link 1483 and its associated link 1473 to the left (Figure 68) rocking the lever 1375 in a clockwise direction and engaging extension 1302 on member 1300 with the toothed wheel 1303 to institute a one-step shift to the right, the mechanism functioning as has been described in connection with the depression of the zero key, except that the shift is to the right instead of to the left.

When link 1396 is rocked to the left (Figure 68) the link 1483 is raised against the pull of spring 1487a and spring 1410 and 1407 are then free to raise the key stem and return the members 1480 and 1481 to that position in which they are shown in Figure 68.

In multiple addition and subtraction operations, it is desirable that shifting of the carriage be prevented even though the multiplication keys are employed. To this end, therefore, lever 1420 is mounted upon shaft 809 (Figures 55, 78, and 79) which, it will be remembered, is operated by the addition bar and the subtraction bar, the shaft being rocked in a clockwise direction upon depression of either of these bars. The lever 1420 carries a pin 1421 overlying an extension lever 1422 so that when the addition bar or the subtraction bar is depressed, lever 1422 is rocked in a counter-clockwise direction. Spring 1424 pulls lever 1422 normally into that position shown in Figure 78. However, when the levers 1420 is rocked in a clockwise direction, lever 1422 is rocked counter-clockwise to bring extension 1425 thereof against the tail of lever 1377 and rock that lever about its supporting pin 1379 and hold the lever beneath extension 1386 so that it can not be moved to the left by extension 1386 on the carriage dipping cam upon operation of the restore clutch. Lever 1377 is latched in it inoperative position until the end of the multiple addition or subtraction cycle, extension 1425 being engaged in the notch 1426 in a lever 1427 to retain lever 1377 in that position shown in Figure 78. The lever 1377 is released upon operation of the restore clutch, and in this connection, it will be remembered that link 846 is rocked to the left in Figure 78 (see also Figure 58) upon operation of the restore clutch so that link 845 is also rocked to the left and extension 1428 thereon engages an arm 1429 on the lever 1427 rocking the lever in a clockwise direction against the pull of spring 1430 to release projection 1425. Spring 1424 then pulls the lever 1422 clockwise and releases lever 1377.

If, during any operation, it is desired that the shift be entirely disabled, the shift and non-shift control lever 1440 can be set to either permit a shift to ensue, or to disable the shift entirely. This lever extends through to the keyboard of the machine, as appears in Figures 1 and 78, being supported upon shaft 1441 which also supports the lever 1422. The lever is centralized in either its shift or non-shift position by an expansible link 1442, particularly disclosed in connection with Figure 51, the link being extended between pin 1443 which supports the lever 1424 and a pin 1444 in the end of the lever 1440. In that position shown in Figure 78, the lever 1440 is in the shift position and will permit any shift called for by any operation of the machine to ensue. However, if the lever is moved to its non-shift position, being rocked counter-clockwise in Figure 78, pin 1444 rides against the under face of lever 1422 and moves the lever counterclockwise to engage lever 1377 and rock it about its supporting pin 1379 until extension 1425 is latched in notch 1426. In this position, the lever 1440 will retain the lever 1377 even though the restore clutch operates to move link 846 to the left and rock the latch lever 1427, since the centralizing link 1442 will retain the lever 1440 in position. The latch lever 1440 includes an extension 1445 carrying a roller which engages extension 1446 on the latch lever 1427 when the non-shift lever 1440 is moved to non-shift position. This disables the latch, the link 1442 being sufficient to retain the lever 1377 in its raised position. When the shift lever 1440 is moved back to shift position, the latch lever 1427 is permitted to become effective again. The shift lever 1440 is thus effective to disable the shift, for so long as this lever is in non-shift position, the tail of lever 1337 will be maintained in its raised position.

In Figure 78A there is shown a modification which does not disable the shifting mechanism in division if lever 1377 happens to be latched so that it can not engage the extension 1386. In this modification, a non-shift key 1448 is employed, being positioned on a key stem 1449 connected to the lever 1422. Upon rocking of lever 1422, by depression of the non-shift key 1448 or by operation of the addition or subtraction bars, latch lever 1422 is effective to latch the lever 1377 so that it can not subsequently be engaged by extension 1386. However, upon the first operation of the restore clutch, link 845 will be moved to the left (Figure 78A) and the latching of lever 1377 will be released, spring 1424 pulling lever 1422 in a clockwise direction, so that the lever is released. This is effective in division operations which include two restore clutch cycles, the shift occurring at the end of the second restore clutch cycle. If the non-shift key 1448 is inadvertently locked down and a division commences, the first restore clutch cycle is effective to release the latch so that the shift can take place at the proper time, automatically, at the end of the second restore clutch cycle.

TABULATING SHIFT

The carriage of the present machine is shiftable to nine different positions, the first position being that in which the carriage is at the extreme left. In Figure 1, pointer 1498 indicates that the carriage is in the seventh position. Under the control of the tabulating key 1500, the carriage 250 can be moved by the shift mechanism to the right or left to any position determined by the setting of knob 1499 in the tabulation setting mechanism. The tabulator key 1500 is mounted upon a stem 1501 supported by a pin 1502 in a slot in the key stem and by a lever 1503 pinned to the shaft 1478 (Figures 69 and 70). This shaft extends from the center frame to the right side frame and carries thereon, adjacent the center frame, a member 1504 which is pinned to the shaft. Freely supported upon the shaft 1478 is the member 1477 provided with a tail 1505 carrying roller 1506. The member 1504 and the member 1477 respectively include noses extending toward each other and retaining a strong compression spring 1507. Member 1504 includes a shelf 1508 which extends beneath the tail 1505 to prevent overextension of the spring 1507. Movement of member 1504 is transmitted to the member 1477 through the spring 1507 so that the roller 1506 will be depressed upon depression of the tabulator key 1500.

As appears in Figure 69, a member 1510 is supported upon a shaft 1511 and includes a T-shaped slot 1512 into which extends a pin 1513 on lever 1519, which lever underlies the roller 1506 and is thus depressed when the member 1477 is rocked by depression of the tabulator key. Lever 1519 is pivotally connected to link 1473 by pin 1487 supported by link 1509 free on the shaft 1478. The lever 1510 also includes an extension 1514 carrying a pin 1515 which engages nose 1516 on the lever 1517, supported from a pin 1518 and pulled by a spring so that its nose engages the pin 1515. Depending upon whether the carriage is to the right or to the left of that position for which the tabulating mechanism is set, or is exactly in that position, the pin 1515 will lie either above or below the nose 1516 or, if the carriage is in the position called for by the tabulating setting mechanism, it will stand against the nose as appears in Figure 69. If the pin is above the nose, the pin 1513 will ride down the left hand side of the T-shaped slot 1512 upon rocking of the lever 1477 and the link 1473 will be moved to the right. If the pin 1515 is below the nose 1516, the pin 1513 will ride down the right hand side of the notch 1512 and the link 1473 will be moved to the left as is shown in Figure 69.

In either case the latch end of lever 1517 will be pulled into engagement with the upper side of the stud which carries roller 1506, holding the lever 1519 depressed until lever 1510 returns to the position shown in Figure 69, whereupon the pin 1515 thereon will rock lever 1517 to release the stud which carries roller 1506 and stop the shifting mechanism. Movements of link 1473 to the left or right result in either a clockwise or a counter-clockwise oscillation of lever 1375, and consequently, either a right or a left hand shift of the carriage.

The details of the mechanism determining the direction and extent to which the carriage moves upon depression of the tabulating key, will now be described. As appears in Figure 74, a Geneva cross 1520 is mounted on a shaft 1521 supported in a bracket 1522 on the left side frame of the machine. Shaft 1521 is connected by a flexible spring coupling 1523 to a shaft 1524 likewise supported in brackets 1525 on the side frame. Rotational movement of the shaft 1524 is transmitted through another flexible coupling 1526 to an angularly positioned shaft 1527 supported in brackets 1528 on the side frame and bottom frame of the machine to another flexible connection 1529 which is connected to stub shaft 1530 upon which gear 1531 is secured. The several flexible couplings are formed of springs wound over each other in opposite directions and inserted into the shafts to which they are joined and wherein they are secured by set screw and sweating.

The Geneva cross 1520 engages a rack 1532 which is fixed to the various brace plates in the carriage along the left hand side thereof (see also Figure 22), each step of movement of the carriage causing a ninety degree rotation of the Geneva cross. This results in a quarter rotation of the gear 1531 and its shaft 1530 in the supporting bearing 1534. Rotation of gear 1531 also rotates gear 1536 which is fixed to a sun gear 1537 (Figure 72) mounted on a shaft 1538. This shaft is supported in a member 1539 riveted to the front lateral frame of the machine 1540 and the end of shaft 1541. Rotation of the sun gear causes rotation of the dual planetary gears 1542 and 1543 to rotate ring gear 1544, revolution of the planetary gear support being prevented except during manual setting. The planetary gears are supported in a plate 1545 carried on shaft 1541 and which shaft is movable in its supporting bearing 1546 only by knob 1499, which is utilized to predetermine the position to which the carriage returns.

The ring gear 1544 carries a spider 1548 (see also Figure 71) having extension 1549. This extension includes a pin 1550 which, as the spider is rotated, moves around the inner periphery of member 1551. In that position shown in Figure 71, the pin 1550 is seated in a notch 1552 in member 1551, this position corresponding to that which the parts occupy when the carriage is in the position called for by the setting of knob 1499. When the pin first moves out of notch 1552, member 1551 is rocked about shaft 1553 so that its inner periphery corresponds to the radial distance from the center of shaft 1541 about which the pin 1550 rotates. Now, if the carriage moves so that the pin 1550 rides over the upper surface of member 1551, as happens when the carriage shifts to the left as in automatic multiplication and division, member 1551 is rocked in clockwise direction about its supporting shaft 1553.

The tail of member 1551 is bifurcated (Figures 69 and 71) to receive one end of lever 1554, supported on pin 1555, carrying a stud 1556 lying in a slot in lever 1510. When member 1551 is rocked clockwise, lever 1510 will be moved in a clockwise direction to position pin 1515 beneath nose 1516 so that when the tabulating key 1500 is depressed, link 1473 will be moved to the left by pin 1513 riding down the right side of the T-slot 1512. Movement of the link 1473 will institute a carriage shift to the right, and the pin 1550 will return along the inner surface of member 1551 until it seats in the notch 1552 and pin 1515 lies against the nose 1516, this being the position in which the carriage position corresponds to the setting of the tabulator setting mechanism. Thus, if the carriage has shifted into the number "one" position, as at the end of an automatic multiplication, with the knob 1499 set to the "seven" position, the carriage shifts to the right.

Since the member 1551 is only rocked when roller 1550 moves into or out of that position in which it seats in notch 1552, the lever 1510 and link 1473 are held rocked until near the end of the shift operation in the last order to be shifted into when spring 1558 moves pin 1513 to that position shown in Figure 69 and releases link 1473 so that spring 1400 (Figure 89) can centralize the member 1300.

Since lever 1377 (Figure 68) is beneath extension 1386, arm 1391 is supported by link 1403 in position to move link 1396 to the left and rock link 1483 counter-clockwise to move the notch therein from about pin 1487 so that thereafter the back space key and zero multiplier key are incapable of initiating a shift until link 1473 returns to that position shown in Figure 68 wherein the pin 1487 can seat in the notch. Spring 1487A pulls the link into engagement with the pin 1487 after each rocking thereof during each cycle of operation of the shift mechanism. However, when the link 1473 is first moved upon depression of the tabulator key, springs 1490 and 1487A are so stressed that the link 1483, when released, is moved into a position wherein its notch can not engage the pin 1487 until the link 1473 returns.

The shaft 1541 carries a numeral dial 1560 (Figure 73) keyed thereto. Numerals 1566 on the dial shell are visible through an opening 1567 in the front cover plate of the machine, so that the setting of the tabulating mechanism can be readily adjusted and varied by the operator. A lever 1561 is supported on a screw 1562 in the front plate 2161 of the machine. This lever carries a roller 1563 which engages notches in a ratchet member 1564, keyed to shaft 1541, to retain the knob 1499 and the planetary gears 1542 and 1543 in the desired set position, spring 1565 pulling the roller 1563 into engagement with the ratchet member 1564.

Unless the tabulator is set to the "one" position, so that the member 1551 stands in that position shown in Figure 71, the carriage is automatically returned to the position dictated by the setting of the tabulating mechanism at the end of any multiplaction or division operations. When at the end of any multiplication or division operation, the carriage is shifted to its end position, nose 1570 on the right hand end plate of the machine engages nose 1571 on lever 1572 to rock that lever in a counter-clockwise direction about its supporting shaft against the tension of spring 1573. The lever 1572 includes an extension 1574 carrying a pin 1575 riding in a slot 1576 in dog 1383. The counter-clockwise rotation of lever 1572 removes the dog from against projection 1384 on link 1374 and brings shoulder 1577 into engagement with shelf 1578 on lever 1579 keyed to shaft 1580. Upon subsequent lifting of the carriage and movement of extension 1386 to the left in Figure 68, dog 1383 is rocked to the left so that shaft 1580 is rocked in a clockwise direction. This results in clockwise rotational movement of lever 1581 also pinned to shaft 1580 and a movement to the left in Figure 68 of link 1582 against the pull of spring 1583. Link 1582 is connected by a pin and slot connection 1584 to lever 1585 also pinned to shaft 1478, as appears in Figure 70, so that the shaft is rocked and the same action instituted as if the tabulating key had been depressed. This results in the carriage being moved to that position determined by the tabulating setting mechanism.

I claim:

1. An accumulator comprising registering wheels connected by planetary gearing including rockable spring-pressed gear carriers, cams carried by said registering wheels, free arms cooperating with said cams to limit movement of said gear carriers in one direction, positively acting means for rocking said gear carriers in the opposite direction to suspend cooperative relationship between said carriers and said arms, and division controlling mechanism for thereafter maintaining said arms in cooperative relationship with said cams.

2. In a calculating machine having selecting and actuating mechanisms, a laterally shiftable carriage carrying registering mechanism, and carriage shifting mechanism; the combination of means for mechanically comparing an amount set up by said selecting mechanism with an amount represented on said registering mechanism, means controlled by said comparing means for initiating sequential operations including positive operation of said actuating mechanism, operation of said carriage shifting mechanism, and negative operation of said actuating mechanism, and means controlled by said comparing means for selectively eliminating positive operation of said actuating mechanism from said sequence of operations.

3. In a calculating machine selecting mechanism comprising a plurality of orders of settable devices, division controlling mechanism comprising members settable under control of said devices associated with each of said orders, and means controlled by said devices for disabling such of said members as are associated with all orders of lower value than that in which the first significant digit is set.

4. In a calculating machine, selecting mechanism comprising a plurality of orders of settable devices, division controlling mechanism comprising members associated with each of said orders, and means jointly controlled by the associated order devices and by the adjacent lower order devices for positioning said members.

5. In a calculating machine, selecting mechanism comprising a plurality of orders of settable devices, division controlling mechanism comprising members associated with each of said orders, means jointly controlled by the associated order devices and by the adjacent lower order devices for positioning said members, and means controlled by said devices for disabling such of said members as are associated with all orders of lower value than that in which the first significant digit is set.

6. In a calculating machine, registering mechanism, actuating devices therefor, automatic controlling mechanism comprising a spring-pressed rockable member, a series of elements arranged with respect thereto to successively restrain said member from operative movement, and means effective upon operative movement of said member for interrupting operation of said registering mechanism by said actuating devices.

7. In a calculating machine, registering mechanism, actuating devices therefor, automatic controlling mechanism comprising a spring-pressed rockable member, a plurality of restraining means therefor, means for arranging said restraining means in echelon with respect to said member, and means effective upon release of said member from all of said restraining means for interrupting operation of said registering mechanism by said actuating devices.

8. In a calculating machine, registering mechanism, actuating devices therefor, automatic controlling mechanism comprising a spring-pressed rockable member having echeloned abutments thereon, a plurality of restraining means cooperating with said abutments to prevent operative movement of said member, and means effective upon operative movement of said member for interrupting operation of said registering mechanism by said actuating devices.

9. In a calculating machine, a frame, selecting and actuating mechanisms mounted in said frame, registering mechanism movable to a position in engagement with and to a position out of engagement with said actuating mechanism, and means mounted in said frame and controllable jointly by said registering mechanism and by said selecting mechanism while the registering mechanism is in either of the aforesaid positions for forming a mechanical representation of the sign character of the difference between the values registered by said selecting mechanism and said registering mechanism.

10. In a calculating machine, a registering element, a member proportionately movable by said element to form a mechanical representation of the value registered thereby, and means effective upon movement of said member to a certain position, for increasing the amount of movement thereof during movement of the registering element between its corresponding position and its next position.

11. In a cylically operable calculating machine having numeral wheels, actuating mechanism therefor, selecting mechanism, and means for automatically dividing an amount registered upon said wheels by an amount set up by said selecting mechanism upon operation of said actuating mechanism; the combination of means continuously effective throughout a plurality of cycles of operation of said machine for comparing an amount set up by said selecting mechanism with an amount registered upon a plurality of said numeral wheels including means for forming a mechanical representation of the sign character of the difference between said amounts, and means controlled by said comparing means for controlling operation of said actuating mechanism.

12. In a calculating machine, the combination with registering mechanism comprising a series of rotatable registering wheels arranged in denominational orders and a series of differential gearing assemblies continuously operable to transmit to each of a plurality of said wheels, rotational movement proportional to the sum of separate rotational movements entered into each of said assemblies respectively; selectively settable, cyclically operable, rotary actuating mechanism arranged in denominational orders and operable to enter selected amounts into said differential gearing assemblies respectively, comprising means for simultaneously driving each of a plurality of said assemblies continuously throughout one or more cycles of operation of said actuating mechanism at individually selected speeds; and tens-carrying mechanism operable to enter carried amounts into said differential gearing assemblies comprising means respectively operable by each of a plurality of said registering wheels for driving one of said assemblies continuously throughout one or more cycles of operation of said actuating mechanism at a speed proportional to the speed of operation of the registering wheel operating the same; of means for automatically dividing an amount registered upon said registering wheels by an amount to which said actuating mechanism is set upon operation of said actuating mechanism, comprising means continuously effective throughout a plurality of cycles of operation of said actuating mechanism for comparing an amount to which said actuating mechanism is set with an amount registered upon a plurality of said registering wheels including means for forming a mechanical representation of the sign character of the difference between said amounts, and means controlled by said comparing means for controlling operation of said actuating mechanism.

HAROLD T. AVERY.

CERTIFICATE OF CORRECTION.

Patent No. 2,211,736. August 13, 1940.

HAROLD T. AVERY.

It is hereby certified that error appears in the printed specification of the above numbered patent requiring correction as follows: Page 2, second column, line 13, for "the the" read --the--; page 6, second column, line 27, for "sleeves" read --sleeve--; page 8, second column, line 65, for "0.09988" read --0.0998--; page 15, second column, line 17, for the reference numeral "38" read --388--; page 18, second column, line 16, for "51A" read --51--; page 21, second column, line 70, for the reference numeral "2101" read --2001--; page 24, first column, line 12, for "7076" read --2076--; page 32, first column, line 12, for "lub" read --lug--; line 73, for the word "shift" read --shaft--; page 34, first column, line 55, for "patch" read --path--; page 37, first column, line 22, for "rodes" read --rides--; page 39, first column, line 75, strike out the word "over"; and second column, line 65, for "it" read --its--; page 41, second column, line 43, for "multiplaction" read --multiplication--; and that the said Letters Patent should be read with this correction therein that the same may conform to the record of the case in the Patent Office.

Signed and sealed this 22nd day of October, A. D. 1940.

Henry Van Arsdale,
Acting Commissioner of Patents.

(Seal)